(12) United States Patent
Bradwell et al.

(10) Patent No.: US 12,374,684 B2
(45) Date of Patent: Jul. 29, 2025

(54) BATTERY MANAGEMENT SYSTEMS FOR ENERGY STORAGE DEVICES

(71) Applicant: Ambri Inc., Marlborough, MA (US)

(72) Inventors: David J. Bradwell, Arlington, MA (US); Michael J. McNeley, Boston, MA (US); Zachary T. Modest, Jamaica Plain, MA (US)

(73) Assignee: AMBRI, LLC, Marlborough, MA (US)

( * ) Notice: Subject to any disclaimer, the term of this patent is extended or adjusted under 35 U.S.C. 154(b) by 877 days.

(21) Appl. No.: 17/399,724

(22) Filed: Aug. 11, 2021

(65) Prior Publication Data

US 2022/0077508 A1 Mar. 10, 2022

Related U.S. Application Data

(63) Continuation of application No. 17/136,432, filed on Dec. 29, 2020, now abandoned, which is a (Continued)

(51) Int. Cl.
*H01M 4/38* (2006.01)
*H01M 4/42* (2006.01)
(Continued)

(52) U.S. Cl.
CPC ............. *H01M 4/38* (2013.01); *H01M 4/381* (2013.01); *H01M 4/382* (2013.01); *H01M 4/387* (2013.01); *H01M 4/42* (2013.01); *H01M 4/44* (2013.01); *H01M 10/39* (2013.01); *H01M 10/399* (2013.01); *H01M 10/42* (2013.01); *H01M 10/425* (2013.01); *H01M 10/486* (2013.01); *H02J 7/0014* (2013.01);
(Continued)

(58) Field of Classification Search
CPC ........ H01M 4/38; H01M 4/381; H01M 4/387; H01M 4/42; H01M 4/44; H01M 10/39; H01M 10/399; H01M 10/42; H01M 10/425; H01M 10/486; H01M 2010/4271; H01M 2010/4278; H01M 2220/10; H01M 2220/20; H01M 2220/30
See application file for complete search history.

(56) References Cited

U.S. PATENT DOCUMENTS

| 11,374 A | 7/1854 | Leue |
|---|---|---|
| 2,587,443 A | 2/1952 | Crabtree |

(Continued)

FOREIGN PATENT DOCUMENTS

| AU | 2014229643 A1 | 9/2015 |
|---|---|---|
| AU | 2016225020 A1 | 9/2017 |

(Continued)

OTHER PUBLICATIONS

Advisory Action Before Filing of Appeal Brief dated May 10, 2012 for U.S. Appl. No. 12/839,130.
(Continued)

*Primary Examiner* — Jane J Rhee
(74) *Attorney, Agent, or Firm* — WILSON SONSINI GOODRICH & ROSATI

(57) ABSTRACT

Disclosed herein are methods and systems for monitoring and/or regulating energy storage devices. Examples of such monitoring and/or regulating include cell balancing, dynamic impedance control, breach detection and determination of state of charge of energy storage devices.

21 Claims, 18 Drawing Sheets

Related U.S. Application Data continuation of application No. 15/130,129, filed on Apr. 15, 2016, now abandoned, which is a continuation of application No. PCT/US2014/061266, filed on Oct. 17, 2014.

(60) Provisional application No. 61/892,326, filed on Oct. 17, 2013.

(51) Int. Cl.
| | |
|---|---|
| *H01M 4/44* | (2006.01) |
| *H01M 10/39* | (2006.01) |
| *H01M 10/42* | (2006.01) |
| *H01M 10/48* | (2006.01) |
| *H02J 7/00* | (2006.01) |
| *H02J 9/06* | (2006.01) |

(52) U.S. Cl.
CPC .......... *H02J 7/0048* (2020.01); *H02J 7/0068* (2013.01); *H02J 7/007194* (2020.01); *H02J 9/061* (2013.01); *H01M 2010/4271* (2013.01); *H01M 2010/4278* (2013.01); *H01M 2220/10* (2013.01); *H01M 2220/20* (2013.01); *H01M 2220/30* (2013.01)

(56) References Cited

U.S. PATENT DOCUMENTS

| | | |
|---|---|---|
| 3,057,946 A | 10/1962 | Eidensohn |
| 3,238,437 A | 3/1966 | Foster et al. |
| 3,245,836 A | 4/1966 | Agruss |
| 3,404,035 A | 10/1968 | Kummer et al. |
| 3,419,432 A | 12/1968 | Hesson |
| 3,488,221 A | 1/1970 | Hiroshi et al. |
| 3,507,703 A | 4/1970 | Laszlo |
| 3,535,214 A | 10/1970 | Rene |
| 3,588,573 A | 6/1971 | Chen et al. |
| 3,607,405 A | 9/1971 | Christopher |
| 3,607,407 A | 9/1971 | Adams |
| 3,635,765 A | 1/1972 | Greenberg |
| 3,663,295 A | 5/1972 | Baker |
| 3,716,409 A | 2/1973 | Cairns et al. |
| 3,770,506 A | 11/1973 | Rightmire et al. |
| 3,775,181 A | 11/1973 | Ryerson |
| 3,833,420 A | 9/1974 | Will |
| 3,833,421 A | 9/1974 | Rubischko et al. |
| 3,833,422 A | 9/1974 | Will et al. |
| 3,837,918 A | 9/1974 | Nakabayashi |
| 3,870,561 A | 3/1975 | Charbonnier et al. |
| 3,877,984 A | 4/1975 | Werth |
| 3,878,296 A | 4/1975 | Vine et al. |
| 3,884,715 A | 5/1975 | Gay et al. |
| 3,887,396 A | 6/1975 | Walsh et al. |
| 3,898,096 A | 8/1975 | Heredy et al. |
| 3,907,589 A | 9/1975 | Gay et al. |
| 3,915,742 A | 10/1975 | Battles et al. |
| 3,926,673 A | 12/1975 | Saridakis |
| 3,930,888 A | 1/1976 | Bowser et al. |
| 3,933,521 A | 1/1976 | Vissers et al. |
| 3,941,612 A | 3/1976 | Steunenberg et al. |
| 3,947,291 A | 3/1976 | Yao et al. |
| 3,954,504 A | 5/1976 | Zellhoefer |
| 3,959,012 A | 5/1976 | Liang et al. |
| 3,960,594 A | 6/1976 | Fritz et al. |
| 3,969,139 A | 7/1976 | Lai |
| 3,980,495 A | 9/1976 | Roche et al. |
| 3,988,164 A | 10/1976 | Liang et al. |
| 4,002,807 A | 1/1977 | Ludwig |
| 4,011,374 A | 3/1977 | Kaun |
| 4,015,054 A | 3/1977 | Cleaver et al. |
| 4,018,969 A | 4/1977 | Fischer et al. |
| 4,029,860 A | 6/1977 | Vissers et al. |
| 4,032,614 A | 6/1977 | Lewis |
| 4,044,194 A | 8/1977 | Evans et al. |
| 4,060,667 A | 11/1977 | Askew et al. |
| 4,061,841 A | 12/1977 | Sharma et al. |
| 4,065,602 A | 12/1977 | Roche et al. |
| 4,069,372 A | 1/1978 | Voinov |
| 4,107,401 A | 8/1978 | Goodson et al. |
| 4,125,683 A | 11/1978 | Beckford et al. |
| 4,130,500 A | 12/1978 | Melendres et al. |
| 4,164,608 A | 8/1979 | Coetzer |
| 4,169,120 A | 9/1979 | Miller |
| 4,189,529 A | 2/1980 | Birt et al. |
| 4,195,123 A | 3/1980 | Jumel |
| RE30,353 E | 7/1980 | Voinov |
| 4,216,273 A | 8/1980 | Cadart et al. |
| 4,238,553 A | 12/1980 | Gerlach et al. |
| 4,265,984 A | 5/1981 | Kaye |
| 4,287,268 A | 9/1981 | Coetzer |
| 4,287,269 A | 9/1981 | Coetzer et al. |
| 4,299,890 A | 11/1981 | Rea et al. |
| 4,315,974 A | 2/1982 | Athearn et al. |
| 4,338,380 A | 7/1982 | Erickson et al. |
| 4,360,574 A | 11/1982 | Park |
| 4,367,159 A | 1/1983 | Mrazek et al. |
| 4,405,433 A | 9/1983 | Payne |
| 4,407,912 A | 10/1983 | Virkar et al. |
| 4,457,989 A | 7/1984 | Coetzer |
| 4,510,210 A | 4/1985 | Hunt |
| 4,565,751 A | 1/1986 | Faust et al. |
| 4,582,553 A | 4/1986 | Buchta |
| 4,588,663 A | 5/1986 | Mason et al. |
| 4,596,637 A | 6/1986 | Kozarek et al. |
| 4,622,111 A | 11/1986 | Brown et al. |
| 4,657,830 A | 4/1987 | Kagawa |
| 4,692,390 A | 9/1987 | Roy |
| 4,764,437 A | 8/1988 | Kaun |
| 4,800,143 A | 1/1989 | Harbach et al. |
| 4,818,638 A | 4/1989 | Roy |
| 4,833,046 A | 5/1989 | Roy |
| 4,849,682 A | 7/1989 | Bauer et al. |
| 4,877,695 A | 10/1989 | Cipriano et al. |
| 4,886,715 A | 12/1989 | McCullough, Jr. et al. |
| 4,929,521 A | 5/1990 | Cipriano et al. |
| 4,945,012 A | 7/1990 | Bugga et al. |
| 4,945,257 A | 7/1990 | Marrocco, III |
| H816 H | 9/1990 | Carder et al. |
| 4,954,403 A | 9/1990 | Plichta et al. |
| 4,965,146 A | 10/1990 | McCullough et al. |
| 4,975,344 A | 12/1990 | Wedlake et al. |
| 4,999,097 A | 3/1991 | Sadoway |
| 5,011,748 A | 4/1991 | Shacklette et al. |
| 5,024,737 A | 6/1991 | Claus et al. |
| 5,034,290 A | 7/1991 | Sands et al. |
| 5,039,351 A | 8/1991 | Cooper et al. |
| 5,044,551 A | 9/1991 | Tanaka et al. |
| 5,139,895 A | 8/1992 | Roy et al. |
| 5,185,068 A | 2/1993 | Sadoway |
| 5,198,638 A | 3/1993 | Massacesi |
| 5,254,232 A | 10/1993 | Sadoway |
| 5,284,562 A | 2/1994 | Beck et al. |
| 5,286,359 A | 2/1994 | Richards et al. |
| 5,369,547 A | 11/1994 | Evans |
| 5,380,406 A | 1/1995 | Horton et al. |
| 5,392,191 A | 2/1995 | Thomas et al. |
| 5,407,119 A | 4/1995 | Churchill et al. |
| 5,429,895 A | 7/1995 | Lian et al. |
| 5,469,325 A | 11/1995 | Evans |
| 5,476,733 A | 12/1995 | Coetzer et al. |
| 5,491,037 A | 2/1996 | Kawakami |
| 5,532,078 A | 7/1996 | Redey et al. |
| 5,536,600 A | 7/1996 | Kaun |
| 5,538,813 A | 7/1996 | Li |
| 5,549,989 A | 8/1996 | Anani |
| 5,559,667 A | 9/1996 | Evans |
| 5,563,765 A | 10/1996 | Lian et al. |
| 5,578,389 A | 11/1996 | Tsuchimoto et al. |
| 5,587,872 A | 12/1996 | Lian et al. |
| 5,597,331 A | 1/1997 | Gable et al. |
| 5,604,053 A | 2/1997 | Coetzer et al. |
| 5,658,447 A | 8/1997 | Watson et al. |
| 5,661,403 A | 8/1997 | Mackenzie |

(56) References Cited

U.S. PATENT DOCUMENTS

| | | |
|---|---|---|
| 5,687,056 A | 11/1997 | Harshe et al. |
| 5,688,613 A | 11/1997 | Li et al. |
| 5,688,614 A | 11/1997 | Li et al. |
| 5,693,434 A | 12/1997 | Li et al. |
| 5,714,283 A | 2/1998 | Briscoe et al. |
| 5,716,731 A | 2/1998 | Coetzer et al. |
| 5,735,933 A | 4/1998 | Yokoyama et al. |
| 5,737,181 A | 4/1998 | Evans |
| 5,763,117 A | 6/1998 | Wright et al. |
| 5,798,308 A | 8/1998 | Chatterjee et al. |
| 5,807,412 A | 9/1998 | Li et al. |
| 5,834,131 A | 11/1998 | Lutz et al. |
| 5,856,041 A | 1/1999 | Inoue et al. |
| 5,874,183 A | 2/1999 | Uematsu |
| 5,939,221 A | 8/1999 | Tsuchimoto et al. |
| 5,972,533 A | 10/1999 | Coetzer et al. |
| 5,982,609 A | 11/1999 | Evans |
| 6,007,943 A | 12/1999 | Coetzer |
| 6,083,296 A | 7/2000 | Innes et al. |
| 6,143,054 A | 11/2000 | Dry |
| 6,180,284 B1 | 1/2001 | Shah et al. |
| 6,218,055 B1 | 4/2001 | Shah et al. |
| 6,221,513 B1 | 4/2001 | Lasater |
| 6,267,799 B1 | 7/2001 | Innes et al. |
| 6,270,553 B1 | 8/2001 | Innes |
| 6,289,034 B1 | 9/2001 | Bates |
| 6,322,745 B1 | 11/2001 | Leigh et al. |
| 6,328,783 B1 | 12/2001 | Bates |
| 6,368,486 B1 | 4/2002 | Thompson et al. |
| 6,379,422 B1 | 4/2002 | Dry |
| 6,379,424 B1 | 4/2002 | Dry |
| 6,379,840 B2 | 4/2002 | Kitoh et al. |
| 6,387,153 B1 | 5/2002 | Burke |
| 6,402,808 B1 | 6/2002 | Dry |
| 6,419,812 B1 | 7/2002 | Beck et al. |
| 6,419,813 B1 | 7/2002 | Brown et al. |
| 6,423,114 B1 | 7/2002 | Burke |
| 6,423,115 B1 | 7/2002 | McCarthy et al. |
| 6,428,603 B1 | 8/2002 | Batterham |
| 6,440,195 B1 | 8/2002 | Dry |
| 6,475,264 B1 | 11/2002 | Dry |
| 6,478,848 B1 | 11/2002 | McCarthy et al. |
| 6,498,406 B1 | 12/2002 | Hoeriuchi et al. |
| 6,517,605 B1 | 2/2003 | Bates et al. |
| 6,531,846 B1 | 3/2003 | Smith et al. |
| 6,548,212 B1 | 4/2003 | Heider et al. |
| 6,549,423 B1 | 4/2003 | Brodnick |
| 6,558,525 B1 | 5/2003 | Bradford et al. |
| 6,579,817 B2 | 6/2003 | Harada et al. |
| 6,585,929 B1 | 7/2003 | Bates et al. |
| 6,602,321 B2 | 8/2003 | Dry et al. |
| 6,692,620 B2 | 2/2004 | Duruz et al. |
| 6,692,631 B2 | 2/2004 | Bergsma |
| 6,692,870 B2 | 2/2004 | Miyake et al. |
| 6,706,239 B2 | 3/2004 | Haack et al. |
| 6,719,889 B2 | 4/2004 | Brown |
| 6,723,222 B2 | 4/2004 | Bergsma et al. |
| 6,730,210 B2 | 5/2004 | Thompson et al. |
| 6,733,924 B1 | 5/2004 | Skotheim et al. |
| 6,906,436 B2 | 6/2005 | Jenson et al. |
| 6,924,164 B2 | 8/2005 | Jenson |
| 6,962,613 B2 | 11/2005 | Jenson |
| 6,963,186 B2 | 11/2005 | Hobbs |
| 6,986,965 B2 | 1/2006 | Jenson et al. |
| 7,055,733 B2 | 6/2006 | Weil et al. |
| 7,077,945 B2 | 7/2006 | Bergsma et al. |
| 7,131,189 B2 | 11/2006 | Jenson |
| 7,144,655 B2 | 12/2006 | Jenson et al. |
| 7,157,187 B2 | 1/2007 | Jenson |
| 7,184,903 B1 | 2/2007 | Williams et al. |
| 7,194,801 B2 | 3/2007 | Jenson et al. |
| 7,211,351 B2 | 5/2007 | Klaassen |
| 7,250,233 B2 | 7/2007 | Choi et al. |
| 7,255,937 B2 | 8/2007 | Park |
| 7,274,118 B2 | 9/2007 | Jenson et al. |
| 7,294,209 B2 | 11/2007 | Shakespeare |
| 7,328,831 B1 | 2/2008 | Topolski |
| 7,344,804 B2 | 3/2008 | Klaassen |
| 7,373,222 B1 | 5/2008 | Wright et al. |
| 7,389,189 B2 | 6/2008 | Williams et al. |
| 7,389,580 B2 | 6/2008 | Jenson et al. |
| 7,433,655 B2 | 10/2008 | Jacobs et al. |
| 7,504,017 B2 | 3/2009 | Cardarelli |
| 7,513,219 B2 | 4/2009 | Louden |
| 7,554,220 B2 | 6/2009 | Sugawara |
| 7,568,537 B2 | 8/2009 | King et al. |
| 7,578,702 B1 | 8/2009 | Tom et al. |
| 7,603,144 B2 | 10/2009 | Jenson et al. |
| 7,612,537 B2 | 11/2009 | Wynne et al. |
| 7,632,604 B2 | 12/2009 | Iacovangelo et al. |
| 7,678,484 B2 | 3/2010 | Tao et al. |
| 7,776,190 B2 | 8/2010 | Hiltmann et al. |
| 7,776,191 B2 | 8/2010 | Hiltmann et al. |
| 7,776,478 B2 | 8/2010 | Klaassen |
| 7,808,131 B2 | 10/2010 | Hurst et al. |
| 7,858,228 B2 | 12/2010 | Yoon |
| 7,877,120 B2 | 1/2011 | Jacobs et al. |
| 7,883,796 B2 | 2/2011 | Kida et al. |
| 7,931,989 B2 | 4/2011 | Klaassen |
| 7,939,205 B2 | 5/2011 | Klaassen |
| 7,943,270 B2 | 5/2011 | Blake et al. |
| 8,034,484 B2 | 10/2011 | Inatomi et al. |
| 8,044,508 B2 | 10/2011 | Jenson et al. |
| 8,080,326 B2 | 12/2011 | Chan et al. |
| 8,101,293 B2 | 1/2012 | Chan et al. |
| 8,110,301 B2 | 2/2012 | Iacovangelo et al. |
| 8,142,569 B2 | 3/2012 | Kalynushkin et al. |
| 8,178,231 B2 | 5/2012 | Soloveichik et al. |
| 8,202,641 B2 | 6/2012 | Winter et al. |
| 8,219,140 B2 | 7/2012 | Jacobs et al. |
| 8,221,912 B2 | 7/2012 | Fujiwara |
| 8,236,440 B2 | 8/2012 | Bendert |
| 8,237,407 B2 | 8/2012 | Hurst et al. |
| 8,257,868 B2 | 9/2012 | Hagiwara et al. |
| 8,268,471 B2 | 9/2012 | Sadoway et al. |
| 8,281,877 B2 | 10/2012 | Shahin et al. |
| 8,298,701 B2 | 10/2012 | Whitacre et al. |
| 8,306,671 B1 | 11/2012 | Marcus |
| 8,311,681 B1 | 11/2012 | Marcus |
| 8,313,719 B2 | 11/2012 | Barker et al. |
| 8,323,816 B2 | 12/2012 | Bradwell et al. |
| 8,329,336 B2 | 12/2012 | Soloveichik et al. |
| 8,334,053 B2 | 12/2012 | Shapiro et al. |
| 8,343,646 B1 | 1/2013 | Wilkins et al. |
| 8,409,744 B2 | 4/2013 | Ijaz et al. |
| 8,436,489 B2 | 5/2013 | Stahlkopf et al. |
| 8,457,800 B2 | 6/2013 | Marcus |
| 8,459,314 B2 | 6/2013 | Frazier et al. |
| 8,460,814 B2 | 6/2013 | Deane et al. |
| 8,471,520 B2 | 6/2013 | Coe et al. |
| 8,475,954 B2 | 7/2013 | Ijaz et al. |
| 8,504,214 B2 | 8/2013 | Genc et al. |
| 8,537,581 B2 | 9/2013 | Wagoner et al. |
| 8,539,763 B2 | 9/2013 | Mcbride et al. |
| 8,568,915 B2 | 10/2013 | Fuhr et al. |
| 8,642,201 B2 | 2/2014 | Cheng et al. |
| 8,643,500 B2 | 2/2014 | Lee et al. |
| 8,652,672 B2 | 2/2014 | Whitacre et al. |
| 8,722,226 B2 | 5/2014 | Carter et al. |
| 8,764,962 B2 | 7/2014 | Allanore et al. |
| 8,766,642 B2 | 7/2014 | Bogdan, Jr. et al. |
| 8,806,866 B2 | 8/2014 | Mcbride et al. |
| 8,815,445 B2 | 8/2014 | Sugiura et al. |
| 9,000,713 B2 | 4/2015 | Boysen et al. |
| 9,035,617 B2 | 5/2015 | Parakulam et al. |
| 9,076,996 B2 | 7/2015 | Bradwell et al. |
| 9,106,980 B2 | 8/2015 | Parakulam et al. |
| 9,153,803 B2 | 10/2015 | Chung et al. |
| 9,312,522 B2 | 4/2016 | Bradwell et al. |
| 9,437,864 B2 | 9/2016 | Tan et al. |
| 9,502,737 B2 | 11/2016 | Bradwell et al. |
| 9,520,618 B2 | 12/2016 | Bradwell et al. |
| 9,559,386 B2 | 1/2017 | Bradwell et al. |
| 9,728,814 B2 | 8/2017 | Bradwell et al. |

(56) References Cited

U.S. PATENT DOCUMENTS

| | | |
|---|---|---|
| 9,735,450 B2 | 8/2017 | Bradwell et al. |
| 9,787,119 B2 | 10/2017 | Yamauchi et al. |
| 9,825,265 B2 | 11/2017 | Bradwell et al. |
| 9,876,258 B2 | 1/2018 | Bradwell et al. |
| 9,893,385 B1 | 2/2018 | Nayar et al. |
| 9,925,881 B2 | 3/2018 | Manotas et al. |
| 10,297,870 B2 | 5/2019 | Bradwell |
| 10,541,451 B2 | 1/2020 | Bradwell et al. |
| 10,566,662 B1 | 2/2020 | Nayar et al. |
| 10,608,212 B2 | 3/2020 | Bradwell et al. |
| 10,637,015 B2 | 4/2020 | Thompson et al. |
| 10,903,528 B2 | 1/2021 | Ouchi et al. |
| 11,196,091 B2 | 12/2021 | Bradwell et al. |
| 11,211,641 B2 | 12/2021 | Bradwell et al. |
| 2002/0009649 A1 | 1/2002 | Sato et al. |
| 2002/0012833 A1 | 1/2002 | Gow et al. |
| 2002/0051912 A1 | 5/2002 | Fitter et al. |
| 2002/0064704 A1 | 5/2002 | Thackeray et al. |
| 2003/0008212 A1 | 1/2003 | Akashi et al. |
| 2003/0044686 A1 | 3/2003 | Bushong et al. |
| 2003/0052646 A1 | 3/2003 | Minamiura et al. |
| 2003/0186111 A1 | 10/2003 | Tamakoshi |
| 2003/0196908 A1 | 10/2003 | Brown |
| 2003/0203279 A1 | 10/2003 | Tsukamoto et al. |
| 2003/0207161 A1 | 11/2003 | Rusta-Sallehy et al. |
| 2003/0228520 A1 | 12/2003 | Kaun |
| 2004/0061841 A1 | 4/2004 | Black et al. |
| 2004/0076885 A1 | 4/2004 | Sato et al. |
| 2004/0229116 A1 | 11/2004 | Malinski et al. |
| 2004/0258953 A1 | 12/2004 | Kido et al. |
| 2005/0079411 A1 | 4/2005 | Kairawicz et al. |
| 2005/0237029 A1 | 10/2005 | Takezawa et al. |
| 2005/0238954 A1 | 10/2005 | Kawada |
| 2006/0127735 A1 | 6/2006 | Sabin et al. |
| 2006/0151333 A1 | 7/2006 | Banek |
| 2006/0187614 A1 | 8/2006 | Ushio et al. |
| 2007/0067119 A1 | 3/2007 | Loewen et al. |
| 2007/0184711 A1 | 8/2007 | Thrap et al. |
| 2007/0215483 A1 | 9/2007 | Johansen et al. |
| 2007/0252556 A1 | 11/2007 | West et al. |
| 2008/0023321 A1 | 1/2008 | Sadoway |
| 2008/0044725 A1 | 2/2008 | Sadoway et al. |
| 2008/0050295 A1 | 2/2008 | Uchida et al. |
| 2008/0053838 A1 | 3/2008 | Yamaguchi et al. |
| 2008/0118428 A1 | 5/2008 | Awano et al. |
| 2008/0145755 A1 | 6/2008 | Iacovangelo et al. |
| 2008/0241689 A1 | 10/2008 | Takami et al. |
| 2008/0264565 A1 | 10/2008 | Sun et al. |
| 2008/0308415 A1 | 12/2008 | Hiltmann et al. |
| 2009/0011331 A1 | 1/2009 | Stringer et al. |
| 2009/0014320 A1 | 1/2009 | Chiang et al. |
| 2009/0029236 A1 | 1/2009 | Mailley et al. |
| 2009/0162736 A1 | 6/2009 | Vallance et al. |
| 2009/0208836 A1 | 8/2009 | Fuhr et al. |
| 2009/0212743 A1 | 8/2009 | Hagiwara et al. |
| 2009/0253017 A1 | 10/2009 | Larsen et al. |
| 2009/0297892 A1 | 12/2009 | Ijaz et al. |
| 2010/0028723 A1 | 2/2010 | Haba |
| 2010/0047671 A1 | 2/2010 | Chiang et al. |
| 2010/0058578 A1 | 3/2010 | Vallance et al. |
| 2010/0068610 A1 | 3/2010 | Sudworth |
| 2010/0089547 A1 | 4/2010 | King et al. |
| 2010/0119847 A1 | 5/2010 | Wu et al. |
| 2010/0154205 A1 | 6/2010 | Nakagawa et al. |
| 2010/0178532 A1 | 7/2010 | Shapiro et al. |
| 2010/0233518 A1 | 9/2010 | Kwon et al. |
| 2010/0240517 A1 | 9/2010 | Ashkin et al. |
| 2010/0243017 A1 | 9/2010 | Normann et al. |
| 2010/0291443 A1 | 11/2010 | Farmer |
| 2011/0014503 A1 | 1/2011 | Bradwell et al. |
| 2011/0014505 A1 | 1/2011 | Bradwell et al. |
| 2011/0020694 A1 | 1/2011 | Khakhalev et al. |
| 2011/0027624 A1 | 2/2011 | Deane et al. |
| 2011/0027627 A1 | 2/2011 | Deane et al. |
| 2011/0027633 A1 | 2/2011 | Deane et al. |
| 2011/0027637 A1 | 2/2011 | Deane et al. |
| 2011/0027638 A1 | 2/2011 | Deane et al. |
| 2011/0027639 A1 | 2/2011 | Deane et al. |
| 2011/0048066 A1 | 3/2011 | Gielda et al. |
| 2011/0050235 A1 | 3/2011 | Bogdan, Jr. et al. |
| 2011/0052968 A1 | 3/2011 | Venkataramani et al. |
| 2011/0086258 A1 | 4/2011 | Yaginuma et al. |
| 2011/0104570 A1 | 5/2011 | Galloway et al. |
| 2011/0111296 A1 | 5/2011 | Berdichevsky et al. |
| 2011/0135975 A1 | 6/2011 | Fuhr et al. |
| 2011/0144861 A1 | 6/2011 | Lakirovich et al. |
| 2011/0177413 A1 | 7/2011 | Tao et al. |
| 2011/0189520 A1 | 8/2011 | Carter et al. |
| 2011/0200848 A1 | 8/2011 | Chiang et al. |
| 2011/0262794 A1 | 10/2011 | Yoon |
| 2012/0003508 A1 | 1/2012 | Narbonne et al. |
| 2012/0003513 A1 | 1/2012 | Fuhr |
| 2012/0015235 A1 | 1/2012 | Fuhr et al. |
| 2012/0077095 A1 | 3/2012 | Roumi et al. |
| 2012/0086128 A1 | 4/2012 | Ponoth et al. |
| 2012/0091806 A1 | 4/2012 | Tsutsumi et al. |
| 2012/0094194 A1 | 4/2012 | Visco et al. |
| 2012/0104990 A1 | 5/2012 | Boysen et al. |
| 2012/0107675 A1 | 5/2012 | Kim et al. |
| 2012/0125784 A1 | 5/2012 | Berlin et al. |
| 2012/0129056 A1 | 5/2012 | Majima et al. |
| 2012/0146585 A1 | 6/2012 | Darcy |
| 2012/0161083 A1 | 6/2012 | Jha et al. |
| 2012/0171524 A1 | 7/2012 | Hiraiwa et al. |
| 2012/0183838 A1 | 7/2012 | An et al. |
| 2012/0190252 A1 | 7/2012 | Pavlinsky et al. |
| 2012/0191262 A1 | 7/2012 | Marcus |
| 2012/0194140 A1 | 8/2012 | Rijssenbeek et al. |
| 2012/0196170 A1 | 8/2012 | Ijaz et al. |
| 2012/0217032 A1 | 8/2012 | Beaupre et al. |
| 2012/0244404 A1 | 9/2012 | Obasih et al. |
| 2012/0244418 A1 | 9/2012 | Cheng et al. |
| 2012/0263988 A1 | 10/2012 | Obasih et al. |
| 2012/0264021 A1 | 10/2012 | Sugiura et al. |
| 2012/0265397 A1 | 10/2012 | Aliberti et al. |
| 2012/0282501 A1 | 11/2012 | Haynes et al. |
| 2012/0282508 A1 | 11/2012 | Bendert |
| 2012/0297772 A1 | 11/2012 | Mcbride et al. |
| 2012/0319653 A1 | 12/2012 | Kumar et al. |
| 2012/0328910 A1 | 12/2012 | La O' et al. |
| 2012/0328930 A1 | 12/2012 | Inagaki et al. |
| 2012/0328935 A1 | 12/2012 | Matsui et al. |
| 2013/0009602 A1 | 1/2013 | Hoff et al. |
| 2013/0017417 A1 | 1/2013 | Whitacre et al. |
| 2013/0022845 A1 | 1/2013 | Davis et al. |
| 2013/0022852 A1 | 1/2013 | Chang et al. |
| 2013/0029195 A1 | 1/2013 | Peace |
| 2013/0045408 A1 | 2/2013 | Sadoway et al. |
| 2013/0049466 A1 | 2/2013 | Adams et al. |
| 2013/0049478 A1 | 2/2013 | Wagoner et al. |
| 2013/0055559 A1 | 3/2013 | Slocum et al. |
| 2013/0057220 A1 | 3/2013 | Whitacre |
| 2013/0059176 A1 | 3/2013 | Stefani et al. |
| 2013/0059185 A1 | 3/2013 | Whitacre et al. |
| 2013/0065122 A1 | 3/2013 | Chiang et al. |
| 2013/0069001 A1 | 3/2013 | Luo et al. |
| 2013/0071306 A1 | 3/2013 | Camp et al. |
| 2013/0073234 A1 | 3/2013 | Leport et al. |
| 2013/0074485 A1 | 3/2013 | Mcbride et al. |
| 2013/0074488 A1 | 3/2013 | Mcbride et al. |
| 2013/0074940 A1 | 3/2013 | Mcbride et al. |
| 2013/0074941 A1 | 3/2013 | Mcbride et al. |
| 2013/0074949 A1 | 3/2013 | Mcbride et al. |
| 2013/0084474 A1 | 4/2013 | Mills |
| 2013/0119937 A1 | 5/2013 | Arseneault et al. |
| 2013/0130085 A1 | 5/2013 | Choi |
| 2013/0134928 A1 | 5/2013 | Uchihashi et al. |
| 2013/0136980 A1 | 5/2013 | Bartling |
| 2013/0143139 A1 | 6/2013 | Tao et al. |
| 2013/0145764 A1 | 6/2013 | Mcbride et al. |
| 2013/0149567 A1 | 6/2013 | Schaefer |
| 2013/0166085 A1 | 6/2013 | Cherian et al. |
| 2013/0183544 A1 | 7/2013 | Yoshioka et al. |
| 2013/0295435 A1 | 11/2013 | Vu |

(56) References Cited

U.S. PATENT DOCUMENTS

| | | |
|---|---|---|
| 2013/0315659 A1 | 11/2013 | Kumar et al. |
| 2014/0000251 A1 | 1/2014 | Mcbride et al. |
| 2014/0038011 A1 | 2/2014 | Fukunaga et al. |
| 2014/0038012 A1 | 2/2014 | Alimario et al. |
| 2014/0038038 A1 | 2/2014 | Vallance et al. |
| 2014/0099522 A1 | 4/2014 | Spatocco et al. |
| 2014/0113181 A1 | 4/2014 | Bradwell et al. |
| 2014/0162090 A1 | 6/2014 | Whitacre et al. |
| 2014/0176147 A1 | 6/2014 | Wiegman et al. |
| 2014/0220428 A1 | 8/2014 | Zinck et al. |
| 2014/0242466 A1 | 8/2014 | Murashi et al. |
| 2014/0248521 A1 | 9/2014 | Chiang et al. |
| 2014/0272481 A1 | 9/2014 | Chung et al. |
| 2014/0272508 A1 | 9/2014 | Musetti |
| 2014/0277791 A1 | 9/2014 | Lenard et al. |
| 2014/0315097 A1 | 10/2014 | Tan et al. |
| 2014/0349159 A1 | 11/2014 | Bartling et al. |
| 2014/0365027 A1 | 12/2014 | Namba et al. |
| 2015/0004455 A1 | 1/2015 | Bradwell et al. |
| 2015/0010792 A1 | 1/2015 | Amendola et al. |
| 2015/0015210 A1 | 1/2015 | Bradwell et al. |
| 2015/0037670 A1 | 2/2015 | Tanaka et al. |
| 2015/0093614 A1 | 4/2015 | Fukuhara et al. |
| 2015/0132627 A1 | 5/2015 | Bradwell et al. |
| 2015/0132628 A1 | 5/2015 | Bradwell et al. |
| 2015/0214579 A1 | 7/2015 | Boysen et al. |
| 2015/0249273 A1 | 9/2015 | Bradwell et al. |
| 2015/0249274 A1 | 9/2015 | Bradwell et al. |
| 2015/0280480 A1 | 10/2015 | Mitri et al. |
| 2015/0303525 A1 | 10/2015 | Bradwell et al. |
| 2015/0318586 A1 | 11/2015 | Rahmane et al. |
| 2015/0325821 A1 | 11/2015 | Bradwell et al. |
| 2015/0380713 A1 | 12/2015 | Kimura et al. |
| 2016/0006090 A1 | 1/2016 | Licht |
| 2016/0156068 A1 | 6/2016 | Burke et al. |
| 2016/0172714 A1 | 6/2016 | Ouchi et al. |
| 2016/0186235 A1 | 6/2016 | Joseph et al. |
| 2016/0190607 A1 | 6/2016 | Wyser et al. |
| 2016/0211555 A9 | 7/2016 | Bradwell et al. |
| 2016/0254512 A1 | 9/2016 | Yin et al. |
| 2016/0301038 A1 | 10/2016 | Modest et al. |
| 2016/0336623 A1 | 11/2016 | Nayar et al. |
| 2016/0344066 A1 | 11/2016 | Sudworth et al. |
| 2016/0365612 A1 | 12/2016 | Bradwell et al. |
| 2016/0372763 A1 | 12/2016 | Lu et al. |
| 2017/0018811 A1 | 1/2017 | Bradwell et al. |
| 2017/0104244 A1 | 4/2017 | Bull et al. |
| 2017/0149095 A1 | 5/2017 | Amendola et al. |
| 2017/0222273 A1 | 8/2017 | Bradwell et al. |
| 2017/0248041 A1 | 8/2017 | Lenk et al. |
| 2017/0259648 A1 | 9/2017 | Putcha et al. |
| 2017/0263951 A1 | 9/2017 | Kanno et al. |
| 2017/0309979 A1 | 10/2017 | Lee et al. |
| 2017/0338451 A9 | 11/2017 | Bradwell et al. |
| 2017/0358941 A1 | 12/2017 | Mitri et al. |
| 2018/0034110 A1 | 2/2018 | Sudworth et al. |
| 2018/0083274 A1 | 3/2018 | Martin |
| 2018/0090726 A1 | 3/2018 | Thompson et al. |
| 2018/0097259 A1 | 4/2018 | Bradwell et al. |
| 2018/0191162 A1 | 7/2018 | Hanada et al. |
| 2019/0089013 A1 | 3/2019 | Ouchi et al. |
| 2019/0115632 A1 | 4/2019 | Beuning et al. |
| 2019/0123369 A1 | 4/2019 | Ma et al. |
| 2019/0296276 A1 | 9/2019 | Bradwell et al. |
| 2020/0076006 A1 | 3/2020 | Bradwell et al. |
| 2020/0176824 A1 | 6/2020 | Bradwell et al. |
| 2021/0036273 A1 | 2/2021 | Thompson et al. |
| 2021/0376394 A1 | 12/2021 | Bradwell et al. |
| 2022/0013835 A1 | 1/2022 | Bradwell et al. |

FOREIGN PATENT DOCUMENTS

| | | |
|---|---|---|
| CA | 2767920 A1 | 1/2011 |
| CA | 2811218 A1 | 3/2012 |
| CA | 2887201 A1 | 4/2014 |
| CH | 703320 B1 | 12/2011 |
| CN | 1429417 A | 7/2003 |
| CN | 1578553 A | 2/2005 |
| CN | 1743056 A | 3/2006 |
| CN | 1750309 A | 3/2006 |
| CN | 101436780 A | 5/2009 |
| CN | 101506117 A | 8/2009 |
| CN | 101519313 A | 9/2009 |
| CN | 101828285 A | 9/2010 |
| CN | 101942676 A | 1/2011 |
| CN | 201809448 U | 4/2011 |
| CN | 201908137 U | 7/2011 |
| CN | 102181883 A | 9/2011 |
| CN | 202076339 U | 12/2011 |
| CN | 102498589 A | 6/2012 |
| CN | 102646808 A | 8/2012 |
| CN | 103001239 A | 3/2013 |
| CN | 202797170 U | 3/2013 |
| CN | 103137916 A | 6/2013 |
| CN | 103342556 A | 10/2013 |
| CN | 103367663 A | 10/2013 |
| CN | 104364930 A | 2/2015 |
| CN | 105190984 A | 12/2015 |
| CN | 105659415 A | 6/2016 |
| CN | 105830247 A | 8/2016 |
| DE | 3239964 A1 | 5/1984 |
| DE | 19618609 A1 | 11/1997 |
| DE | 102012103386 A1 | 10/2013 |
| EP | 0078404 A2 | 5/1983 |
| EP | 0078404 A3 | 10/1985 |
| EP | 0327959 A1 | 8/1989 |
| EP | 0343333 A1 | 11/1989 |
| EP | 1096593 A2 | 5/2001 |
| EP | 1469536 A1 | 10/2004 |
| EP | 1548912 A1 | 6/2005 |
| EP | 2408083 A1 | 1/2012 |
| EP | 2416464 A2 | 2/2012 |
| EP | 2499507 A1 | 9/2012 |
| EP | 2665120 A1 | 11/2013 |
| EP | 2709188 A1 | 3/2014 |
| GB | 2062939 A | 5/1981 |
| JP | S4933815 B1 | 9/1974 |
| JP | S55053877 A1 | 4/1980 |
| JP | S61114664 A | 6/1986 |
| JP | H06223872 A | 8/1994 |
| JP | H06310171 A | 11/1994 |
| JP | H09167631 A | 6/1997 |
| JP | H1012270 A | 1/1998 |
| JP | H10208771 A | 8/1998 |
| JP | H117923 A | 1/1999 |
| JP | H11185800 A | 7/1999 |
| JP | 2001115369 A | 4/2001 |
| JP | 2001243994 A | 9/2001 |
| JP | 3355377 B2 | 12/2002 |
| JP | 2003146771 A | 5/2003 |
| JP | 2007157373 A | 6/2007 |
| JP | 2010206101 A | 9/2010 |
| JP | 2010214396 A | 9/2010 |
| JP | 2010535942 A | 11/2010 |
| JP | 2011508379 A | 3/2011 |
| JP | 2012124009 A | 6/2012 |
| JP | 2012226866 A | 11/2012 |
| JP | 2012533865 A | 12/2012 |
| JP | 2013055193 A | 3/2013 |
| JP | 2013537361 A | 9/2013 |
| JP | 2014154337 A | 8/2014 |
| JP | 2014526114 A | 10/2014 |
| JP | 2016510936 A | 4/2016 |
| JP | 2016535392 A | 11/2016 |
| KR | 20120059106 A | 6/2012 |
| RU | 2031491 C1 | 3/1995 |
| RU | 2013111960 A | 10/2014 |
| SG | 188400 A1 | 4/2013 |
| WO | WO-9965642 A1 | 12/1999 |
| WO | WO-0005774 A1 | 2/2000 |
| WO | WO-2008045996 A2 | 4/2008 |
| WO | WO-2008105807 A2 | 9/2008 |
| WO | WO-2008045996 A3 | 10/2008 |
| WO | WO-2008105811 A3 | 12/2008 |

(56) References Cited

FOREIGN PATENT DOCUMENTS

| | | |
|---|---|---|
| WO | WO-2009046533 A1 | 4/2009 |
| WO | WO-2009151639 A1 | 12/2009 |
| WO | WO-2010130583 A2 | 11/2010 |
| WO | WO-2011011056 A2 | 1/2011 |
| WO | WO-2011014242 A1 | 2/2011 |
| WO | WO-2011014243 A1 | 2/2011 |
| WO | WO-2011022390 A2 | 2/2011 |
| WO | WO-2011025574 A1 | 3/2011 |
| WO | WO-2011047067 A2 | 4/2011 |
| WO | WO-2011022390 A3 | 5/2011 |
| WO | WO-2011050924 A1 | 5/2011 |
| WO | WO-2011079548 A1 | 7/2011 |
| WO | WO-2011082659 A1 | 7/2011 |
| WO | WO-2011047067 A3 | 8/2011 |
| WO | WO-2011100686 A1 | 8/2011 |
| WO | WO-2011116236 A2 | 9/2011 |
| WO | WO-2011148347 A1 | 12/2011 |
| WO | WO-2011153312 A2 | 12/2011 |
| WO | WO-2012003649 A1 | 1/2012 |
| WO | WO-2012009145 A2 | 1/2012 |
| WO | WO-2012033692 A2 | 3/2012 |
| WO | WO-2012040176 A1 | 3/2012 |
| WO | WO-2011153312 A3 | 4/2012 |
| WO | WO-2012009145 A3 | 4/2012 |
| WO | WO-2012051790 A1 | 4/2012 |
| WO | WO-2012033692 A3 | 6/2012 |
| WO | WO-2012129827 A1 | 10/2012 |
| WO | WO-2012138576 A1 | 10/2012 |
| WO | WO-2012144344 A1 | 10/2012 |
| WO | WO-2012145314 A2 | 10/2012 |
| WO | WO-2012158751 A1 | 11/2012 |
| WO | WO-2012158781 A2 | 11/2012 |
| WO | WO-2013025608 A1 | 2/2013 |
| WO | WO-2013032667 A1 | 3/2013 |
| WO | WO-2013048704 A1 | 4/2013 |
| WO | WO-2013052494 A1 | 4/2013 |
| WO | WO-2014055873 A1 | 4/2014 |
| WO | WO-2014062702 A1 | 4/2014 |
| WO | WO-2014062706 A1 | 4/2014 |
| WO | WO-2014140792 A2 | 9/2014 |
| WO | WO-2014190318 A1 | 11/2014 |
| WO | WO-2015042295 A1 | 3/2015 |
| WO | WO-2015058010 A1 | 4/2015 |
| WO | WO-2015058165 A1 | 4/2015 |
| WO | WO-2015066359 A1 | 5/2015 |
| WO | WO-2016050329 A1 | 4/2016 |
| WO | WO-2016138499 A1 | 9/2016 |
| WO | WO-2016141354 A2 | 9/2016 |
| WO | WO-2018/052797 | 3/2018 |
| WO | WO-2018/187777 | 11/2018 |

OTHER PUBLICATIONS

Advisory Action Before Filing of Appeal Brief dated Jun. 8, 2012 for U.S. Appl. No. 12/839,130.

Agruss. The Thermally Regenarative Liquid-Metal Cell, J. Electrochem. Soc. Nov. 1963; 110(11):1097-1103.

Allanore, A. Features and Challenges of Molten Oxide Electrolytes for Metal Extraction. Journal of the Electrochemical Society, 162 (1): E13-E22 (2015). Published Nov. 25, 2014.

Allanore, et al. A new anode material for oxygen evolution in molten oxide electrolysis. Nature, vol. 497, May 16, 2013, pp. 353-356 and Online Methods Section. Published online May 8, 2013.

ATI Technical Data Sheet, ATI 18CrCb Stainless Steel, Feb. 17, 2014.

Atthey. A Mathematical Model for Fluid Flow in a Weld Pool at High Currents. J. Fluid Mech. 1980; 98(4):787-801.

Biswas, et al. Towards Implementation of Smart Grid: An Updated Review on Electrical Energy Storage Systems. Smart Grid and Renewable Energy. 2013; 4:122-132. Published online Feb. 2013.

Bradwell, et al. Magnesium-antimony liquid metal battery for stationary energy storage. J Am Chem Soc. Feb. 1, 2012;134(4): 1895-7. doi: 10.1021/ja209759s. Published on web Jan. 6, 2012.

Bradwell, et al. Recycling ZnTe, CdTe, and Other Compound Semiconductors by Ambipolar Electrolysis. J. Am. Chem. Soc., 2011, 133, 19971-19975. Published Oct. 28, 2011.

Bradwell, et al. Supporting Information: Recycling ZnTe, CdTe, and other compound semiconductors by ambipolar electrolysis. J. Am. Chem. Soc., 2011, 133, S1-S8. Published Oct. 28, 2011.

Bradwell, et al. Supporting Material: Magnesium-antimony liquid metal battery for stationary energy storage. J Am Chem Soc. Feb. 1, 2012;134(4):S1-S11. doi: 10.1021/ja209759s. Published on web Jan. 6, 2012.

Bradwell. Liquid metal batteries: ambipolar electrolysis and alkaline earth electroalloying cells. Thesis. Massachusetts Institute of Technology. Dept. of Materials Science and Engineering. 2011.

Bradwell. Technical and economic feasibility of a high-temperature self-assembling battery. Thesis. Department of Material Science and Engineering. MIT. 2006.

Cairns, et al. Galvanic Cells with Fused-Salt Electrolytes. AEC Research and Development. 220 pages, Nov. 1967.

Cairns, et al. High Temperature Batteries Research in high-temperature electrochemistry reveals compact, powerful energy-storage cells. Science. Jun. 20, 1969; 164(3886):1347-1355.

Cerablak™ technology. Atfi Surface Science Solutions. http://www.atfinet.com/index.php/technology. Accessed Feb. 24, 2016.

Chuang. Floating capacitor active charge balancing for PHEV application. Thesis. Ohio State University. 2010.

Co-pending U.S. Appl. No. 13/999,704, inventors David; S. Deak et al., filed Mar. 14, 2014.

Co-pending U.S. Appl. No. 15/628,538, inventor Bradwell; David J., filed Jun. 20, 2017.

Co-pending U.S. Appl. No. 16/740,178, inventors Nayarhari et al., filed Jan. 10, 2020.

Co-pending U.S. Appl. No. 17/136,432, inventors Nayarhari et al., filed Dec. 29, 2020.

Co-pending U.S. Appl. No. 17/510,056, inventors Bradwelldavid; J. et al., filed Oct. 25, 2021.

Co-pending U.S. Appl. No. 17/529,171, inventors Bradwelldavid; J. et al., filed Nov. 17, 2021.

Co-pending U.S. Appl. No. 17/670,168, inventors Thompsongreg et al., filed Feb. 11, 2022.

Crowley, B. New battery could be solar power's BFF video. http://money.cnn.com/video/technology/2012/08/16/bsg-liquid-metal-battery-energy.cnnmoney. CNN Money, 2012. Accessed Jun. 29, 2015.

Cubicciotti, et al. Metal-Salt Interactions at High Temperatures: The Solubilities of Some alkaline Earth Metals in their Halides. J. Am. Chem. Soc. 1949; 71(6):2149-2153.

Davis, J.R., Effect of temperature on properties. ASM specialty handbook—Copper and copper alloys. ASM international. 2001: pp. 430-439.

Donald Sadoway: The Colbert Report video. http://thecolbertreport.cc.com/videos/8uddyg/donald-sadoway. The Colbert Report, Oct. 22, 2012. Accessed Jun. 29, 2015.

Donald Sadoway: The missing link to renewable energy Youtube Video. https://www.youtube.com/watch?v=Sddb0Khx0yA. TED, Mar. 2012. Accessed Jun. 29, 2015.

Dworkin, et al. The Electrical Conductivity of Solutions of Metals in their Molten Halides. VIII. alkaline Earth Metal Systems. J. Phys. Chem. Jul. 1966; 70(7):2384.

Electroville: Grid-Scale Batteries. MIT Electroville: High Amperage Energy Storage Device—Energy for the Neighborhood. http://arpa-e.energy.gov/?q=slick-sheet-project/electroville-grid-scale-batteries. Accessed Jul. 2, 2015.

Electroville: High-Amperage Energy Storage Device—Energy Storage for the Neighborhood Project. U.S. Department of Energy Categorical Exclusion Determination Form. http://arpa-e.energy.gov/sites/default/files/25A1089%20MIT%20-%20Electroville.pdf. Accessed Jul. 2, 2015.

Energy 2064 with Professor Donald R. Sadoway Youtube Video. https://www.youtube.com/watch?v=0iwG32R2R50. Alger, Oct. 7, 2014. Accessed Jun. 29, 2015.

EP17851347.9 Extended European Search Report Dated Mar. 16, 2020.

(56) References Cited

OTHER PUBLICATIONS

EP18194103.0 Extended European Search Report dated Mar. 19, 2019.
EP18781400.9 Extended European Search Report dated Dec. 11, 2020.
"European Extended Search Report and opinion dated May 29, 2017 for EP Application No. 14857245.".
European search report and search opinion dated Feb. 12, 2014 for EP Application No. 13196841.4.
European search report and search opinion dated May 6, 2016 for EP Application No. 13847926.
European search report and search opinion dated May 13, 2016 for EP Application No. 13846301.
European supplemental search report and opinion dated Mar. 16, 2017 for EP Application No. 14853610.
Fujiwara, et al. New molten salt systems for high temperature molten salt batteries: Ternary and quaternary molten salt systems based on LiF-LiCl, LiF-LiBr, and LiCl-LiBr. Journal of Power Sources. Apr. 15, 2011; 196(8):4012-4018.
Gay, et al. Lithium/Chalcogen Secondary Cells for Components in Electric Vehicular-Propulsion Generating Systems. Argonne National Laboratory, Argonne, Illinois, ANL-7863, 62 pages, Jan. 1972.
GE Energy Storage Durathon Battery Durathon E620 Battery Module Technical Specifications. Available at http://www.geenergystorage.com/images/ge/PDF/DurathonGridE620ModuleSpecSheet.pdf. 2012, Accessed on Oct. 18, 2012.
GE Energy Storage Durathon DC System Technical Specifications—MWh Series, 2014. Accessed Apr. 7, 2015. https://renewables.gepower.com/content/dam/gepower-renewables/global/en_US/documents/Durathon_DCMWh_Spec_Sheet_GEA-988123002A.pdf.
Hall-heroult cell. Wikimedia Commons. Accessed Nov. 10, 2014. http://commons.wikimedia.org/wiki/File:Hall-heroult-kk-2008-12-31.png. Dec. 30, 2008.
Intermetallic—Wikipedia Website. https://en.wikipedia.org/wiki/Intermetallic. Accessed Jul. 2, 2015.
International preliminary report on patentability and written opinion dated Jan. 24, 2012 for PCT Application No. US2010/002035.
International preliminary report on patentability and written opinion dated Feb. 17, 2009 for PCT Application No. US2007/018168.
International preliminary report on patentability and written opinion dated Mar. 26, 2013 for PCT Application No. US2011/052316.
International preliminary report on patentability and written opinion dated Apr. 7, 2015 for PCT Application No. US2013/063472.
International preliminary report on patentability and written opinion dated Apr. 21, 2015 for PCT Application No. US2013/065086.
International preliminary report on patentability and written opinion dated Apr. 21, 2015 for PCT Application No. US2013/065092.
International preliminary report on patentability and written opinion dated Sep. 15, 2015 for PCT Application No. IB2014/000617.
International preliminary report on patentability and written opinion dated Nov. 24, 2015 for PCT Application No. US2014/039439.
International preliminary report on patentability dated Mar. 31, 2016 for PCT Application No. PCT/US2014/056367.
International preliminary report on patentability dated Apr. 28, 2016 for PCT Application No. PCT/US2014/060979.
International preliminary report on patentability dated Apr. 28, 2016 for PCT Application No. PCT/US2014/061266.
International preliminary report on patentability dated May 12, 2016 for PCT Application No. PCT/US2014/0063222.
International search report and written opinion dated Jan. 22, 2015 for PCT Application No. US2014/061266.
International search report and written opinion dated Jan. 23, 2015 for PCT Application No. PCT/US2014/056367.
International search report and written opinion dated Jan. 24, 2014 for PCT/US2013/065086.
International search report and written opinion dated Jan. 27, 2014 for PCT Application No. US2013/063472.
International search report and written opinion dated Jan. 29, 2015 for PCT Application No. US2014/060979.
International search report and written opinion dated Feb. 7, 2011 for PCT/US2010/002035.
International search report and written opinion dated Jun. 1, 2016 for PCT/US2016/019970.
International search report and written opinion dated Jun. 11, 2015 for PCT Application No. IB2014/002608.
International search report and written opinion dated Sep. 7, 2016 for PCT/US2016/021048.
International search report and written opinion dated Sep. 18, 2008 for PCT/US2007/018168.
International search report and written opinion dated Oct. 20, 2014 for PCT Application No. US2014/039439.
International search report and written opinion dated Dec. 26, 2013 for PCT Application No. US2013/065092.
International search report and written opinion dated Dec. 29, 2011 for PCT/US2011/052316.
International search report and written opnion dated Feb. 13, 2015 for PCT Application No. US2014/063222.
International search report dated Oct. 15, 2014 for PCT Application No. IB2014/000617.
Jarret, et al. Advances in the Smelting of aluminum. Metallurgical Treatises, pp. 137-157, 1981.
Javadekar, et al. Energy Storage in Electrochemical Cells with Molten Sb Electrodes. Journal of the Electrochemical Society, 159 (4) A386-A389 (2012); Jan. 24, 2012 http://repository.upenn.edu/cgi/viewcontent.cgi?article=1170&context=cbe_papers.
Jungblut, et al. Diffusion of lithium in highly oriented pyrolytic graphite at low concentrations and high temperatures. Phys Rev B Condens Matter. Dec. 1, 1989;40(16):10810-10815.
Kane, et al. Electrochemical Determination of the Thermodynamic Properties of Lithium-Antimony Alloys. Journal of the Electrochemical Society, 162 (3) A421-A425 (2015). Published Dec. 31, 2014.
Kaufman, J.G., Application of aluminum alloys and tempers. Introduction to aluminum alloys and tempers—Preface. ASM International. 2000; pp. 87-118.
Kaufman, J.G., Properties and Characteristics of Aluminum and Aluminum Alloys. Fire Resistance of Aluminum and Aluminum Alloys and Measuring the Effects of Fire Exposure on the Properties of Aluminum Alloys. 2016. 9 Pages.
Kelley, et al. Mixing in a liquid metal electrode. Physics of Fluids 26, 2014, 057102, pp. 1-12. Published online May 20, 2014.
Kim, et al. Calcium-bismuth electrodes for large-scale energy storage (liquid metal batteries). Journal of Power Sources, vol. 241, 2013, pp. 239-248. Available online Apr. 19, 2013.
Kim, et al. Electrolysis of Molten Iron Oxide with an Iridium Anode: The Role of Electrolyte Basicity. Journal of the Electrochemical Society, 158 (10) E101-E105 (2011). Published Aug. 5, 2011.
Kim, et al. Liquid Metal Batteries: Past, Present, and Future. Chemical Reviews, vol. 113, No. 3, Mar. 13, 2013, pp. 2075-2099. Published on web Nov. 27, 2012.
Kipouros, et al. Toward new technologies for the production of Lithium. JOM, May 1998, pp. 24-26.
Lalau, et al. Sodium-bismuth-lead low temperature liquid metal battery. Journal for Electrochemistry and Plating Technology, Jun. 2015, pp. 1-7.
Lee, et al., Oxidation Behavior of Copper at a Temperature below 300 and the Methodology for Passivation. Materials Research. 2016; 19(1): 51-56.
Li, et al. High Performance Liquid Metal Battery with Environmentally Friendly Antimony-Tin Positive Electrode. ACS Appl Mater Interfaces. May 25, 2016;8(20):12830-5. doi: 10.1021/acsami.6b02576. Epub May 5, 2016.With supporting information.
Li, et al. Liquid Metal Electrodes for Energy Storage Batteries. Advanced Energy Materials (2016) 6:1600483-1-19. DOI: 10.1002/aenm.201600483. Published May 31, 2016.
Liquid Metal Battery Research Company website. http://www.lmbrc.com/. 2015. Accessed Jul. 7, 2015.
Liquid-metal batteries get boost from molten lead. Nature news website. Sep. 21, 2014. Accessed Dec. 9, 2014. http://www.nature.com/news/liquid-metal-batteries-get-boost-from-molten-lead-1.15967.

(56) References Cited

OTHER PUBLICATIONS

Magnuski, H. Innovations in Energy Storage—Professor Sadoway Video. https://vimeo.com/20906061. MIT Club of Northern California, Mar. 8, 2011. Accessed Jun. 29, 2015.
McAlister, A. J. The Al—Li (Aluminum-Lithium) System. Bulletin of Alloy Phase Diagrams, vol. 3, No. 2, 1982, pp. 177-178. doi: 10.1007/BF02892377.
Merriam-Webster's Medical Dictionary Website. http://merriam-webster.com/medical/room%20temperature. Apr. 2009.
MIT Electroville—Liquid Metal Battery wesite. http://www.ct-si.org/events/EnergyInnovation/showcase/popt.html?id=198. 2011. Accessed Jul. 2, 2015.
Molten metal batteries aimed at the grid. BBC News website. Sep. 21, 2014. Accessed Dec. 9, 2014. http://www.bbc.com/news/science-environment-29284934.
NAS Sodium Sulfur Battery Energy Storage System website, accessed Jul. 13, 2015. https://www.ngk.co.jp/nas/specs/#topto_specs.
Ning, et al. Self-healing Li—Bi liquid metal battery for grid-scale energy storage. Journal of Power Sourches 275 (2015) 370-376. Available online Oct. 29, 2014.
Norbert Weber et al., Sloshing instability and electrolyte layer rupture in liquid metal batteries. arxiv.org, Cornell university library, 201 OLIN library cornell university ithaca, NY 14853, Dec. 12, 2016, XP081362128.
Notice of allowance dated Jan. 6, 2015 for U.S. Appl. No. 13/237,215.
Notice of allowance dated Jan. 11, 2018 for U.S. Appl. No. 15/136,337.
Notice of allowance dated Mar. 8, 2016 for U.S. Appl. No. 13/801,333.
Notice of allowance dated Mar. 12, 2015 for U.S. Appl. No. 12/839,130.
Notice of allowance dated Apr. 6, 2015 for U.S. Appl. No. 13/801,333.
Notice of allowance dated Apr. 11, 2017 for U.S. Appl. No. 14/688,214.
Notice of allowance dated Apr. 13, 2017 for U.S. Appl. No. 14/688,179.
Notice of allowance dated Apr. 20, 2012 for U.S. Appl. No. 12/505,937.
Notice of allowance dated Apr. 22, 2014 for U.S. Appl. No. 12/839,130.
Notice of allowance dated Apr. 30, 2015 for U.S. Appl. No. 13/801,333.
"Notice of allowance dated May 11, 2017 for U.S. Appl. No. 14/688,214".
Notice of allowance dated Jul. 5, 2016 for U.S. Appl. No. 14/178,806.
Notice of allowance dated Jul. 13, 2012 for U.S. Appl. No. 11/839,413.
"Notice of allowance dated Jul. 17, 2017 for U.S. Appl. No. 14/688,214".
Notice of allowance dated Jul. 25, 2016 for U.S. Appl. No. 14/286,369.
"Notice of allowance dated Jul. 28, 2017 for U.S. Appl. No. 14/688,214".
Notice of allowance dated Jul. 31, 2015 for U.S. Appl. No. 13/801,333.
Notice of allowance dated Aug. 2, 2012 for U.S. Appl. No. 12/505,937.
Notice of allowance dated Aug. 22, 2016 for U.S. Appl. No. 14/536,549.
"Notice of allowance dated Sep. 11, 2017 for U.S. Appl. No. 15/289,857".
Notice of allowance dated Sep. 18, 2015 for U.S. Appl. No. 13/801,333.
"Notice of allowance dated Sep. 28, 2017 for U.S. Appl. No. 14/688,214".
Notice of allowance dated Oct. 4, 2017 for U.S. Appl. No. 15/136,337.
Notice of allowance dated Oct. 7, 2016 for U.S. Appl. No. 14/178,806.
Notice of allowance dated Oct. 19, 2017 for U.S. Appl. No. 14/688,214.
Notice of allowance dated Nov. 17, 2017 for U.S. Appl. No. 15/136,337.
Notice of allowance dated Dec. 11, 2015 for U.S. Appl. No. 13/801,333.
Notice of allowance dated Dec. 20, 2017 for U.S. Appl. No. 15/136,337.
Notice of allowance dated Mar. 22, 2017 for U.S. Appl. No. 14/536,563.
"Notice of allowance dated Aug. 31, 2018 for U.S. Appl. No. 15/057,732".
Nuvation BMS—Grid Energy Storage. Battery Management System for Grid Energy Storage. Accessed Nov. 11, 2015. http://www.nuvation.com/battery-management-system/bms-for-grid-energy-storage-platforms.
Nuvation BMS A Scalable and highly configurable battery management system for grid energy storage systems, 2014. http://nuvation.wpengine.netdna-cdn.com/img/nuvation-bms-web/downloads/NuvationBMS_Grid-Energy_20140922.pdf. Accessed Feb. 4, 2015.
Nuvation BMS Battery Management Systems. http://www.nuvation.com/battery-management-system. Accessed Feb. 4, 2015.
Nuvation BMS. Grid Battery Controller Battery Management Solution for Multi-Stack Grid-Scale Energy Storage Systems. 2015.
Nuvation Engineering Electronic Product Design Newsletter dated Jul. 9, 2014. http://us4.campaign-archive1.com/?u=d41c6a8dd772177f8c2976a94&id=d288872315&e=724575b634. Accessed Feb. 4, 2015.
Nuvation Engineering Electronic Product Design Newsletter dated Sep. 9, 2014. http://us4.campaign-archive1.com/?u=d41c6a8dd772177f8c2976a94&id=610713e05f&e=e9700170fc. Accessed Feb. 4, 2015.
Office action—Requirement for Restriction Election dated Aug. 13, 2015 for U.S. Appl. No. 14/045,967.
Office action dated Jan. 5, 2012 for U.S. Appl. No. 12/839,130.
Office action dated Jan. 10, 2014 for U.S. Appl. No. 12/839,130.
"Office action dated Feb. 5, 2016 for U.S. Appl. No. 14/536,549.".
Office action dated Mar. 14, 2014 for U.S. Appl. No. 13/237,215.
Office action dated Mar. 16, 2012 for U.S. Appl. No. 12/839,130.
"Office action dated Mar. 27, 18 for U.S. Appl. No. 15/140,434.".
"Office action dated Apr. 18, 2018 for U.S. Appl. No. 14/975,587.".
"Office action dated Apr. 20, 2018 for U.S. Appl. No. 15/057,732.".
"Office action dated May 1, 2017 for U.S. Appl. No. 14/678,602.".
Office action dated May 13, 2011 for U.S. Appl. No. 11/839,413.
Office action dated Jun. 7, 2016 for U.S. Appl. No. 14/045,967.
"Office action dated Jun. 7, 2018 for U.S. Appl. No. 14/687,838.".
"Office action dated Jun. 15, 2017 for U.S. Appl. No. 14/687,838".
"Office action dated Jun. 25, 2018 for U.S. Appl. No. 15/063,842.".
Office action dated Jun. 30, 2016 for U.S. Appl. No. 14/536,563.
Office action dated Aug. 21, 2014 for U.S. Appl. No. 12/839,130.
"Office action dated Aug. 30, 2017 for U.S. Appl. No. 14/975,587".
Office action dated Sep. 3, 2014 for U.S. Appl. No. 13/801,333.
"Office action dated Sep. 5, 2017 for U.S. Appl. No. 15/140,434".
Office action dated Oct. 4, 2011 for U.S. Appl. No. 11/839,413.
Office action dated Nov. 5, 2015 for U.S. Appl. No. 14/178,806.
Office action dated Nov. 9, 2015 for U.S. Appl. No. 14/286,369.
Office action dated Nov. 13, 2017 for U.S. Appl. No. 14/678,602.
Office action dated Nov. 18, 2016 for U.S. Appl. No. 14/688,179.
Office action dated Nov. 22, 2016 for U.S. Appl. No. 14/688,214.
Office action dated Nov. 24, 2015 for U.S. Appl. No. 14/045,967.
Office action dated Dec. 5, 2014 for U.S. Appl. No. 12/839,130.
Office action dated Dec. 11, 2012 for U.S. Appl. No. 13/588,741.
Ouchi, et al. Calcium-Antimony Alloys as Electrodes for Liquid Metal Batteries. Journal of the Electrochemical Society. 2014; 161(12):A1898-A1904. Published Sep. 9, 2014.
Ouchi, et al. Calcium-based multi-element chemistry for grid-scale electrochemical energy storage. Nat Commun. Mar. 22, 2016;7:10999. doi: 10.1038/ncomms10999.With supplementary materials.
"Spatocco, et al. Low-Temperature Molten Salt Electrolytes for Membrane-Free Sodium Metal Batteries. Published Oct. 20, 2015, available at http://jes.ecsdl.org/content/162/14/A2729.full.pdf+html".
PCT/US2017/050544 International Search Report dated Apr. 24, 2018.
PCT/US2018/026601 International Search Report dated Jul. 30, 2018.
PCT/US2019/066231 International Search Report and Written Opinion dated Mar. 2, 2020.
Pflanz, K. A Liquid Layer Solution for the Grid. http://energy.gov/articles/liquid-layer-solution-grid. Sep. 15, 2011. Accessed Jul. 2, 2015.

(56) References Cited

OTHER PUBLICATIONS

Pongsaksawad, et al. Phase-Field Modeling of Transport-Limited Electrolysis in Solid and Liquid States. Journal of the Electrochemical Society, 154 (6) pp. F122-F133, 2007. Available electronically Apr. 18, 2007.
Powell, et al. Modeling electrochemistry in metallurgical processes. Chemistry and Materials Science; JOM Journal of the Minerals, Metals and Materials Society vol. 59, No. 5 (2007), 35-43, DOI: 10.1007/s11837-007-0063-y http://lyre.mit.edu/~powell/papers/jom-0705-35-43.pdf.
Qingsong; Wang et al., "Thermal Runaway Caused Fire and Explosion of Lithium Ion Battery", Journal of Power Sources, 2012, 208, 210-224.
Response After Final Rejection dated Apr. 27, 2012 for U.S. Appl. No. 12/839,130.
RU2031491C1 English translation. Nikolaev et al., Russia. Mar. 20, 1995.
Sadoway, D. The Electrochemical Processing of Refractory Metals. JOM, Jul. 1991, pp. 15-19.
Sadoway, Donald R. A Technical Feasibility Study of Steelmaking by Molten Oxide Electrolysis Presentation. Presented at 9th AISI/DOE TRP Industry Briefing Session, Oct. 10, 2007, Salt Lake City. http://steeltrp.com/Briefing07slides/09-TRP9956_MIT-07IBS.pdf.
Sadoway, Donald R. Electrochemical Pathways Towards Carbon-Free Metals Production Presentation. Presented at GCEP Carbon Management in Manufacturing Industries workshop, Apr. 15-16, 2008, Stanford University. http://gcep.stanford.edu/pdfs/2RK4ZjKBF2f71uM4uriP9g/SadowayGCEP_reduced.pdf.
Sadoway, Donald R. New opportunities for metals extraction and waste treatment by electrochemical processing in molten salts. J. Mater. Res., vol. 10, No. 3, Mar. 1995, pp. 487-492.
Sadoway, Donald R. New opportunities for waste treatment by electrochemical processing in molten salts. Metals and Materials Waste Reduction, Recovery and Remediation, Edited by K.C. Liddell, R.G. Bautista and R.J. Orth, The Minerals, Metals & Materials Society, 1994, pp. 73-76.
Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3. Available online Jan. 14, 2004.
Sadoway, et al. Innovation in Energy Storage: What I Learned in 3.091 was all I Needed to Know video. http://video.mit.edu/watch/innovation-in-energy-storage-what-i-learned-in-3091-was-all-i-needed-to-know-9601/. MIT Technology Day 2010, Jun. 5, 2010. (Originally posted at http://mitworld.mit.edu/video/800. Archived at http://archive.is/http://mitworld.mit.edu/video/800.) Accessed Jun. 29, 2015.
Salois, Gretchen. Pursuing Metal Purity. Aug. 26, 2013, Modern Metals Website. Accessed Sep. 18, 2015. http://www.modernmetals.com/item/11618-pursuing-metal-purity.html.
Shannon. Revised effective ionic radii and systematic studies of interatomic distances in halides and chalcogenides. Acta Crystallographica Section A: Crystal Physics, Diffraction, Theoretical and General Crystallography. Mar. 9, 1976; A32:751-767.
Shimotake, et al. Bimetallic Galvanic Cells With Fused-Salt Electrolytes. Advances in Energy Conversion Engineering. pages 951-962. 1967 Intersociety Energy Conversion Engineering Conference. American Society of Mechanical Engineers, 1967.
Shimotake, et al. Secondary Cells with Lithium Anodes and Immobilized Fused-Salt Electrolytes. I & EC ProcessDesign and Development, vol. 8, No. 1, Jan. 1969, pp. 51-56.
Sodium Sulfur-Battery Definition; Wikipedia website. Accessed Sep. 3, 2015. https://en.wikipedia.org/wiki/Sodium%E2%80%93sulfur_battery.
Spatocco, et al. Cost-based discovery for engineering solutions. pp. 1-43. Adv. in Electrochemical Science and Technology (vol. XV), Feb. 9, 2015.

Staller, A. The Real Science of an Alkali Metal Explosion. The Electrochemical Society, Jan. 28, 2015. Accessed Apr. 20, 2015. http://www.ecsblog.org/uncategorized/the-real-science-behind-an-alkali-metal-explosion/.
Supplemental Amendment After Final Rejection dated May 15, 2012 for U.S. Appl. No. 12/839,130.
The Colbert Report. Donald Sadoway interview. Oct. 22, 2012. http://www.colbertnation.com/full-episodes/mon-october-22-2012-donald-sadoway.
U.S. Appl. No. 15/647,468 Notice of Allowance dated Oct. 2, 2019.
U.S. Appl. No. 14/687,838 Notice of Allowance dated Nov. 26, 2019.
U.S. Appl. No. 14/975,587 Notice of Allowance dated Jan. 9, 2019.
U.S. Appl. No. 14/975,587 Notice of Allowance dated Mar. 15, 2019.
U.S. Appl. No. 14/975,587 Notice of Allowance dated Oct. 9, 2018.
U.S. Appl. No. 15/057,732 Notice of Allowance dated Oct. 10, 2018.
U.S. Appl. No. 15/063,842 Office Action dated Feb. 17, 2021.
U.S. Appl. No. 15/063,842 Office Action dated Feb. 26, 2019.
U.S. Appl. No. 15/063,842 Office Action dated May 27, 2020.
U.S. Appl. No. 15/063,842 Office Action dated Sep. 20, 2019.
U.S. Appl. No. 15/130,129 Office Action dated Dec. 6, 2018.
U.S. Serial No. 15/130, 129 Office Action dated Jul. 3, 2019.
U.S. Serial No. 15/130, 129 Office Action dated Jul. 9, 2020.
U.S. Appl. No. 15/130,292 Office Action dated Jan. 24, 2020.
U.S. Appl. No. 15/130,292 Office Action dated Mar. 20, 2019.
U.S. Appl. No. 15/130,292 Office Action dated Nov. 19, 2018.
U.S. Appl. No. 15/140,434 Office Action dated Jun. 12, 2019.
U.S. Appl. No. 15/140,434 Office Action dated Sep. 19, 2018.
U.S. Appl. No. 15/647,468 Notice of Allowance dated Oct. 24, 2019.
U.S. Appl. No. 15/647,468 Office Action dated Jun. 5, 2019.
U.S. Appl. No. 15/690,863 Notice of Allowance dated Jan. 22, 2020.
U.S. Appl. No. 15/690,863 Office Action dated May 17, 2019.
U.S. Appl. No. 15/836,038 Notice of Allowance dated Jan. 9, 2019.
U.S. Appl. No. 16/202,758 Notice of Allowance dated Nov. 8, 2019.
U.S. Appl. No. 16/202,758 Notice of Allowance dated Oct. 7, 2019.
U.S. Appl. No. 16/293,288 Office Action dated Sep. 28, 2021.
U.S. Appl. No. 16/592,621 Notice of Allowance dated Feb. 23, 2022.
U.S. Appl. No. 16/592,621 Office Action dated Jul. 6, 2021.
U.S. Appl. No. 16/593,278 Notice of Allowance dated Mar. 24, 2022.
U.S. Appl. No. 16/718,020 Notice of Allowance dated Jul. 28, 2021.
U.S. Appl. No. 16/829,965 Notice of Allowance Nov. 19, 2021.
U.S. Serial No. 16/858, 189 Notice of Allowance dated Aug. 18, 2021.
Vassiliev, et al. A new proposal for the binary (Sn, Sb) phase diagram and its thermodynamic properties based on a new e.m.f study Journal of Alloys and Compounds 247 (1997) 223-233.
Villar, et al. Assessment of high-temperature self-assembling battery implementation based on the aluminum smelting process. Massachusetts Institute of Technology, Dept. of Materials Science and Engineering, Thesis, 2010. http://hdl.handle.net/1721.1/62677.
Wang, et al. Lithium-antimony-lead liquid metal battery for grid-level energy storage. Nature. Oct. 16, 2014;514(7522):348-50. doi: 10.1038/nature13700. Epub Sep. 21, 2014.
Weaver, et al. The Sodium1Tin Liquid-Metal Cell. J. Electrochem. Soc., 109 (8), 653-657 (Aug. 1962).
Wesoff, E. Video: MIT's Don Sadoway and Energy Storage on the Colbert Report. http://www.greentechmedia.com/articles/read/Video-MITs-Don-Sadoway-and-Energy-Storage-on-the-Colbert-Report. Oct. 24, 2012. Accessed Jul. 2, 2015.
Written opinion of the International Search Authority dated Oct. 15, 2014 for PCT Application No. IB2014/000617.
Xue, et al. Ionic Liquid Redox Catholyte for high Energy Efficiency, Low-cost Energy Storage. Advanced Energy Materials 2015, vol. 5, Issue 12,1500271, Published online Apr. 17, 2015.
Yu, et al. Determination of the Lithium Ion Diffusion Coefficient in Graphite. J. Electrochem. Soc. 1999 volume 146, issue 1, 8-14.

(56) References Cited

OTHER PUBLICATIONS

ZHANG; et al. Pyrite FeS2 as an efficient adsorbent of lithium polysulfide for improved lithium-sulfur batteries. Journal of Materials Chemistry A, vol. 4, Feb. 23, 2016, pp. 4371-4374. doi: 10.1039/C6TA01214K. With supporting information.

BATTERY MANAGEMENT SYSTEMS FOR ENERGY STORAGE DEVICES

CROSS-REFERENCE

This application is a continuation of U.S. application Ser. No. 17/136,432, filed Dec. 29, 2020, which is a continuation of U.S. application Ser. No. 15/130,129, filed Apr. 15, 2016, which is a continuation of International Application No. PCT/US2014/061266, filed Oct. 17, 2014, which claims the benefit of U.S. Provisional Application No. 61/892,326, filed Oct. 17, 2013, which are entirely incorporated herein by reference.

BACKGROUND

A battery is a device capable of converting chemical energy into electrical energy. Batteries are used in many household and industrial applications. In some instances, batteries are rechargeable such that electrical energy, which may be converted from non-electrical energy (e.g., mechanical energy), is capable of being stored in the battery as chemical energy.

There are generally two types of batteries: disposable batteries (primary batteries), which are designed to be used once and discarded, and rechargeable batteries (secondary batteries), which are designed to be recharged and used multiple times. There are various shapes and sizes of batteries, such as, for example, miniature cells used to power small electronic devices, and large batteries, which may be used to provide power for computer data centers.

Various devices can be configured for use at elevated temperatures (e.g., greater than about 100° C. or 300° C.). Examples of such devices include liquid metal batteries (e.g., comprising liquid metal electrodes), which are devices capable of converting stored chemical energy into electrical energy.

Energy storage devices (e.g., batteries) may be used within an electric power grid or as part of a standalone system. Batteries may be used in many household and industrial applications. Batteries can be charged from an electric power source (e.g., electric power produced by a renewable energy resource such as wind or solar) for later discharge when there is a demand for electrical energy consumption.

SUMMARY

While batteries are presently available, recognized herein are various limitations associated with such batteries. For example, rechargeable batteries may not be able to retain a given energy density after a certain number of charge/discharge cycles, making the long term use of these devices practically infeasible. While some batteries may have longer operating lifetimes than others, such batteries may not have an energy density that is suited for commercial use.

Recognized herein is the need for improved batteries and systems for operating such batteries. Also recognized herein is a need for methods for detecting a failure or fault condition in an electrochemical energy storage device, such as a liquid metal battery. The failure condition can be a breach. The breach can include a fault in the seal of the electrochemical cell which allows a gas from an atmosphere to contact the materials inside the housing of the electrochemical cell.

Provided herein are methods for detecting a failure or fault condition in an electrochemical energy storage device, such as a seal breach, using an electrical signature. In some cases, a breached cell is inactivated, cooled, discharged and/or replaced.

The present disclosure also provides energy storage systems comprising energy storage devices (e.g., electrochemical systems and/or high temperature energy storage devices such as, for example, liquid metal batteries) and battery management systems for monitoring and/or regulating the energy storage devices (e.g., liquid metal batteries). A liquid metal battery can include one or more electrochemical cells ("cells") in a parallel and/or serial configuration. A battery management system can be programmed or otherwise configured to regulate the operation (e.g., charging, discharging, cell balancing, routing current) of the energy storage device (e.g., liquid metal battery). The battery management system can regulate the charging and discharging of the cells in tandem (or substantially in tandem) when the cells are connected together in series or parallel. The battery management system can monitor the operation of the energy storage device. The battery management system can be programmed or otherwise configured to use dynamic impedance control.

For serial operation, the battery management system can include voltage sensing of cells and ballasting provisions that are connected to the battery management system through ballasting lines. In some examples, the ballasting lines are electrical wires. The impedance of the ballasting lines, however, can impact the amount of voltage drop across the lines. The impedance of these lines can vary with temperature and in accordance with the material used in the lines. Because the impedance of the ballasting lines can vary with temperature, and because the temperature of an electrochemical system (e.g., a liquid metal battery) can vary during use, the impedance of the ballasting lines can vary during operation of the liquid metal battery. In some situations, algorithms of the battery management system that regulate the operation of the liquid metal battery using an assumed impedance of the ballasting lines (e.g., an impedance at room temperature) may arrive at erroneous results at higher operating temperatures. A battery management system can include hardware and software to dynamically compensate for variations in impedance. The software can be fixed in a non-volatile storage medium, such as a memory location. This can advantageously enable algorithms of the battery management system that regulate cell balancing to have a reliable metric of impedance on the sensing lines, and to thereby control balancing current appropriately.

An aspect of the disclosure relates to a method for regulating an energy storage device comprising at least one electrochemical cell comprising a negative electrode, positive electrode and an electrolyte between the negative and positive electrodes, the method comprising: (a) measuring, with the aid of a temperature sensor in thermal communication with the electrochemical cell, an operating temperature of the electrochemical cell, wherein at least one of the negative electrode, positive electrode and electrolyte are in a liquid state at the operating temperature; (b) calculating, with the aid of a battery management system, an impedance of a current flow path leading through the electrochemical cell using a correspondence between impedance and temperature stored in a memory location of the battery management system; and (c) calculating, with the aid of the battery management system, a state of charge of the electrochemical cell using the impedance calculated in (b) and a current measured through the electrochemical cell.

Another aspect of the disclosure relates to a method for detecting a breach of an electrochemical cell, the method comprising: (a) providing an electrochemical cell comprising a negative electrode, an electrolyte and a positive electrode, wherein at least one of the negative electrode, the electrolyte and the positive electrode is in a liquid state at an operating temperature of the electrochemical cell that is at least about 250° C., and wherein a seal isolates the negative electrode, the electrolyte and the positive electrode from an environment external to the electrochemical cell; (b) monitoring the electrochemical cell for an electrical signature that is indicative of a breach of the seal and exposure of at least one of the positive electrode, the electrolyte, and the negative electrode to the environment; and (c) in response to the electrical signature, inactivating the electrochemical cell, cooling the electrochemical cell, discharging the electrochemical cell and/or notifying a system operator.

Another aspect of the disclosure relates to a computer readable medium comprising machine-executable code that, upon execution by one or more computer processors implements a method for detecting a breach of an electrochemical cell, the method comprising: (a) providing an electrochemical cell comprising a negative electrode, an electrolyte and a positive electrode, wherein at least one of the negative electrode, the electrolyte and the positive electrode is in a liquid state at an operating temperature of the electrochemical cell, wherein a seal isolates the negative electrode, the electrolyte and the positive electrode from an environment external to the electrochemical cell, and wherein the operating temperature of the electrochemical cell is at least about 250° C.; (b) monitoring the electrochemical cell for an electrical signature that is indicative of a breach of the seal and exposure of at least one of the positive electrode, the electrolyte, and the negative electrode to the environment; and (c) in response to the electrical signature, inactivating the electrochemical cell, cooling the electrochemical cell, discharging the electrochemical cell and/or notifying a system operator.

Another aspect of the disclosure provides an energy storage system, comprising: (a) an electrochemical cell comprising a negative electrode, an electrolyte and a positive electrode, wherein at least one of the negative electrode, the electrolyte and the positive electrode is in a liquid state at an operating temperature of the electrochemical cell that is at least about 250° C., and wherein a seal isolates the negative electrode, the electrolyte and the positive electrode from an environment external to the electrochemical cell; and (b) a controller that (i) monitors the electrochemical cell for an electrical signature that is indicative of a breach of the seal and exposure of at least one of the positive electrode, the electrolyte and the negative electrode to the environment, and (ii) in response to the electrical signature, inactivates the electrochemical cell, cools the electrochemical cell, discharges the electrochemical cell and/or notifies a system operator.

Another aspect of the disclosure is directed to a system for regulating an energy storage device comprising at least one electrochemical cell having a negative electrode, a positive electrode and an electrolyte between the negative and positive electrodes, wherein at least one of the negative electrode, the electrolyte and the positive electrode of the electrochemical cell is in a liquid state at an operating temperature of the electrochemical cell that is at least about 250° C. The system comprises at least one controller in electrical communication with the energy storage device, wherein the at least one controller is programmed to (i) monitor a first parameter that is indicative of an operating state of the electrochemical cell, (ii) determine a second parameter of the electrochemical cell based on the first parameter, and (iii) in response to the second parameter, control the operating state of the electrochemical cell.

Another aspect of the disclosure relates to a system that comprises an energy storage device comprising at least one electrochemical cell having a negative electrode, a positive electrode and an electrolyte between the negative and positive electrodes, wherein at least one of the negative electrode, the electrolyte and the positive electrode of the electrochemical cell is in a liquid state at an operating temperature of the electrochemical cell that is at least about 250° C., wherein the energy storage device is in electrical communication with a power grid, and wherein during use the energy storage device charges and/or discharges to the power grid. The system further comprises at least one controller in electrical communication with the energy storage device and programmed to monitor and/or regulate the energy storage device, wherein the at least one controller is predominantly powered from the power grid and/or a backup power system.

A further aspect of the disclosure relates to a system that comprises an energy storage device comprising at least one electrochemical cell having a negative electrode, a positive electrode and an electrolyte between the negative and positive electrodes, wherein at least one of the negative electrode, the electrolyte and the positive electrode of the electrochemical cell is in a liquid state at an operating temperature of the electrochemical cell that is at least about 250° C. The system further comprises at least one controller in electrical communication with the energy storage device and programmed to (i) monitor an operating state of the energy storage device, which operating state includes the operating temperature and a voltage of the electrochemical cell, and (ii) regulate the energy storage device in response to monitoring the operating state. The at least one controller is programmed such that if the operating temperature is at least 50° C. less than a predetermined operating temperature of the energy storage device, the controller does not use the voltage to regulate the energy storage device.

An aspect of the present disclosure provides a method for detecting a breach of an electrochemical cell, comprising providing an electrochemical cell comprising a negative electrode, an electrolyte and a positive electrode, wherein at least one, any two or all of the negative electrode, the electrolyte and the positive electrode is in a liquid state at an operating temperature of the electrochemical cell, where a seal isolates the negative electrode, the electrolyte and the positive electrode from an environment external to the electrochemical cell, and where the operating temperature of the electrochemical cell is at least about 250° C. In some cases, the electrochemical cell can be monitored for an electrical signature that is indicative of a breach of the seal and exposure of at least one of the positive electrode, the electrolyte, and the negative electrode to the environment. In response to the electrical signature, the electrochemical cell can be inactivated, cooled and/or discharged.

In another aspect of the present disclosure, a method for regulating an energy storage device comprising at least one electrochemical cell comprising a negative electrode, positive electrode and an electrolyte between the negative and positive electrodes is provided. At least one, any two or all of the negative electrode, positive electrode and electrolyte are in a liquid state at the operating temperature. The method comprises measuring, with the aid of a temperature sensor in thermal communication with the electrochemical cell, an operating temperature of the electrochemical cell. Next, with the aid of a battery management system, an impedance of a current flow path leading through the electrochemical cell can be calculated using a correspondence between impedance and temperature stored in a memory location of the battery management system. Next, with the aid of the battery management system, a state of charge of the electrochemical cell can be calculated using the calculated impedance and a current measured through the electrochemical cell.

Another aspect of the present disclosure provides machine executable code that, upon execution by one or more computer processors, implements any of the methods above or elsewhere herein. For example, the machine executable code can implement a method for regulating an energy storage device comprising at least one electrochemical cell that has a negative electrode, positive electrode and an electrolyte between the negative and positive electrodes. At least one, any two or all of the negative electrode, positive electrode and electrolyte can be in a liquid state at the operating temperature. The method can include measuring, with the aid of a temperature sensor in thermal communication with the electrochemical cell, an operating temperature of the electrochemical cell. Next, with the aid of a battery management system, an impedance of a current flow path leading through the electrochemical cell can be calculated using a correspondence between impedance and temperature stored in a memory location of the battery management system. Next, with the aid of the battery management system, a state of charge of the electrochemical cell can be calculated using the calculated impedance and a current measured through the electrochemical cell.

Another aspect of the present disclosure provides a computer system (e.g., battery management system) comprising one or more computer processors and memory coupled to the one or more computer processors. The memory comprises machine executable code that, upon execution by the one or more computer processors, implements any of the methods herein. For example, the machine executable code can implement a method for regulating an energy storage device comprising at least one electrochemical cell comprising a negative electrode, positive electrode and an electrolyte between the negative and positive electrodes. At least one, any two or all of the negative electrode, positive electrode and electrolyte can be in a liquid state at the operating temperature. The method comprises measuring, with the aid of a temperature sensor in thermal communication with the electrochemical cell, an operating temperature of the electrochemical cell. Next, with the aid of a battery management system, an impedance of a current flow path leading through the electrochemical cell can be calculated using a correspondence between impedance and temperature stored in a memory location of the battery management system. Next, with the aid of the battery management system, a state of charge of the electrochemical cell can be calculated using the calculated impedance and a current measured through the electrochemical cell.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

DETAILED DESCRIPTION

Figure 1:
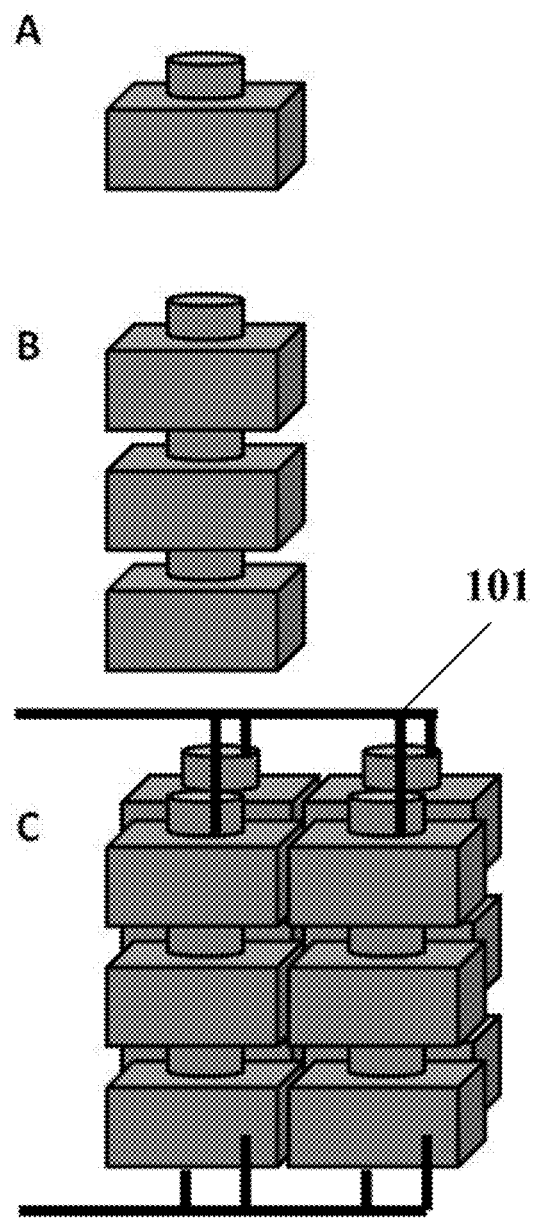
FIG. 1 is an illustration of an electrochemical cell (A) and a compilation (e.g., battery) of electrochemical cells (B and C)

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

The term "cell," as used herein, generally refers to an electrochemical cell. A cell can include a negative electrode of material 'A' and a positive electrode of material 'B', denoted as A∥B. The positive and negative electrodes can be separated by an electrolyte. A cell can also include a housing, one or more current collectors, and a high temperature electrically isolating seal. In some cases, a cell can be about 4 inches wide, about 4 inches deep and about 2.5 inches tall. In some cases, a cell can be about 8 inches wide, about 8 inches deep and about 2.5 inches tall. In some examples, any given dimension (e.g., height, width or depth) of an electrochemical cell can be at least about 1, 2, 2.5, 3, 3.5, 4, 4.5, 5, 5.5, 6, 6.5, 7, 7.5, 8, 8.5, 9, 9.5, 10, 12, 14, 16, 18 or 20 inches. In an example, a cell (e.g., each cell) can have dimensions of about 4 inches×4 inches×2.5 inches. In another example, a cell (e.g., each cell) can have dimensions of about 8 inches×8 inches×2.5 inches. In some cases, a cell may have about at least about 70 Watt-hours of energy storage capacity. In some cases, a cell may have at least about 300 Watt-hours of energy storage capacity.

The term "module," as used herein, generally refers to cells that are attached together in parallel by, for example, mechanically connecting the cell housing of one cell with the cell housing of an adjacent cell (e.g., cells that are connected together in an approximately horizontal packing plane). In some cases, the cells are connected to each other by joining features that are part of and/or connected to the cell body (e.g., tabs protruding from the main portion of the cell body). A module can include a plurality of cells in parallel. A module can comprise any number of cells, e.g., at least about 2, 3, 4, 5, 6, 7, 8, 9, 10, 11, 12, 13, 14, 15, 16, 17, 18, 19, 20, or more cells. In some cases, a module comprises at least about 4, 9, 12, or 16 cells. In some cases, a module is capable of storing about 700 Watt-hours of energy and/or delivering at least about 175 Watts of power. In some cases, a module is capable of storing at least about 1080 Watt-hours of energy and/or delivering at least about 500 Watts of power. In some cases, a module is capable of storing at least about 1080 Watt-hours of energy and/or delivering at least about 200 Watts (e.g., about 500 Watts) of power. In some cases, a module can include a single cell.

The term "pack," as used herein, generally refers to modules that are attached through different electrical connections (e.g., vertically). A pack can comprise any number of modules, e.g., at least about 1, 2, 3, 4, 5, 6, 7, 8, 9, 10, 11, 12, 13, 14, 15, 16, 17, 18, 19, 20, or more modules. In some cases, a pack comprises at least about 3 modules. In some cases, a pack is capable of storing at least about 2 kilo-Watt-hours of energy and/or delivering at least about 0.4 kilo-Watts (e.g., at least about 0.5 kilo-Watts or 1.0 kilo-Watts) of power. In some cases, a pack is capable of storing at least about 3 kilo-Watt-hours of energy and/or delivering at least about 0.75 kilo-Watts (e.g., at least about 1.5 kilo-Watts) of power. In some cases, a pack comprises at least about 6 modules. In some cases, a pack is capable of storing about 6 kilo-Watt-hours of energy and/or delivering at least about 1.5 kilo-Watts (e.g., about 3 kilo-Watts) of power.

The term "core," as used herein generally refers to a plurality of modules or packs that are attached through different electrical connections (e.g., in series and/or parallel). A core can comprise any number of modules or packs, e.g., at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, or more packs. In some cases, the core also comprises mechanical, electrical, and thermal systems that allow the core to efficiently store and return electrical energy in a controlled manner. In some cases, a core comprises at least about 12 packs. In some cases, a core is capable of storing at least about 25 kilo-Watt-hours of energy and/or delivering at least about 6.25 kilo-Watts of power. In some cases, a core comprises at least about 36 packs. In some cases, a core is capable of storing at least about 200 kilo-Watt-hours of energy and/or delivering at least about 40, 50, 60, 70, 80, 90 or 100 kilo-Watts or more of power.

The term "core enclosure" or "CE," as used herein, generally refers to a plurality of cores that are attached through different electrical connections (e.g., in series and/or parallel). A CE can comprise any number of cores, e.g., at least about 1, 2, 3, 4, 5, 6, 7, 8, 9, 10, 11, 12, 13, 14, 15, 16, 17, 18, 19, 20, or more cores. In some cases, the CE contains cores that are connected in parallel with appropriate bypass electronic circuitry, thus enabling a core to be disconnected while continuing to allow the other cores to store and return energy. In some cases, a CE comprises at least 4 cores. In some cases, a CE is capable of storing at least about 100 kilo-Watt-hours of energy and/or delivering about 25 kilo-Watts of power. In some cases, a CE comprises 4 cores. In some cases, a CE is capable of storing about 100 kilo-Watt-hours of energy and/or delivering about 25 kilo-Watts of power. In some cases, a CE is capable of storing about 400 kilo-Watt-hours of energy and/or delivering at least about 80 kilo-Watts, e.g., at least or about 80, 100, 120, 140, 160, 180 or 200 kilo-Watts or more of power.

The term "system," as used herein, generally refers to a plurality of cores or CEs that are attached through different electrical connections (e.g., in series and/or parallel). A system can comprise any number of cores or CEs, e.g., at least about 2, 3, 4, 5, 6, 7, 8, 9, 10, 11, 12, 13, 14, 15, 16, 17, 18, 19, 20, or more cores. In some cases, a system comprises 20 CEs. In some cases, a system is capable of storing about 2 mega-Watt-hours of energy and/or delivering at least about 400 kilo-Watts (e.g., about 500 kilo-Watts or about 1000 kilo-Watts) of power. In some cases, a system comprises 5 CEs. In some cases, a system is capable of storing about 2 mega-Watt-hours of energy and/or delivering at least about 400 kilo-Watts, e.g., at least about 400, 500, 600, 700, 800, 900, 1000 kilo-Watts or more of power.

A group of cells (e.g., a core, a CE, a system, etc.) with a given energy capacity and power capacity (e.g., a CE or a system capable of storing a given amount of energy) may be configured to deliver at least about 10%, at least about 20%, at least about 30%, at least about 40%, at least about 50%, at least about 60%, at least about 70%, at least about 80%, at least about 90%, at least about 95%, or about 100% of a given (e.g., rated) power level. For example, a 1000 kW system may be capable of also operating at 500 kW, but a 500 kW system may not be able to operate at 1000 kW. In some cases, a system with a given energy capacity and power capacity (e.g., a CE or a system capable of storing a given amount of energy) may be configured to deliver less than about 100%, less than about 110%, less than about 125%, less than about 150%, less than about 175%, or less than about 200% of a given (e.g., rated) power level, and the like. For example, the system may be configured to provide more than its rated power capacity for a period of time that is less than the time it may take to consume its energy capacity at the power level that is being provided (e.g., provide power that is greater than the rated power of the system for a period of time corresponding to less than about 1%, less than about 10% or less than about 50% of its rated energy capacity).

The term "battery," as used herein, generally refers to one or more electrochemical cells connected in series and/or parallel. A battery can comprise any number of electrochemical cells, modules, packs, cores, CEs or systems. A battery may undergo at least one charge/discharge or discharge/charge cycle ("cycle").

The term "charge cut-off voltage" or "CCV," as used herein, generally refers to the voltage at which a cell is fully or substantially fully charged, such as a voltage cut-off limit used in a battery when cycled in a constant current mode.

The term "discharge cut-off voltage," as used herein, generally refers to the voltage at which a cell is fully or substantially fully discharged, such as a minimum voltage cut-off limit used in a battery when discharged in a constant current cycling mode.

The term "open circuit voltage" or "OCV," as used herein, generally refers to the voltage of a cell (e.g., fully or partially charged) when it is disconnected from any circuit or external load (i.e., when no current is flowing through the cell).

The term "voltage" or "cell voltage," as used herein, generally refers to the voltage of a cell (e.g., at any state of charge or charging/discharging condition). In some cases, voltage or cell voltage may be the open circuit voltage. In some cases, the voltage or cell voltage can be the voltage during charging or during discharging.

Voltages of the present disclosure may be taken or represented with respect to reference voltages, such as ground (0 volt (V)), or the voltage of the opposite electrode in an electrochemical cell.

The term "state of charge or discharge," "state of charge" or "SOC," as used herein, is generally directly related to the voltage of a cell. In some cases, the state of charge or discharge, state of charge or SOC may refer to the voltage of the cell with respect to another voltage, such as, for example, cell voltage after charging or cell voltage upon commencement of discharging.

The term "direct metal-to-metal joining" or "direct metal-to-metal joint," as used herein, generally refers to an electrical connection where two metal surfaces are brought into contact (e.g., by forming a braze or a weld). In some examples, direct metal-to-metal joints do not include wires.

The term "interconnect," as used herein, generally refers to any electrical connection other than a direct metal-to-metal joint. Interconnects can include wires or bent sheet metal components designed to pass current. Interconnects may be compliant (e.g., flexible).

The term "wire," as used herein, generally refers to any cord, strip, or elongated electrical conduit. Wires can be flexible. As used herein, a braided metal strip is a wire. In some cases, a busbar is a wire.

The term "electronically," as used herein, generally refers to a situation in which electrons can readily flow between two or more components with little resistance. Components that are in electronic communication with one another can be in electrical communication with one another.

The term "vertical," as used herein, generally refers to a direction that is parallel to the gravitational acceleration vector.

Electrochemical Cells, Devices and Systems

The present disclosure provides electrochemical energy storage devices (e.g., batteries) and systems. In some examples, an electrochemical cell is a liquid metal battery cell. In some examples, a liquid metal battery cell can include a liquid electrolyte arranged between a negative liquid (e.g., molten) metal electrode and a positive liquid (e.g., molten) metal, metalloid and/or non-metal electrode. In some cases, a liquid metal battery cell has a molten alkaline earth metal (e.g., magnesium, calcium) or alkali metal (e.g., lithium, sodium, potassium) negative electrode, an electrolyte, and a molten metal positive electrode. The molten metal positive electrode can include, for example, one or more of tin, lead, bismuth, antimony, tellurium and selenium. For example, the positive electrode can include Pb or a Pb—Sb alloy. The positive electrode can also include one or more transition metals or d-block elements (e.g., Zn, Cd, Hg) alone or in combination with other metals, metalloids or non-metals, such as, for example, a Zn—Sn alloy or Cd—Sn alloy. In some examples, the positive electrode can comprise a metal or metalloid that has only one stable oxidation state (e.g., a metal with a single or singular oxidation state). Any description of a metal or molten metal positive electrode, or a positive electrode, herein may refer to an electrode including one or more of a metal, a metalloid and a non-metal. The positive electrode may contain one or more of the listed examples of materials. In an example, the molten metal positive electrode can include lead and antimony. In some examples, the molten metal positive electrode may include an alkali or alkaline earth metal alloyed in the positive electrode.

In some cases, an electrochemical cell is a high temperature battery that utilizes a liquid metal negative electrode (e.g., Na, Li), and a solid ion-conducting (e.g., β"-alumina ceramic) electrolyte. In some instances, the solid ion-conducting electrolyte operates above about 100° C., above about 150° C., above about 200° C., above about 250° C., above about 300° C., or above about 350° C. The electrolyte may comprise molten chalcogenide (e.g., S, Se, Te) and/or a molten salt comprising a transition metal halide (e.g., $NiCl_3$, $FeCl_3$). The electrolyte may include other supporting electrolyte compounds (e.g., NaCl, NaF, NaBr, NaI).

Any description of a metal or molten metal positive electrode, or a positive electrode, herein may refer to an electrode including one or more of a metal, a metalloid and a non-metal. The positive electrode can contain one or more of the listed examples of materials. In an example, the molten metal positive electrode can include lead and antimony. In some examples, the molten metal positive electrode can include an alkali or alkaline earth metal alloyed in the positive electrode.

An electrochemical energy storage device can include a liquid metal negative electrode, a liquid metal positive electrode, and a liquid salt electrolyte separating the liquid metal negative electrode and the liquid metal positive electrode. The negative electrode can include an alkali or alkaline earth metal, such as lithium, sodium, potassium, rubidium, cesium, magnesium, barium, calcium, or combinations thereof. The positive electrode can include elements selected from transition metals or d-block elements (e.g., Group 12), Group IIIA, IVA, VA and VIA of the periodic table of the elements, such as zinc, cadmium, mercury, aluminum, gallium, indium, silicon, germanium, tin, lead, pnicogens (e.g., arsenic, bismuth and antimony), chalcogens (e.g., sulfur, tellurium and selenium), or combinations thereof. In some examples, the positive electrode comprises a Group 12 element of the periodic table of the elements, such as one or more of zinc (Zn), cadmium (Cd) and mercury (Hg). In some examples, the positive electrode comprises one or more of Zn, Cd, Hg, or such material(s) in combination with other metals, metalloids or non-metals, such as, for example, a Zn—Sn alloy, Zn—Sn alloy, Cd—Sn alloy, Zn—Pb alloy, Zn—Sb alloy, or Bi.

The electrolyte can include a salt (e.g., molten salt), such as an alkali or alkaline earth metal salt. The alkali or alkaline earth metal salt can be a halide, such as a fluoride, chloride, bromide, or iodide of the active alkali or alkaline earth metal, or combinations thereof. In an example, the electrolyte (e.g., in Type 1 or Type 2 chemistries) includes lithium chloride. In some examples, the electrolyte can comprise sodium fluoride (NaF), sodium chloride (NaCl), sodium bromide (NaBr), sodium iodide (NaI), lithium fluoride (LiF), lithium chloride (LiCl), lithium bromide (LiBr), lithium iodide (LiI), potassium fluoride (KF), potassium chloride (KCl), potassium bromide (KBr), potassium iodide (KI), calcium fluoride ($CaF_2$), calcium chloride ($CaCl_2$), calcium bromide ($CaBr_2$), calcium iodide ($CaI_2$), or any combination thereof. In another example, the electrolyte includes magnesium chloride ($MgCl_2$). As an alternative, the salt of the active alkali metal can be, for example, a non-chloride halide, a hydroxide, or a combination thereof. The electrolyte may exhibit low (e.g., minimal) electronic conductance (e.g., electronic shorting may occur through the electrolyte via valence reactions of $PbCl_2 \leftrightarrow PbCl_3$ which increases electronic conductance). For example, the electrolyte can have an electronic transference number (i.e., percentage of electrical (electronic and ionic) charge that is due to the transfer of electrons) of less than or equal to about 0.03% or 0.3%.

In some cases, the negative electrode and the positive electrode of an electrochemical energy storage device are in the liquid state at an operating temperature of the energy storage device. To maintain the electrodes in the liquid states, the battery cell may be heated to any suitable temperature. In some examples, the battery cell is heated to and/or maintained at a temperature of about 100° C., about 150° C., about 200° C., about 250° C., about 300° C., about 350° C., about 400° C., about 450° C., about 500° C., about 550° C., about 600° C., about 650° C., or about 700° C. The battery cell may be heated to and/or maintained at a temperature of at least about 100° C., at least about 150° C., at least about 200° C., at least about 250° C., at least about 300° C., at least about 350° C., at least about 400° C., at least about 450° C., at least about 500° C., at least about 550° C., at least about 600° C., at least about 650° C., at least about 700° C., at least about 800° C., or at least about 900° C. In such a case, the negative electrode, electrolyte and/or positive electrode can be in a liquid (or molten) state. In some situations, the battery cell is heated to between about 200° C. and about 600° C., between about 500° C. and about 550° C., or between about 450° C. and about 575° C.

The operating temperature can be selected such that it is sufficient to induce at least some of the electrode materials to liquefy. In some cases, the operating temperature is selected to liquefy the material of the negative electrode, electrolyte and the positive electrode. However, in some cases, at least one of the electrodes and the electrolyte may not be liquefied during operation of the cell. For instance, as an alternative, the operating temperature is selected to liquefy the material of the negative electrode and electrolyte, but not the positive electrode. As another alternative, the operating temperature is selected to liquefy the material of the positive electrode and electrolyte, but not the negative electrode.

In some implementations, the electrochemical cell or energy storage device may be at least partially or fully self-heated. For example, a battery may be sufficiently insulated, charged, discharged and/or conditioned at sufficient rates, and/or cycled a sufficient percentage of the time to allow the system to generate sufficient heat through inefficiencies of the cycling operation that cells are maintained at a given operating temperature (e.g., a cell operating temperature above the freezing point of at least one of the liquid components) without the need for additional energy to be supplied to the system to maintain the operating temperature.

Electrochemical cells of the disclosure may be adapted to cycle between charged (or energy storage) modes and discharged modes. In some examples, an electrochemical cell can be fully charged, partially charged or partially discharged, or fully discharged. The state of charge can be determined by the operating voltage of the electrochemical cell. In a discharged state, the operating voltage can be at a minimum, and in a charged state the operating voltage can be at a maximum. During charging, the operating voltage can increase and approach a maximum.

In some implementations, during a charging mode of an electrochemical energy storage device, electrical current received from an external power source (e.g., a generator or an electric power grid) may cause metal atoms in the metal positive electrode to release one or more electrons, dissolving into the electrolyte as a positively charged ion (i.e., cation). Simultaneously, cations of the same species can migrate through the electrolyte and may accept electrons at the negative electrode, causing the cations to transition to a neutral metal species, thereby adding to the mass of the negative electrode. The removal of the active metal species from the positive electrode and the addition of the active metal to the negative electrode stores electrochemical energy. In some cases, the removal of a metal from the positive electrode and the addition of its cation to the electrolyte can store electrochemical energy. In some cases, electrochemical energy can be stored through a combination of removal of the active metal species from the positive electrode and its addition to the negative electrode, and the removal of one or more metals (e.g., different metals) from the positive electrode and their addition to the electrolyte (e.g., as cations). During an energy discharge mode, an electrical load is coupled to the electrodes and the previously added metal species in the negative electrode can be released from the metal negative electrode, pass through the electrolyte as ions, and deposit as a neutral species in the positive electrode (and in some cases alloy with the positive electrode material), with the flow of ions accompanied by the external and matching flow of electrons through the external circuit/load. In some cases, one or more cations of positive electrode material previously released into the electrolyte can deposit as neutral species in the positive electrode (and in some cases alloy with the positive electrode material), with the flow of ions accompanied by the external and matching flow of electrons through the external circuit/load. This electrochemically facilitated metal alloying reaction discharges the previously stored chemical energy to the electrical load.

In a charged state, the negative electrode can include negative electrode material and the positive electrode can include positive electrode material. During discharging (e.g., when the battery is coupled to a load), the negative electrode material yields one or more electrons, and cations of the negative electrode material. In some implementations, the cations migrate through the electrolyte to the positive electrode material and react with the positive electrode material (e.g., to form an alloy). In some implementations, ions of the positive metal species (e.g., cations of the positive electrode material) accept electrons at the positive electrode and deposit as a metal on the positive electrode. During charging, in some implementations, the alloy at the positive electrode disassociates to yield cations of the negative electrode material, which migrate through the electrolyte to the negative electrode. In some implementations, one or more metal species at the positive electrode disassociates to yield cations of the negative electrode material in the electrolyte. In some examples, ions can migrate through an electrolyte from an anode to a cathode, or vice versa. In some cases, ions can migrate through an electrolyte in a push-pop fashion in which an entering ion of one type ejects an ion of the same type from the electrolyte. For example, during discharge, an alkali metal anode and an alkali metal chloride electrolyte can contribute an alkali metal cation to a cathode by a process in which an alkali metal cation formed at the anode interacts with the electrolyte to eject an alkali metal cation from the electrolyte into the cathode. The alkali metal cation formed at the anode in such a case may not necessarily migrate through the electrolyte to the cathode. The cation can be formed at an interface between the anode and the electrolyte, and accepted at an interface of the cathode and the electrolyte.

An electrochemical cell of the present disclosure can be a Type 1 or Type 2 cell, which can vary based on, and be characterized by, the composition of the active components (e.g., negative electrode, electrolyte and positive electrode), and based on the mode of operation of the cells (e.g., low voltage mode versus high voltage mode). Such modes of operation and related chemistries are described in, for example, U.S. patent application Ser. No. 14/286,369, which is entirely incorporated herein by reference.

In Type 1 mode (also "low voltage operation" mode herein), operation of a liquid metal battery cell can involve the utilization of symmetric or substantially symmetric electrode reactions in the form of an alloying/de-alloying electrochemical reaction. In some cases, in Type 1 mode a cell is operated at a voltage from about 0.4 V to 1.5 V. Here, there may be one active metal species which is present in the negative electrode, and/or the same active metal species may be present as an alloyed species in the positive electrode, and there is the only metal species that dissolves in or is extracted from the electrolyte during cell discharging and charging, respectively. The composition of the electrolyte therefore may not substantially change during the low voltage operation mode. Such mode of operation may provide a relatively low cell voltage, resulting in a relatively low energy density.

In an example Type 1 cell, upon discharging, cations formed at the negative electrode can migrate into the electrolyte. Concurrently, the electrolyte can provide a cation of the same species (e.g., the cation of the negative electrode material) to the positive electrode, which can reduce from a cation to a neutrally charged metallic species, and alloy with the positive electrode. In a discharged state, the negative electrode can be depleted (e.g., partially or fully) of the negative electrode material (e.g., Li, Na, K, Mg, Ca). During charging, the alloy at the positive electrode can disassociate to yield cations of the negative electrode material (e.g., $Li^+$, $Na^+$, $K^+$, $Mg^{2+}$, $Ca^{2+}$), which migrates into the electrolyte. The electrolyte can then provide cations (e.g., the cation of the negative electrode material) to the negative electrode, where the cations accept one or more electrons from an external circuit and are converted back to a neutral metal species, which replenishes the negative electrode to provide a cell in a charged state. A Type 1 cell can operate in a push-pop fashion, in which the entry of a cation into the electrolyte results in the discharge of the same cation from the electrolyte.

In some examples, a Type 1 cell includes a negative electrode comprising an alkali or alkaline earth metal (e.g., lithium, sodium, potassium, magnesium, calcium), and a positive electrode comprising a poor metal, or alloys of such metals, such as one or more of tin, lead, bismuth, antimony, tellurium and selenium. The negative electrode and positive electrode can be in a liquid (or molten) state at an operating temperature of the cell. The negative and positive electrodes can be separated by a salt electrolyte (e.g., alkali or alkaline earth metal halide salts).

In Type 2 mode (also "high voltage operation" mode herein), operation of a liquid metal battery cell involves a non-symmetric or substantially non-symmetric reaction where one metal species is electrochemically active at one electrode and a second metal species is electrochemically active at the other electrode, resulting in a net change in the composition of the electrolyte at different states of charge. This mode of operation can initiate new chemical reactions compared to the Type 1 mode of operation, in some cases resulting in, or otherwise utilizing, a relatively higher cell voltage (e.g., 1 V to 3 V). Type 2 mode of operation can offer the possibility of using a wider variety of active materials, and combination of such materials, as the electrochemistry of the cell.

In an example Type 2 cell, in a discharged state the electrolyte comprises cations of the negative electrode material (e.g., $Li^+$, $Na^+$, $K^+$, $Mg^{2+}$, $Ca^{2+}$), and the positive electrode comprises positive electrode material (e.g., Sb, Pb, Sn, Zn, Hg). During charging, a cation of the negative electrode material from the electrolyte accepts one or more electrons (e.g., from a negative current collector) to form the negative electrode comprising the negative electrode material. In some examples, the negative electrode material is liquid and wets into a foam (or porous) structure of the negative current collector. In some examples, negative current collector may not comprise foam (or porous) structure. In some examples, the negative current collector may comprise a metal, such as, for example, tungsten (e.g., to avoid corrosion from Zn), tungsten carbide or molybdenum negative collector not comprising Fe—Ni foam. Concurrently, positive electrode material from the positive electrode sheds electrons (e.g., to a positive current collector) and dissolves into the electrolyte as cations of the positive electrode material (e.g., $Sb^{3+}$, $Pb^{2+}$, $Sn^{2+}$, $Zn^{2+}$, $Hg^{2+}$). The concentration of the cations of the positive electrode material can vary in vertical proximity within the electrolyte (e.g., as a function of distance above the positive electrode material) based on the atomic weight and diffusion dynamics of the cation material in the electrolyte. In some examples, the cations of the positive electrode material are concentrated in the electrolyte near the positive electrode.

Although electrochemical cells of the present disclosure have been described, in some examples, as operating in a Type 1 mode or Type 2 mode, other modes of operation are possible. Type 1 mode and Type 2 mode are provided as examples and are not intended to limit the various modes of operation of electrochemical cells disclosed herein.

Batteries and Housings

Electrochemical cells of the disclosure can include housings that may be suited for various uses and operations. A housing can include one cell or a plurality of cells. A housing can be configured to electrically couple the electrodes to a switch, which can be connected to the external power source and/or the electrical load. The cell housing may include, for example, an electrically conductive container that is electrically coupled to a first pole of the switch and/or another cell housing, and an electrically conductive container lid (e.g., cell cap) that is electrically coupled to a second pole of the switch and/or another cell housing. The cell can be arranged within a cavity of the container. A first one of the electrodes of the cell (e.g., positive electrode) can contact and be electrically coupled with an endwall of the container. A second one of the electrodes of the cell (e.g., negative electrode) can contact and be electrically coupled with a conductive feed-through or conductor (e.g., negative current lead) on the container lid (collectively referred to herein as "cell lid assembly," "lid assembly" or "cap assembly" herein). An electrically insulating seal (e.g., bonded ceramic ring) may electrically isolate negative potential portions of the cell from positive portions of the container (e.g., electrically insulate the negative current lead from the positive current lead). In an example, the negative current lead and the container lid (e.g., cell cap) can be electrically isolated from each other, where a dielectric sealant material can be placed between the negative current lead and the cell cap. In some instances, the container lid is electrically isolated from the container. The cell lid may or may not be electrically isolated from the negative current lead in such instances. As an alternative, a housing includes an electrically insulating sheath (e.g., alumina sheath) or corrosion resistant and electrically conductive sheath or crucible (e.g., graphite sheath or crucible). In some cases, a housing and/or container may be a battery housing and/or container.

A cell can have any cell and seal configuration disclosed herein. For instance, the active cell materials can be held within a sealed steel/stainless steel container with a high temperature seal on the cell lid. A negative current lead can pass through the cell lid (and be sealed to the cell lid by the dielectric high temperature seal), and connect with a porous negative current collector (e.g., metal foam) suspended in an electrolyte. In some cases, the cell can use a graphite sheath, coating, crucible, surface treatment or lining (or any combination thereof) on the inner wall of the cell crucible. In other cases, the cell may not use a graphite sheath, coating, crucible, surface treatment or lining on an inner wall of the cell crucible. The container or container lining material may be electrically conductive.

A battery, as used herein, can comprise one or more (e.g., a plurality of) electrochemical cells. The cell(s) can include housings. Individual cells can be electrically coupled to one another in series and/or in parallel. In series connectivity, the positive terminal of a first cell is connected to a negative terminal of a second cell. In parallel connectivity, the positive terminal of a first cell can be connected to a positive terminal of a second, and/or additional, cell(s). Similarly, cell modules, packs, cores, CEs and systems can be connected in series and/or in parallel in the same manner as described for cells.

With reference to FIG. 1, an electrochemical cell (A) is a unit comprising an anode and a cathode. The cell may comprise an electrolyte and be sealed in a housing. In some cases, the electrochemical cells can be stacked (B) to form a battery (i.e., a compilation of one or more electrochemical cells). The cells can be arranged in parallel, in series, or both in parallel and in series (C). Further, cell modules, packs, cores, CEs and/or systems can be connected in series and/or in parallel. Interconnections 101 may connect individual cells and/or groups of cells.

Further, as described in greater detail elsewhere herein, the cells can be arranged in groups (e.g., modules, packs, cores, CEs, systems, or any other group comprising one or more electrochemical cells). In some cases, such groups of electrochemical cells may allow a given number of cells to be controlled or regulated together at the group level (e.g., in concert with or instead of regulation/control of individual cells).

Electrochemical cells of the disclosure (e.g., Type 1 cell operated in Type 2 mode, Type 1 cell operated in Type 1 mode, or Type 2 cell) may be capable of storing and/or receiving input of ("taking in") a suitably large amount of energy (e.g., substantially large amounts of energy). In some instances, a cell is capable of storing and/or taking in and/or discharging about 1 watt-hour (Wh), about 5 Wh, 25 Wh, about 50 Wh, about 100 Wh, about 250 Wh, about 500 Wh, about 1 kilo-Watt-hour (kWh), about 1.5 kWh, about 2 kWh, about 3 kWh, about 5 kWh, about 10 kWh, about 15 kWh, about 20 kWh, about 30 kWh, about 40 kWh, or about 50 kWh. In some instances, the battery is capable of storing and/or taking in and/or discharging at least about 1 Wh, at least about 5 Wh, at least about 25 Wh, at least about 50 Wh, at least about 100 Wh, at least about 250 Wh, at least about 500 Wh, at least about 1 kWh, at least about 1.5 kWh, at least about 2 kWh, at least about 3 kWh, at least about 5 kWh, at least about 10 kWh, at least about 15 kWh, at least about 20 kWh, at least about 30 kWh, at least about 40 kWh, or at least about 50 kWh. It is recognized that the amount of energy stored in an electrochemical cell and/or battery may be less than the amount of energy taken into the electrochemical cell and/or battery (e.g., due to inefficiencies and losses). A cell can have such energy storage capacities upon operating at any of the current densities herein.

A cell can be capable of providing a current at a current density of at least about 10 milliamperes per square centimeter ($mA/cm^2$), 20 $mA/cm^2$, 30 $mA/cm^2$, 40 $mA/cm^2$, 50 $mA/cm^2$, 60 $mA/cm^2$, 70 $mA/cm^2$, 80 $mA/cm^2$, 90 $mA/cm^2$, 100 $mA/cm^2$, 200 $mA/cm^2$, 300 $mA/cm^2$, 400 $mA/cm^2$, 500 $mA/cm^2$, 600 $mA/cm^2$, 700 $mA/cm^2$, 800 $mA/cm^2$, 900 $mA/cm^2$, 1 $A/cm^2$, 2 $A/cm^2$, 3 $A/cm^2$, 4 $A/cm^2$, 5 $A/cm^2$, or 10 $A/cm^2$, where the current density is determined based on the effective cross-sectional area of the electrolyte and where the cross-sectional area is the area that is orthogonal to the net flow direction of ions through the electrolyte during charge or discharging processes. In some instances, a cell can be capable of operating at a direct current (DC) efficiency of at least about 10%, 20%, 30%, 35%, 40%, 45%, 50%, 55%, 60%, 65%, 70%, 75%, 80%, 90%, 95% and the like. In some instances, a cell can be capable of operating at a charge efficiency (e.g., Coulombic charge efficiency) of at least about 10%, 20%, 30%, 40%, 50%, 60%, 70%, 80%, 85%, 90%, 95%, 98%, 99%, 99.5%, 99.9%, 99.95%, 99.99%, and the like.

In a charged state, electrochemical cells of the disclosure (e.g., Type 1 cell operated in Type 2 mode, Type 1 cell operated in Type 1 mode, or Type 2 cell) can have (or can operate at) a voltage of at least about 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V. In some cases, a cell can have an open circuit voltage (OCV) of at least about 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V. In an example, a cell has an open circuit voltage greater than about 0.5 V, greater than about 1 V, greater than about 2 V, or greater than about 3 V. In some cases, a charge cut-off voltage (CCV) of a cell is from about 0.5 V to 1.5 V, 1 V to 3 V, 1.5 V to 2.5 V, 1.5 V to 3 V, or 2 V to 3 V in a charged state. In some cases, a charge cut-off voltage (CCV) of a cell is at least about 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In some cases, a voltage of a cell (e.g., operating voltage) is between about 0.5 V and 1.5 V, 1 V and 2 V, 1 V and 2.5 V, 1.5 V and 2.0 V, 1 V and 3 V, 1.5 V and 2.5 V, 1.5 V and 3 V, or 2 V and 3 V in a charged state. A cell can provide such voltage(s) (e.g., voltage, OCV and/or CCV) upon operating at up to and exceeding about 10 cycles, 20 cycles, 30 cycles, 40 cycles, 50 cycles, 100 cycles, 200 cycles, 300 cycles, 400 cycles, 500 cycles, 600 cycles, 700 cycles, 800 cycles, 900 cycles, 1,000 cycles, 2,000 cycles, 3,000 cycles, 4,000 cycles, 5,000 cycles, 10,000 cycles, 20,000 cycles, 50,000 cycles, 100,000 cycles, or 1,000,000 or more cycles (also "charge/discharge cycles" herein). The cell can operate at various operating temperatures. Upon discharging, the cell can discharge to a voltage of about 0.6 V, 0.5 V, 0.4 V, 0.3 V, 0.2 V, 0.1 V or less.

An electrochemical cell of the present disclosure can have a response time of any suitable value (e.g., suitable for responding to disturbances in the power grid). In some instances, the response time is about 100 milliseconds (ms), about 50 ms, about 10 ms, about 1 ms, and the like. In some cases, the response time is at most about 100 milliseconds (ms), at most about 50 ms, at most about 10 ms, at most about 1 ms, and the like.

A compilation or array of cells (e.g., battery) can include any suitable number of cells, such as at least about 2, at least about 5, at least about 10, at least about 50, at least about 100, at least about 500, at least about 1000, at least about 5000, at least about 10000, and the like. In some examples, a battery includes 1, 2, 3, 4, 5, 6, 7, 8, 9, 10, 15, 20, 30, 40, 50, 60, 70, 80, 90, 100, 200, 300, 400, 500, 600, 700, 800, 900, 1000, 2000, 5000, 10,000, 20,000, 50,000, 100,000, 500,000, or 1,000,000 cells.

Batteries of the disclosure may be capable of storing and/or taking in a suitably large amount of energy (e.g., a substantially large amount of energy) for use with a power grid (i.e., a grid-scale battery) or other loads or uses. In some instances, a battery is capable of storing and/or taking in and/or discharging about 5 kilo-Watt-hour (kWh), about 25 kWh, about 50 kWh, about 100 kWh, about 500 kWh, about 1 mega-Watt-hour (MWh), about 1.5 MWh, about 2 MWh, about 3 MWh, about 5 MWh, about 10 MWh, about 25 MWh, about 50 MWh, or about 100 MWh. In some instances, the battery is capable of storing and/or taking in at least about 1 kWh, at least about 5 kWh, at least about 25 kWh, at least about 50 kWh, at least about 100 kWh, at least about 500 kWh, at least about 1 MWh, at least about 1.5 MWh, at least about 2 MWh, at least about 3 MWh, at least about 4 MWh, at least about 5 MWh, at least about 10 MWh, at least about 25 MWh, at least about 50 MWh, or at least about 100 MWh.

In some instances, the cells and cell housings are stackable. Any suitable number of cells can be stacked. Cells can be stacked side-by-side, on top of each other, or both. In some instances, at least about 3, 6, 10, 50, 100, or 500 cells are stacked. In some cases, a stack of 100 cells is capable of storing and/or taking in at least about 50 kWh of energy. A first stack of cells (e.g., 10 cells) can be electrically connected to a second stack of cells (e.g., another 10 cells) to increase the number of cells in electrical communication (e.g., 20 in this instance). In some instances, the energy storage device comprises a stack of 1 to 10, 11 to 50, 51 to 100, or more electrochemical cells.

An electrochemical energy storage device can include one or more individual electrochemical cells. An electrochemical cell can be housed in a container, which can include a container lid (e.g., cell cap) and seal component. The device can include at least 1, 2, 3, 4, 5, 6, 7, 8, 9, 10, 20, 30, 40, 50, 100, 200, 300, 400, 500, 1000, 10,000, 100,000 or 1,000,000 cells. The container lid may utilize, for example, a seal (e.g., annular dielectric gasket) to electrically isolate the container from the container lid. Such a component may be constructed from an electrically insulating material, such as, for example, glass, oxide ceramics, nitride ceramics, chalcogenides, or a combination thereof. The seal may be made hermetic by one or more methods.

Figure 2:
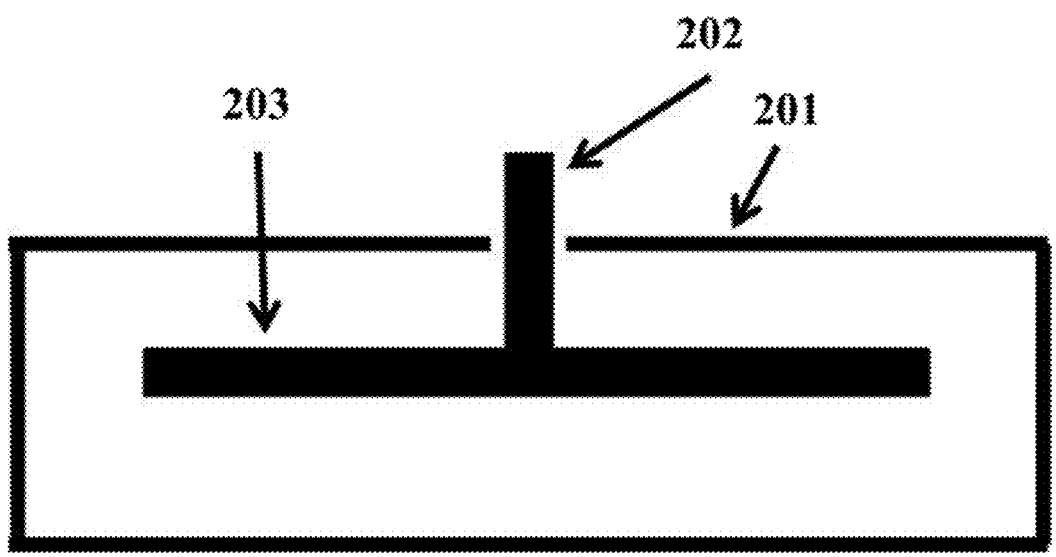
FIG. 2 is a schematic cross-sectional illustration of a housing having a conductor in electrical communication with a current collector passing through an aperture in the housing.

FIG. 2 schematically illustrates a battery that comprises an electrically conductive housing 201 and a conductor 202 in electrical communication with a current collector 203. The battery of FIG. 2 can be a cell of an energy storage device. The conductor can be electrically isolated from the housing and can protrude through the housing through an aperture in the housing such that the conductor of a first cell is in electrical communication with the housing of a second cell when the first and second cells are stacked.

In some cases, a cell comprises a negative current collector, a negative electrode, an electrolyte, a positive electrode and a positive current collector. The negative electrode can be part of the negative current collector. As an alternative, the negative electrode is separate from, but otherwise maintained in electrical communication with, the negative current collector. The positive electrode can be part of the positive current collector. As an alternative, the positive electrode can be separate from, but otherwise maintained in electrical communication with, the positive current collector.

A cell housing can comprise an electrically conductive container and a conductor in electrical communication with a current collector. The conductor may protrude through the housing through an aperture in the container and may be electrically isolated from the container. The conductor of a first housing may contact the container of a second housing when the first and second housings are stacked.

Figure 3:
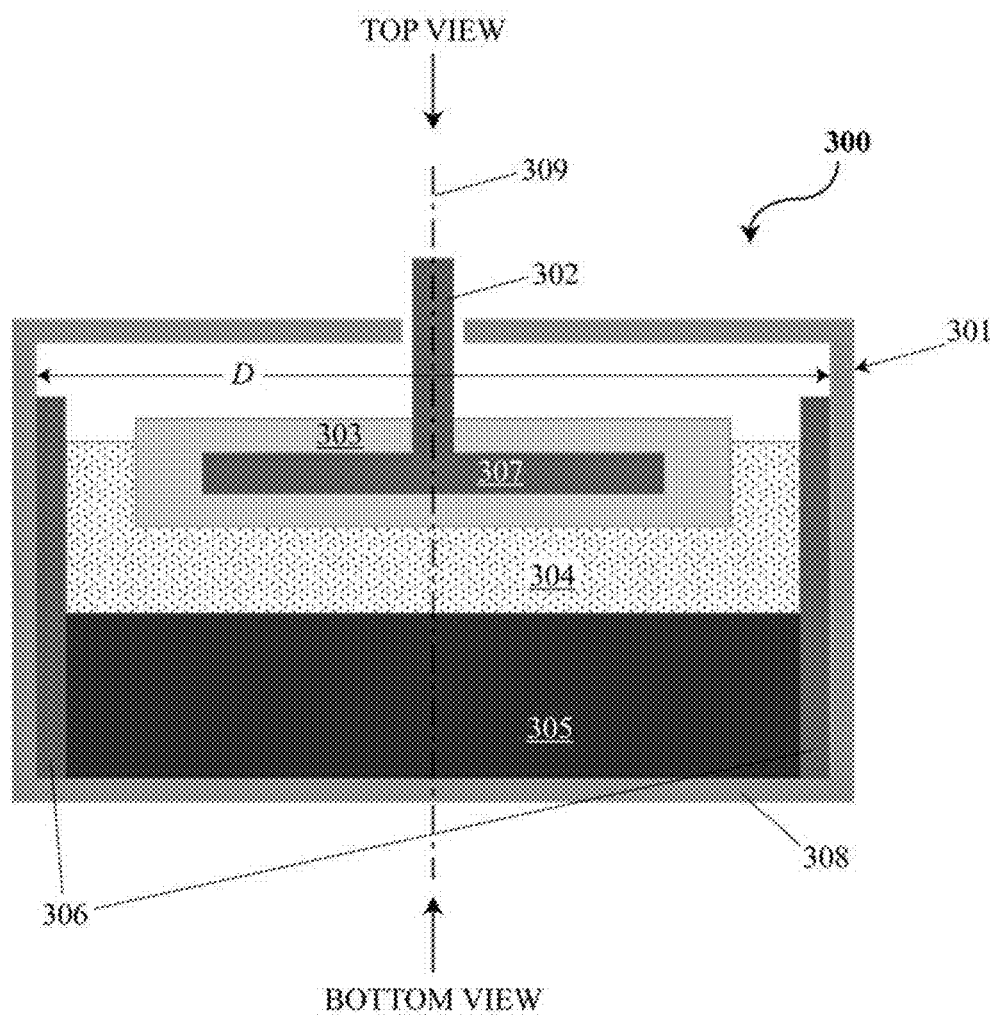
FIG. 3 is a cross-sectional side view of an electrochemical cell or battery.

FIG. 3 is a cross-sectional side view of an electrochemical cell or battery 300 comprising a housing 301, an electrically conductive feed-through (e.g., conductor, such as a conductor rod) 302 that passes through an aperture in the housing and is in electrical communication with a liquid metal negative electrode 303, a liquid metal positive electrode 305, and a liquid salt electrolyte 304 between the liquid metal electrodes 303, 305. The cell or battery 300 can be configured for use with cell chemistries operated under a low voltage mode ("Type 1 mode") or high voltage mode ("Type 2 mode"), as disclosed elsewhere herein. The conductor 302 may be electrically isolated from the housing 301 (e.g., using electrically insulating seals). The housing 301 can also include a first (e.g., negative) current collector or lead 307 and a second (e.g., positive) current collector 308. The negative current collector 307 may comprise foam material 303 that behaves like a sponge, and the negative electrode liquid metal soaks into the foam. The positive current collector 308 may be configured as part of the housing 301; for example, the bottom end wall of the housing may be configured as the positive current collector 308, as illustrated in FIG. 3. The liquid metal negative electrode 303 is in contact with the molten salt electrolyte 304. The liquid salt electrolyte is also in contact with the positive liquid metal electrode 305. The positive liquid metal electrode 305 can be in electrical communication with the housing 301 along the side walls and/or along the bottom end wall of the housing.

The housing 301 can comprise a housing interior 306. The housing interior 306 may include, but is not limited to, a sheath (e.g., a graphite sheath), a coating, a crucible (e.g., a graphite crucible), a surface treatment, a lining, or any combination thereof). In one example, the housing interior 306 is a sheath. In another example, the housing interior 306 is a crucible. In yet another example, examples, the housing interior 306 is a coating or surface treatment. The housing interior 306 may be thermally conductive, thermally insulating, electrically conductive, electrically insulating, or any combination thereof. In some cases, the housing interior 306 may be provided for protection of the housing (e.g., for protecting the stainless steel material of the housing from corrosion). In some cases, the housing interior can be anti-wetting to the liquid metal positive electrode. In some cases, the housing interior can be anti-wetting to the liquid electrolyte. Viewed from a top or bottom direction, as indicated respectively by "TOP VIEW" and "BOTTOM VIEW" in FIG. 3, the cross-sectional geometry of the cell or battery 300 can be circular, elliptical, square, rectangular, polygonal, curved, symmetric, asymmetric or any other compound shape based on design requirements for the battery. In an example, the cell or battery 300 is axially symmetric with a circular or square cross-section. Components of cell or battery 300 (e.g., component in FIG. 3) may be arranged within the cell or battery in an axially symmetric fashion. In some cases, one or more components may be arranged asymmetrically, such as, for example, off the center of the axis 309.

In some cases, a cell can include one or more alloyed products that are liquid, semi-liquid (or semi-solid), or solid. The alloyed products can be immiscible (or, in some cases, soluble) with the negative electrode, positive electrode and/or electrolyte. The alloyed products can form from electrochemical processes during charging or discharging of a cell.

An alloyed product can include an element constituent of a negative electrode, positive electrode and/or electrolyte. An alloyed product can have a different density than the negative electrode, positive electrode or electrolyte, or a density that is similar or substantially the same. The location of the alloyed product can be a function of the density of the alloyed product compared to the densities of the negative electrode, electrolyte and positive electrode. The alloyed product can be situated in the negative electrode, positive electrode or electrolyte, or at a location (e.g., interface) between the negative electrode and the electrolyte or between the positive electrode and the electrolyte, or any combination thereof. In an example, an alloyed product is an intermetallic between the positive electrode and the electrolyte (see, for example, FIG. 4). In some cases, some electrolyte can seep in between the intermetallic and the positive electrode. In other examples, the alloyed product can be at other locations within the cell and be formed of a material of different stoichiometries/compositions, depending on the chemistry, temperature, and/or charge state of the cell.

Figure 4:
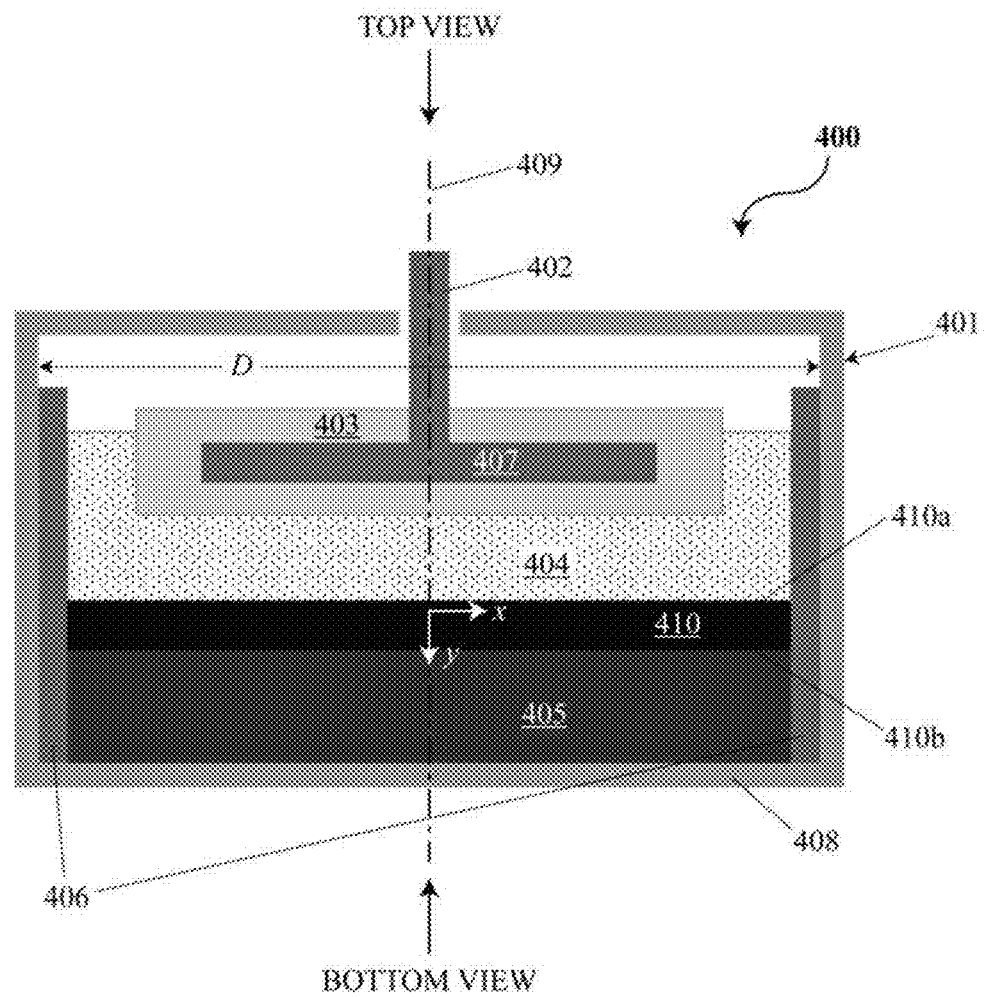
FIG. 4 is a cross-sectional side view of an electrochemical cell or battery with an intermetallic layer.

FIG. 4 is a cross-sectional side view of an electrochemical cell or battery 400 with an intermetallic layer 410. The intermetallic layer 410 can include a mutual reaction compound of a material originating from the negative electrode 403 and positive electrode material 405. For example, a negative liquid metal electrode 403 can comprise an alkali or alkaline earth metal (e.g., Na, Li, K, Mg, or Ca), the positive liquid metal electrode 405 can comprise one or more of a transition metal, d-block (e.g., Group 12), Group IIIA, IVA, VA or VIA elements (e.g., lead and/or antimony and/or bismuth), and the intermetallic layer 410 can comprise a mutual reaction compound or product thereof (e.g., alkali plumbide, antimonide or bismuthide, e.g., $Na_3Pb$, $Li_3Sb$, $K_3Sb$, $Mg_3Sb_2$, $Ca_3Sb_2$, or $Ca_3Bi_2$). An upper interface 410a of the intermetallic layer 410 is in contact with the electrolyte 404, and a lower interface 410b of the intermetallic layer 410 is in contact with the positive electrode 405. The mutual reaction compound may be formed during discharging at an interface between a positive liquid metal electrode (liquid metal cathode in this configuration) 405 and a liquid salt electrolyte 404. The mutual reaction compound (or product) can be solid or semi-solid. In an example, the intermetallic layer 410 can form at the interface between the liquid metal cathode 405 and the liquid salt electrolyte 404. In some cases, the intermetallic layer 410 may exhibit liquid properties (e.g., the intermetallic may be semi-solid, or it may be of a higher viscosity or density than one or more adjacent phases/materials).

The cell 400 comprises a first current collector 407 and a second current collector 408. The first current collector 407 is in contact with the negative electrode 403, and the second current collector 408 is in contact with the positive electrode 405. The first current collector 407 is in contact with an electrically conductive feed-through 402. A housing 401 of the cell 400 can include a thermally and/or electrically insulating sheath 406. In an example, the negative liquid metal electrode 403 includes magnesium (Mg), the positive liquid metal electrode 405 includes antimony (Sb), and the intermetallic layer 410 includes Mg and Sb ($Mg_xSb$, where 'x' is a number greater than zero), such as, for example, magnesium antimonide ($Mg_3Sb_2$). Cells with a Mg||Sb chemistry may contain magnesium ions within the electrolyte as well as other salts (e.g., $MgCl_2$, NaCl, KCl, or a combination thereof). In some cases, in a discharged state, the cell is deficient in Mg in the negative electrode and the positive electrode comprises and alloy of Mg—Sb. In such cases, during charging, Mg is supplied from the positive electrode, passes through the electrolyte as a positive ion, and deposits onto the negative current collector as Mg. In some examples, the cell has an operating temperature of at least about 550° C., 600° C., 650° C., 700° C., or 750° C., and in some cases between about 650° C. and about 750° C. In a charged state, all or substantially all the components of the cell can be in a liquid state. Alternative chemistries exist, including Ca-Mg|Bi comprising a calcium halide constituent in the electrolyte (e.g., $CaF_2$, KF, LiF, $CaCl_2$), KCl, LiCl, $CaBr_2$, KBr, LiBr, or combinations thereof) and operating above about 500° C., Ca-Mg||Sb-Pb comprising a calcium halide constituent in the electrolyte (e.g., $CaF_2$, KF, LiF, $CaCl_2$, KCl, LiCl, $CaBr_2$, KBr, LiBr, or combinations thereof) and operating above about 500° C., Li|Pb-Sb cells comprising a lithium-ion containing halide electrolyte (e.g., LiF, LiCl, LiBr, or combinations thereof) and operating between about 350° C. and about 550° C., and Na|Pb cells comprising a sodium halide as part of the electrolyte (e.g., NaCl, NaBr, NaI, NaF, LiCl, LiF, LiBr, LiI, KCl, KBr, KF, KI, $CaCl_2$, $CaF_2$, $CaBr_2$, $CaI_2$, or combinations thereof) and operating above about 300° C. In some cases, the product of the discharge reaction may be an intermetallic compound (e.g., $Mg_3Sb_2$ for the Mg||Sb cell chemistry, $Li_3Sb$ for the Li||Pb-Sb chemistry, $Ca_3Bi_2$ for the Ca-Mg||Bi chemistry, or $Ca_3Sb_2$ for the Ca-Mg||Pb-Sb chemistry), where the intermetallic layer may develop as a distinct solid phase by, for example, growing and expanding horizontally along a direction x and/or growing or expanding vertically along a direction y at the interface between the positive electrode and the electrolyte. The growth may be axially symmetrical or asymmetrical with respect to an axis of symmetry 409 located at the center of the cell or battery 400. In some cases, the intermetallic layer is observed under Type 1 mode of operation but not Type 2 mode of operation. For example, the intermetallic layer (e.g., the intermetallic layer in FIG. 4) may not form during operation of a Type 2 cell.

Figure 5:
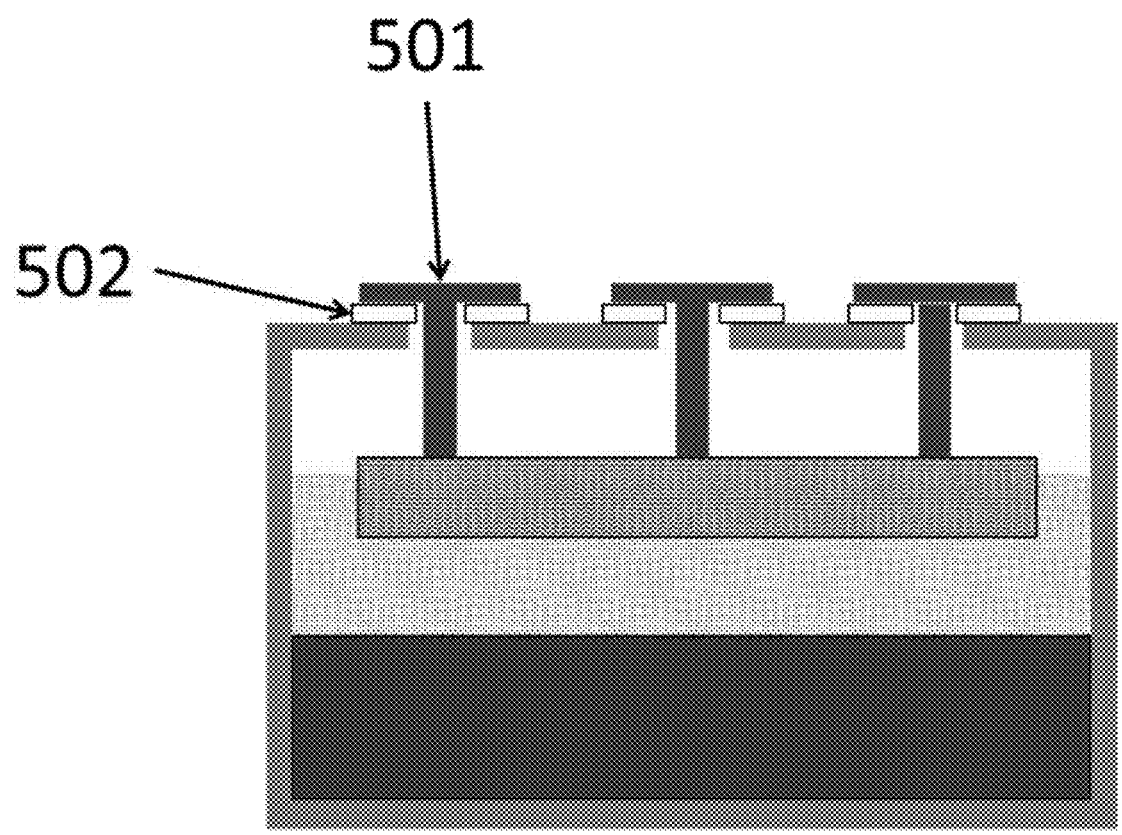
FIG. 5 is a schematic cross-sectional illustration of an electrochemical cell having feed-throughs that are electrically insulated from a housing with dielectric seal components.

Cell lid assemblies can use adhesive seals to achieve a gas tight and electrically insulating seal. As seen in FIG. 5, a conductive feed-through 501 can be electrically isolated from the housing and the housing can be sealed by an adhesive sealing material 502 disposed between the feed-through and the housing. The adhesive sealing material can include any sealant material capable of adhering to the components of the cell lid assembly that are to be sealed.

The seal can retain the reactive material (e.g., vapors of the reactive material) in the device. For example, the seal can retain the reactive metal vapors and/or molten salt vapors in the device. In some cases, the seal surrounds an electrically conductive feed-through (and can electrically isolate the feed-through from the housing of the device), a thermocouple or a voltage sensor.

Electrical Control of Energy Storage Devices

The present disclosure provides energy storage systems comprising electrochemical energy storage devices (e.g., batteries) and battery management systems. An electrochemical energy storage device can include at least one electrochemical cell, also "cell" and "battery cell" herein, sealed (e.g., hermetically sealed) within a housing. A cell can be configured to deliver electrical energy (e.g., electrons under potential) to a load, such as, for example, an electronic device, another energy storage device or a power grid. A cell can include a negative electrode, an electrolyte adjacent to the negative electrode, and a positive electrode adjacent to the electrolyte. The negative electrode can be separated from the positive electrode by the electrolyte. The negative electrode can be an anode during discharge. The positive electrode can be a cathode during discharge. One or more of the negative electrode, electrolyte and positive electrode can be in a liquid state (e.g., molten), as described elsewhere herein.

In some examples, an energy storage device comprises a plurality of cells. Individual cells of the plurality can be electrically coupled to one another in series and/or in parallel. In serial connectivity, the positive terminal of a first cell can be connected to a negative terminal of a second cell. In parallel connectivity, the positive terminal of a first cell can be connected to a positive terminal of a second, and/or additional, cell(s).

A battery management system can be programmed or otherwise configured to determine a state of charge or discharge of one or more energy storage cells of the electrochemical energy storage device. The battery management system can include a computer processor or other logic that executes code to determine the state of charge and other operational characteristics, such as voltage, current, temperature, etc., of the one or more energy storage cells. The battery management system can be operatively coupled to one or more electrochemical energy storage cells of the energy storage system. The battery management system can include a current control device, such as, for example, metal-oxide-semiconductor field-effect transistors (MOSFETs), insulated-gate bipolar transistors (IGBTs), circuit breakers or relays. The current control device can be configured to turn ON or OFF or be in partial ON/OFF state to control the amount of current that is bypassed around (or bled) from a cell for balancing purposes. The partial ON/OFF state can vary the amount of current that is passed from a cell from 0% to 100% of the maximum current that can be passed from the cell, such as, for example, at least about 1%, 2%, 3%, 4%, 5%, 6%, 7%, 8%, 9%, 10%, 20%, 30%, 40%, 50%, 60%, 70%, 80%, 90%, or 99% of the maximum.

The battery management system can aid in determining a state of charge of individual cells or a group of cells, as well as performing cell balancing, which enables states of charge on cells to be balanced to ensure that cells charge and discharge in tandem when connected together in series or parallel. For serial operation, the battery management system can require voltage sensing on cells and ballasting provisions that are connected to the battery management system. The ballasting provisions can include one or more electrical flow lines (e.g., wires) that are operatively coupled to the cells or a plurality of cells. The electrical flow lines can include sensing lines configured to enable the battery management system to sense an operating temperature of one or more cells of the energy storage device.

The battery management system can estimate the state of charge of a cell by calculating and/or measuring voltage, and amount and direction of current flow, through the relationship $V(cell)=i*R+Vcell$, where 'V (cell)' is the voltage that characterizes the state of charge of the cell, 'i' is the current measured through the ballasting line, 'R' is the impedance of the ballasting line, and Vcell is the inherent voltage of the cell. V (Cell) may be characterized as the overall voltage measured by the battery management system, taking into account the inherent voltage of the cell (Vcell) and the voltage drop measured as a function of current and voltage over the ballasting lines. Vcell may be a function of the amount of current passing through the cell, the state of charge of the cell and/or recent charge/discharge history (e.g., hysteresis effects). The current can be measured with the aid of an ammeter, which can be separate from or integrated in the battery management system. For high temperature energy storage devices, the impedance of the ballasting lines can vary as a function of temperature and in accordance with the material used in the ballasting lines. Thus, dependence on an assumed impedance of the ballasting lines at room temperature can yield an inaccurate estimate of the state of charge of a cell.

In order to account for erroneous estimates of the state of charge at temperatures that are elevated with respect to room temperature, the battery management system can calculate the state of charge by dynamically calculating and compensating for variations in impedance along ballasting lines. This can advantageously enable the battery management system to have a reliable metric of impedance on the ballasting lines, including the sensing lines, and thereby get a precise, substantially precise, or estimated measurement of cell voltage as well as the amount and direction of current flow, and, thereby state of charge. Such information can permit the battery management system to control balancing current appropriately. At the operating temperature of an electrochemical cell, and as the temperature fluctuates, the battery management system can calculate an impedance that is a function of the temperature. Using the current through a ballasting line, the calculated impedance (R) can then be used to estimate the state of charge (V) through the above relationship.

Impedance can be calculated using a correspondence between i) impedance and ii) temperature and, in some cases, physical property (e.g., material, diameter) of a line. For example, a 1-meter long 10AWG nickel wire can have a resistance of about 0.022 Ohms at 20° C. and about 0.110 Ohms at 550° C. These values can be stored in a look-up table in memory or can be dynamically calculated by the battery management system logic. In some examples, the system can derive the impedance at a given temperature using the look-up table.

In some examples, an energy storage device comprises a stack of cells connected together in series. Sense wires are coupled to the cells for use as current drive paths. The sense wires can be heavy or high gauge wire, such as, for example, 12AWG nickel wire. With heavier wire, maintained at the operating temperature of the energy storage device (e.g., 500° C.), there can be increased resistance to electrical current that can manifest as a voltage drop across the sense line.

The battery management system can include a software algorithm in a memory location of the battery management system. The algorithm can aid in estimating the state of charge of an energy storage device. The algorithm can be pre-loaded in a memory location of the battery management system with a look-up matrix (or table) that has parameters, such as, for example, temperature, wiring distance, wiring material, wire index and/or any junction-related impedances (see, e.g., TABLE 1 below, showing how impedance, provided in units of Ohms (or an arbitrary unit) or provided as a multiplication factor, changes at various temperatures and wire lengths). The algorithm can take input from one or more temperature sensors of the energy storage system. Based on the temperature readings, the battery management system, as part of the algorithm, can refer to the look-up table to determine the impedance or impedance variation on a particular current path to a cell. From the measured temperature and measured current, the battery management system can estimate the impedance of ballasting provisions, including, for example, sensing (or sense) lines and/or balancing lines that pass current. From the measured impedance, the voltage of an individual cell or groups of cells can be estimated. From the voltage, the state of charge can be estimated (e.g., using the amount and direction of current). The battery management system can then regulate the flow of electrical current to or from one or more of the cells. As temperature of the system varies, by varying the look-up parameter and adjusting current control, the battery management system can enable an accurate mechanism of compensating for impedance mismatch.

TABLE 1

Example look-up table showing impedance as a function of temperature and wire length. The impedance is shown for temperatures T1, T2, T3 and T4 and wire lengths x and y.

| | T1 | T2 | T3 | T4 |
|---|---|---|---|---|
| Wire length x | 0.05 | 0.07 | 0.09 | 0.11 |
| Wire length y | 0.08 | 0.09 | 0.11 | 0.15 |

Battery management systems of the present disclosure can be capable of independently regulating flow of current to or from an electrochemical cell or group of electrochemical cells. In some examples, the battery management system can regulate the flow of current from a first cell independently from the flow of current from a second cell in series with the first cell. This can advantageously enable the battery management system to operate (e.g., charge or discharge) the first cell while independently operating the second cell.

In some cases, a known fixed value resistance can be introduced to the sense path in addition to impedance brought about by wiring. In some cases, the added resistance can be eliminated altogether and the inherent resistance of a wire can be used to estimate the impedance of a given wire.

Battery management systems of the present disclosure can be able to implement a substantially tight control on current path impedance and achieve higher accuracy in balancing without adding additional components. In some cases, a battery management system can achieve cell balancing within an accuracy of at most about 50%, 40%, 30%, 20%, 15%, 10%, 5%, 4%, 3%, 2%, 1%, 0.5%, or less. The battery management system can use, for example, cell-to-cell voltage(s) to quantify cell balancing (e.g., how balanced cells are in the system). For example, a maximum allowable spread in cell-to-cell voltage can be determined to be about, or less than about, 1 milli-Volt (mV), 10 mV, 50 mV, 100 mV or 200 mV, and the battery management system can balance the cells to maintain one or more (e.g., all) cell voltages within this limit. Cell balancing can lead to longer battery life and larger charge capacities. In addition, battery management systems of the present disclosure can facilitate the adjustment of physical distances to support installation or maintenance of cells without having to redesign hardware constituents of a battery management system.

Reference will now be made to the figures, wherein like numerals refer to like parts throughout. It will be appreciated that the figures and features therein are not necessarily drawn to scale.

Figure 6:
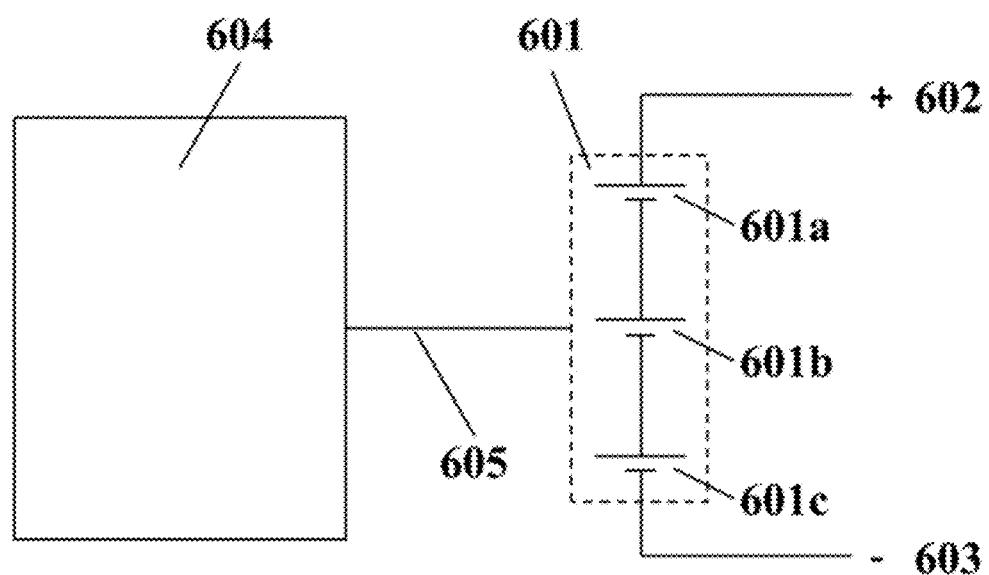
FIG. 6 shows an energy storage system comprising an energy storage device and a battery management system.

FIG. 6 shows an energy storage system 600 comprising an electrochemical energy storage device 601 with individual electrochemical energy storage cells (or groups of electrochemical cells) 601a, 601b and 601c. In some cases, each of 601a-601c can comprise or represent a parallel string of cells. In some examples, each of 601a-601c can comprise one or more liquid metal battery cells, as described elsewhere herein. Any aspects of the disclosure described in relation to cells 601a-601c may equally apply to groups of cells 601a-601c at least in some configurations. The device 601 has a positive terminal 602 and a negative terminal 603 that can be electrically coupled to a load, such as a power grid, in some cases through one or more intermediary elements. The cells 601a-601c in the illustrated example are in a serial configuration, but in other examples, cells can be in either a serial or parallel configuration. In some cases, some cells can be in a serial configuration, while other cells can be in a parallel configuration. For instance, cells can be in a parallel configuration to provide for redundancy or increase the overall charge capacity of the electrochemical energy storage device.

While the device 601 comprises three cells 601a-601c, the device 601 can include any number of cells. The device 601 can include at least about 1, 2, 3, 4, 5, 6, 7, 8, 9, 10, 20, 30, 40, 50, 100, 200, 300, 400, 500, 1000, 10,000, 100,000 or 1,000,000 cells, or between about 1 and about 100,000 or between about 10 and about 1,000 cells.

The system 600 further comprises a battery management system 604 that is operatively coupled to the device 601 through a ballasting member 605. The ballasting member 605 can include one or more ballasting lines, which can include sensing lines and current flow lines. The ballasting member 605 can be used to divert at least some of the current through the cells 601a-601c through the ballasting member, which can aid in cell balancing.

Battery management systems can include various configurations of ballasting circuits. A ballasting circuit can be coupled to an energy storage device and used to estimate the state of charge of the energy storage device, and to aid in balancing individual cells of the energy storage device.

Figure 7:
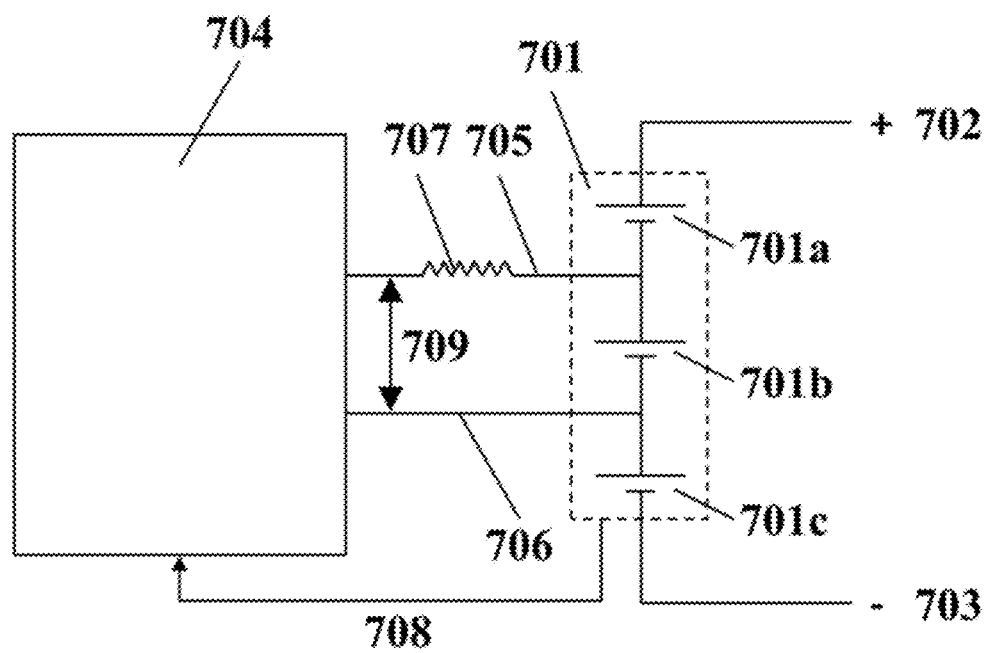
FIG. 7 is a circuit diagram that shows an energy storage system comprising an energy storage device and a battery management system.

FIG. 7 shows an energy storage system 700 comprising an energy storage device 701 comprising a first cell (or group of cells) 701a, a second cell (or group of cells) 701b and a third cell (or group of cells) 701c. In some cases, each of 701a-701c can comprise or represent a parallel string of cells. In some examples, each of 701a-701c can comprise one or more liquid metal battery cells, as described elsewhere herein. For example, in a configuration where 701a-701 represent individual cells, each of the cells 701a-701c can be a liquid metal battery. Any aspects of the disclosure described in relation to cells 701a-701c may equally apply to groups of cells 701a-701c at least in some configurations. The device 701 has a positive terminal 702 and a negative terminal 703 that can be electrically coupled to a load, such as a power grid. Various components of the system 700 are connected to one another by current flow paths (illustrated lines). In some cases, one or more current flow lines (not shown) can be used to divert current to or from any one of the cells 701a, 701b and 701c (e.g., in addition to or instead of a first sense line 705 and a sense line 706).

The system 700 further comprises a battery management system 704 that is operatively coupled to the device 701 through the first sense line 705 and the second sense line 706. The first sense line 705 is coupled to a line connecting the first cell 701a and the second cell 701b, and the second sense line 706 is coupled to a line connecting the second cell 701b and the third cell 701c. A temperature sensor 708 provides a temperature of the device 701 to the battery management system 704. In some examples, the temperature sensor 708 is a thermocouple. The system 700 may also comprise one or more other measurement sensors or devices (e.g., an ampere-meter).

The first sense line 705 includes a resistor 707 with a known impedance that does not substantially vary with temperature, or varies with temperature in a determinable manner (e.g., with the aid of a look-up table). As an alternative, the resistor 707 can be precluded, and the impedance of the first sense line 705 can be determined using a look-up table or other matrix that provides a correspondence between the temperature measured by the temperature sensor 708 and the impedance. The look-up table can include physical properties of the sense line (or wire), such as, for example, wire diameter and/or elemental make-up. The estimation of the impedance can be a function of the temperature as well as the physical properties.

The battery management system 704 can use the temperature measured by the temperature sensor 708 to estimate the impedance of various components of the system 700, such as the first sense line 705 (if the resistor 707 is precluded), second sense line 706, and current flow path leading from the negative terminal 703 to the positive terminal 702.

From the temperature measured by the temperature sensor 708, the battery management system 704 can estimate the impedance across a signal path, such as the first and second sense lines 705 and 706. From the measured impedance, the battery management system 704 can then estimate the state of charge (voltage) of the cell 701b in FIG. 7. Using the current measured along the current flow path leading from the negative terminal 703 to the positive terminal 702, and the impedance of the current flow path as determined using the temperature measured by the sensor 708, the battery management system 704 can estimate the overall voltage of the cells 701a-701c (V=current*impedance). For example, using the impedance along a current flow path leading from the negative terminal 703, through the third cell 701c and the second sense line 706, and voltage measurement at 703, the battery management system 704 can measure the voltage across the third cell 701c. The battery management system 704 estimates the impedance using the temperatures measured by the temperature sensor 708, and using, for example, a look-up table to determine the impedance as a function of temperature. As another example, a voltage drop 709 across the second cell 701b can be calculated by estimating the impedance of the first sense line 705 and the second sense line 706, and measuring the current from the first sense line 705 through the second cell 701b to the second sense line 706, or vice versa. Next, the voltage drop 709 is calculated by taking the product of the estimated impedance and the measured current.

Based on the temperature readings, the battery management system 704 can determine the precise impedance variation on a given current path to cell 701a, 701b or 701c. The system 704 can then command current control devices of the system 704 to turn ON or OFF, or be in partial ON/OFF stage (e.g., 10%, 20%, 30%, 40%, or 50% on), to control the amount of current that is bypassed around or bled from cell 701a, 701b or 701c for balancing purposes. In a partial ON/OFF stage, the current flow can be a fraction of the maximum current flow. For example, in a 50% on stage, the current flow is 50% of the maximum current flow. As temperature of the system varies, by varying the look-up parameter and adjusting current control, the system 704 can enable an accurate mechanism of compensating for impedance mismatch.

The voltage drop 709 provides an estimation of the state of charge of the second cell 701b. If the second cell 701b is in a charged state (e.g., the voltage drop 709 is about 1 V), then the second cell 701b may be discontinued from charging by bypassing current around it through components in 704. If the first cell 701a and/or third cell 701c is not charged, then these cells can be charged (e.g., continue to be charged), but current can be diverted from the second cell 701b. In some cases, the sense line 705 and 706 can be used to divert current to or from any one of the cells 701a, 701b and 701c.

Figure 8:
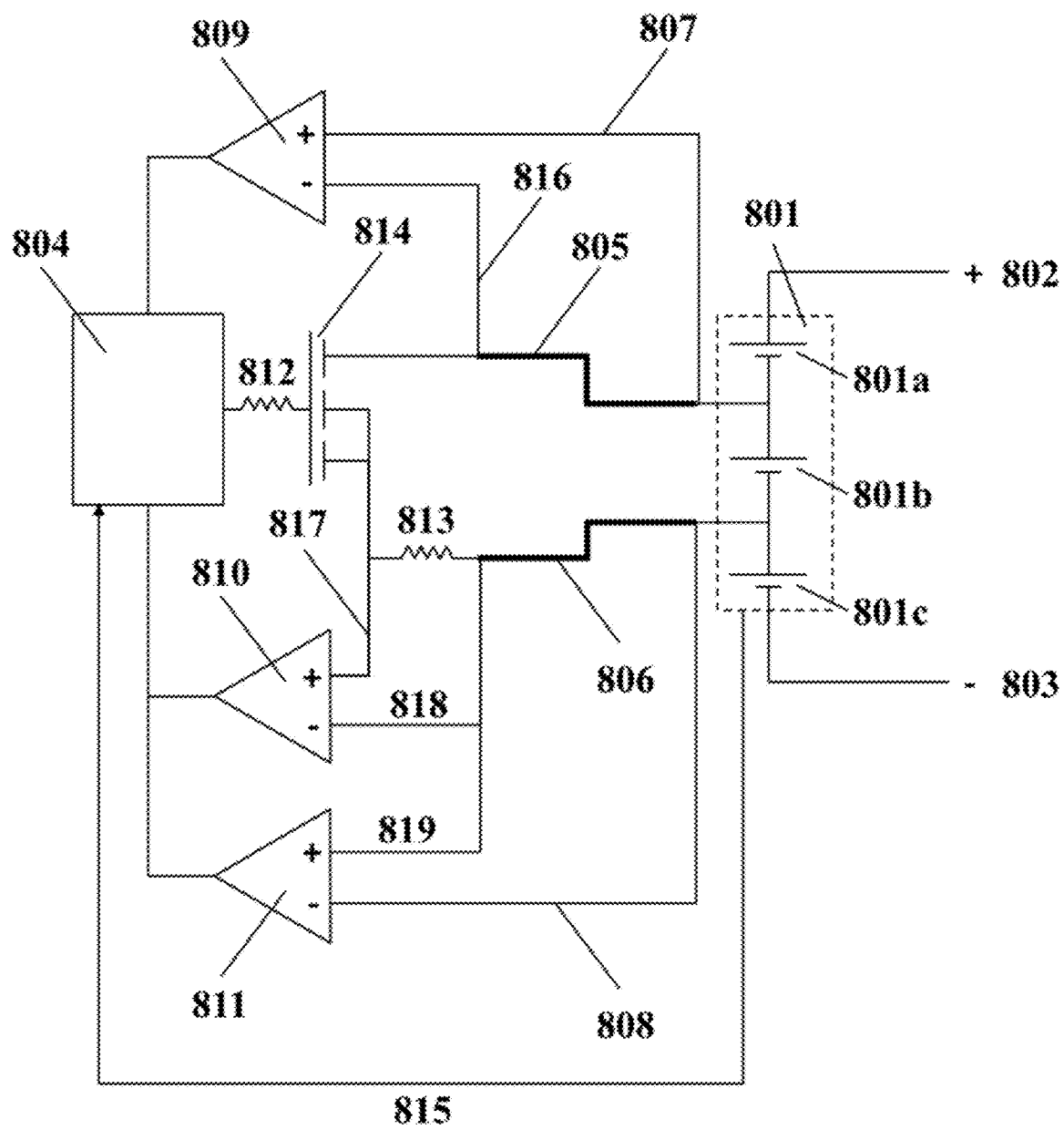
FIG. 8 is a circuit diagram that shows an energy storage system comprising an energy storage device and a drive circuit.
Figure 9:
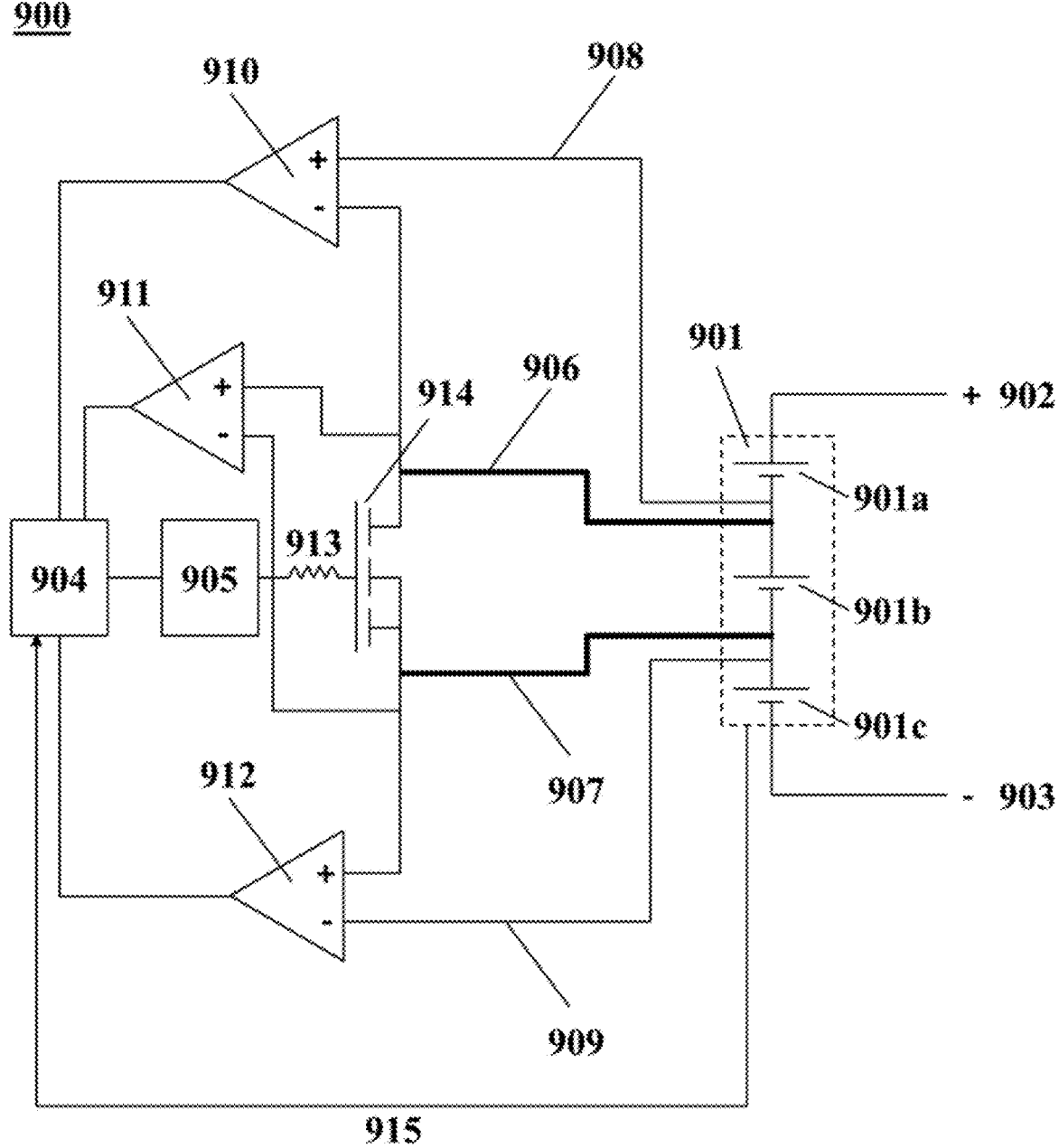
FIG. 9 is a circuit diagram that shows an energy storage system comprising an energy storage device, a processor and a drive circuit.

FIG. 8 and FIG. 9 are examples of energy storage systems with drive circuits that can provide dynamic impedance control.

FIG. 8 shows an energy storage system 800 comprising an energy storage device 801 comprising a first cell (or group of cells) 801a, a second cell (or group of cells) 801b and a third cell (or group of cells) 801c. Each of 801a-801c can comprise or represent one cell or multiple cells in parallel (e.g., a parallel string of cells). In some examples, each of 801a-801c can comprise one or more liquid metal battery cells, as described elsewhere herein. For example, in a configuration where 801a-801 represent individual cells, each of the cells 801a-801c can be a liquid metal battery. Any aspects of the disclosure described in relation to cells 801a-801c may equally apply to groups of cells 801a-801c at least in some configurations. The device 801 has a positive terminal 802 and a negative terminal 803 that can be electrically coupled to a load, such as a power grid, in some cases through one or more intermediary elements. During discharging of the device 801, current can flow along the direction leading from the negative terminal 803 to the positive terminal 802 through at least some of the cells 801a-801c. During charging of the device 801, current can flow in the opposite direction (i.e., from the positive terminal 802 to the negative terminal 803).

In this example, the system 800 comprises a drive circuit 804 as part of a battery management system of the system 800, a first high current line 805, a second high current line 806, a first sense line 807 and a second sense line 808. The system 800 further comprises a first operation amplifier ("op-amp") 809, a second op-amp 810 and a third op-amp 811. A first resistor 812 (e.g., 10 kOhm resistor) couples the drive circuit 804 to a metal-oxide-semiconductor field-effect transistor (MOSFET) 814. A second resistor 813 (e.g., 10 mOhm resistor) couples the second high current line to a line connecting the positive terminal of the second op-amp 810 to the MOSFET 814. Various components of the system 800 are connected to one another by current flow paths (illustrated lines). A negative terminal of the first op-amp 809 is electrically coupled to a first end of the first high current line 805 through line 816, and a positive terminal of the first op-amp 809 is electrically coupled to a second end of the first high current line 805 through the first sense line 807, as shown. A positive terminal of the second op-amp 810 electrically coupled to the MOSFET 814 through line 817, and a negative terminal of the second op-amp 810 is electrically coupled to a first end of the second high current line 806 through line 818. A positive terminal of the third op-amp 811 is electrically coupled to the first end of the second high current line 806 through line 819, and a negative terminal of the third op-amp 811 is electrically coupled to a second end of the second high current line 806 through the second sense line 808.

In an example operation of the system 800, the drive circuit 804 turns on the MOSFET 814. Current is then bypassed around cell 801b through the high current lines 805 and 806 and the resistor 813. In such a case, current does not flow through the second cell 801b, but flows from the cell 801a through the first high current line 805, the MOSFET 814, the second resistor 813, the second high current line 806 and the cell 801c. In cases in which the high current lines 805 and 806 are heavy gauge wires of, for example, stainless steel or nickel, a measurable voltage drop may form across the lengths of the high current lines 805 and 806 (e.g., along the thicker portions of the lines/wires in FIG. 8). The op-amps 809 and 811 are used to sense the voltage drop across the high current lines 805 and 806, and the op-amp 810 is used to sense the voltage drop across the resistor 813. The resistor 813 can be populated with a known impedance value and can be combined with the sensed voltage so that the current can be calculated via, for example, V=I*R. If the voltage drop across the high current lines 805 and 806 is combined with the current through the resistor 813, a known wire cross-section and its resistivity (e.g., in circular mil Ohm per foot or in Ohm-meter) at the measured temperature, then the wire length can be estimated using the relationship: wire length (e.g., in feet)=[voltage (e.g., in volt (V))/current (e.g., in ampere (A))]*[area (e.g., in cmil)]/[resistivity (e.g., in (Ω*cmil/foot)]. This wire length can be 'learned' (e.g., calculated and stored for future retrieval, or calculated and statistically averaged together with previous and/or future determinations) by the battery management system (e.g., over time) and used with temperature, cross-section and resistivity (e.g., circular mil Ohm per foot) information to estimate wire impedance in the system. In some cases, battery management system electronics components can be positioned at a central location with respect to the physical location of cells. In these situations, high current balancing wire lengths may be different for different cells depending on their relative position with respect to the battery management electronics. The ability to measure impedance of the balancing wires for different balancing currents can therefore permit better control over the amount of current that is diverted, which can provide for improved voltage balancing between cells and improved state of charge matching between cells.

During operation, the first high current line 805 and the second high current line 806 can transmit current at a density from about 10 mA/cm$^2$ to about 10 A/cm$^2$. The first sense line 807 and the second sense line 808 can be non-current carrying lines. The first sense line 807 and the second sense line 808 can be configured to permit the estimation of voltage.

The first sense line 807 and the first high current line 805 may be electrically coupled to the device 801 at a joint connection point between the cells 801a and 801b. Similarly, the second sense line 808 and the second high current line 806 may be electrically coupled to the device 801 at a joint connection point between the cells 801b and 801c. In this configuration, the joint wire or line (e.g., from the point where each pair of sense and high current lines meet to the connection point at the device 801) may be configured to exhibit a limited voltage drop. For example, the joint line may comprise a wire type with a similar thickness as the wire type(s) used for the sense lines.

The system 800 further comprises a temperature sensor 815 that is in thermal communication with the device 801. The temperature sensor 815 is configured to aid the drive circuit 804 in measuring the temperature of the device 801, such as the operating temperature of the device 801 or one or more individual cells 801a, 801b and 801c of the device 801. Although one temperature sensor 815 is shown, the system 800 can include any number of temperature sensors. In some cases, each cell 801a, 801b and 801c includes an individual temperature sensor. The individual temperature sensors can be in communication with the drive circuit 804.

In an example operation of the system 800, the drive circuit 804 receives as input the temperature of the device 801. From the temperature, the drive circuit 804 estimates the impedance of each of the individual lines of the system 804, such as the lines 805-808. The drive circuit 804 can then estimate the state of charge (voltage) of the second cell 801b. If the second cell 801b is in a charged state, then the drive circuit can divert current from the current flow path leading from the negative terminal 803 to the positive terminal 802 along either the first high current line 805 or the second high current line 806.

FIG. 9 shows an energy storage system 900 comprising an energy storage device 901 comprising a first cell (or group of cells) 901a, second cell (or group of cells) 901b and a third cell (or group of cells) 901c. Each of 901a-901c can comprise or represent one cell or multiple cells in parallel (e.g., each of 901a-901c can be individual cells or parallel strings of cells). In some examples, each of 901a-901c can comprise one or more liquid metal battery cells, as described elsewhere herein. For example, in a configuration where 901a-901 represent individual cells, each of the cells 901a-901c can be a liquid metal battery. Any aspects of the disclosure described in relation to cells 901a-901c may equally apply to groups of cells 901a-901c at least in some configurations. The device 901 has a positive terminal 902 and a negative terminal 903 that can be electrically coupled to a load, such as a power grid, in some cases through one or more intermediary elements. During discharging of the device 901, current can flow along the direction leading from the negative terminal 903 to the positive terminal 902 through at least some of the cells 901a-901c. During charging of the device 901, current can flow in the opposite direction (i.e., from the positive terminal 902 to the negative terminal 903).

The system 900 further includes a processor 904 (e.g., a microprocessor) and a drive circuit 905 as part of a battery management system of the system 900. The system 900 includes a first high current line 906, a second high current line 907, a first sense line 908 and a second sense line 909. The system 900 further comprises a first operation amplifier ("op-amp") 910, a second op-amp 911 and a third op-amp 912. A resistor 913 (e.g., 10 kOhm resistor) couples the drive circuit 905 to a MOSFET 914. In this configuration, additional resistor(s) are not used for coupling high current line(s) to line(s) connecting the op-amp(s) 910, 911 or 912 to the MOSFET 914. Various components of the system 900 are connected to one another by current flow paths (illustrated lines). A negative terminal of the first op-amp 910 is electrically coupled to a first end of the first high current line 906, and a positive terminal of the first op-amp 910 is electrically coupled directly to the device 901 through the first sense line 908, as shown. A positive terminal of the second op-amp 911 is electrically coupled to the first end of the first high current line 906, and a negative terminal of the second op-amp 911 is electrically coupled to a first end of the second high current line 907. A positive terminal of the third op-amp 912 is electrically coupled to the first end of the second high current line 907, and a negative terminal of the third op-amp 912 is electrically coupled directly to the device 901 through the second sense line 909, as shown.

Because the first sense line 908 and the first high current line 906, and the second sense line 909 and the second high current line 907 are electrically coupled to the device 901 at separate connection points, lines with different wire types may be used throughout (up to the respective connection points at the device 901).

The system 900 includes a temperature sensor 915 that provides a temperature of the device 901 or one or more of the cells 901a-901c to the processor 904. The processor 904 can determine the impedances of various components of the system 900 using the temperature measured using the temperature sensor 915 together with a correspondence between impedance and temperature, such as a look-up table or matrix. From the calculated impedance, the processor 904 can instruct the drive circuit 905 to direct or re-direct current flow through some or all of the cells 901a-901c using one or both of the first high current line 906 and the second high current line 907.

In some cases, the system in FIG. 9 can enable a more accurate implementation, where differential measurements are taken across the MOSFET 914 by the second op-amp 911, whereas in FIG. 8, a similar differential measurement across the MOSFET 814 is not obtained.

Differential voltages may be measured at two or more locations. For example, in FIG. 8 and FIG. 9, differential readings can be taken across proximal and distal ends of the ballast lines 805 and 806, and 906 and 907, respectively. In some cases, as the lengths of ballast lines change, measurement values automatically update proportionate to the increase or decrease in length. In some examples, the battery management system can employ three differential voltage measurements to accomplish a temperature independent, automatically compensating ballasting circuit. A voltage drop measurement can be made across two power transmitting wire routes via secondary, un-loaded, voltage sense leads to measure the losses and automatically adjust the current controlling device to make up for the difference. This can allow for a variation in system temperature, wire length and gauge from battery to battery without a need to program different reference or look-up tables for each circumstance.

Battery Management System

An energy storage system (also "system" herein), such as, for example, a battery, may be charged and discharged by flowing electric current across negative and positive terminals of the battery, which can comprise parallel and/or series-connected cells. The direction and intensity of the flow of current may be controlled by power electronics. As a cell is charged and approaches a full state of charge (SOC), the cell voltage may increase and may serve as an electrical signature that can be used to inform a control system that the cell can stop being charged. As a cell is discharged and approaches a zero SOC, the cell voltage may decrease and may serve as an electrical signature that can be used to inform a control system that the cell can stop being discharged. During operation, batteries exhibit a self-discharge current which may not be identical in every cell. The self-discharge current can reduce the state of charge (SOC) of the cell; the process can be reversible and the discharged capacity can be regained during charging.

The SOC of a cell can be directly related to the voltage of the cell. Cells connected in parallel can have the same terminal voltage. In some cases, parallel-connected cells can remain at a similar SOC as long as the difference in the self-discharge current is relatively small, for example, less than about 50 mA/cm$^2$, 40 mA/cm$^2$, 30 mA/cm$^2$, 20 mA/cm$^2$, 10 mA/cm$^2$, 5 mA/cm$^2$, 1 mA/cm$^2$, 0.5 mA/cm$^2$, 0.1 mA/cm$^2$, 0.05 mA/cm$^2$, or 0.01 mA/cm$^2$. However, cells connected in series (or parallel strings of cells connected in series) may result in series-connected cells (or series-connected parallel strings of cells) becoming electrically 'unbalanced', namely, that their SOC can become increasingly different over time due to the differences in the self-discharge current. During charging and discharging, the charge capacity may be limited by the cell with the highest state of charge (in some cases, the cell with the lowest self-discharge current) and the discharge capacity may be limited by the cell with the lowest state of charge (in some cases, the cell with the highest self-discharge current). In some cases, the SOC of a cell module is the average of the SOCs of all of the cells within the cell module and the self-discharge rate of the cell module is the sum of the self-discharge rates of all of the cells within the cell module, and the charge capacity of a series-connected string of cell modules may be limited by the cell module with the highest state of charge (in some cases, the cell module with the lowest self-discharge current) and the discharge capacity of a series-connected string of cell modules may be limited by the cell module with the lowest state of charge (in some cases, the cell module with the highest self-discharge current). Thus, during normal operation of series-connected cells (or series-connected cell modules) with different self-discharge currents, the apparent capacity of the system can reduce over time, limited by the cells (or cell modules) with the highest and lowest self-discharge rates. Furthermore, a cell (or a cell module) may be damaged if the voltage applied to the cell (or cell module) exceeds the charge cut-off limit or drops below the discharge cut-off limit. Accordingly, a control system may be included as part of a functioning battery system. The control system can monitor cell voltages to ensure that cells are operated within safe voltage limits and/or provide the capability to electrically balance the cells to ensure that the accessible charge and discharge capacity of the battery does not decrease over time due to, for example, the unbalancing mechanisms driven by differences in the self-discharge currents of cells.

A battery management system (BMS) may be provided to manage an energy storage system, such as, for example, one or multiple rechargeable batteries. A BMS can include a computer processor and other electrical components, as described elsewhere herein. In some examples, a BMS manages a battery by protecting it from operating outside its safe or permissible operating range(s), by monitoring its state of charge and state of health, calculating secondary data, reporting the secondary data, controlling its environment, authenticating it and/or balancing it. In some cases, the BMS manages (e.g., monitor and/or control) an energy storage device (e.g., a battery) by monitoring a first parameter (e.g., voltage, temperature) of the energy storage device (e.g., of an electrochemical cell in the energy storage device) and determining a second parameter based on the first parameter (e.g., state of charge, state of health, impedance value, etc.). The second parameter can be derived from the first parameter. The BMS may control the operating state of the energy storage device (e.g., an individual electrochemical cell or a group of electrochemical cells thereof) in response to the first parameter, the second parameter, or both. For example, the BMS can control the operating state of an electrochemical cell in response to the second parameter.

A BMS may comprise one or more electrical circuit boards (also "BMS circuit boards" or "BMS board" herein). The electrical circuit board(s) may be provided at the battery (e.g., connected to individual cells or groups of cells) and/or separately from the battery (e.g., electrically connected to individual cells or groups of cells from a remote location). In some examples, a core may comprise one BMS electrical circuit board that is connected to and manages all of the cells or cell modules within the core. In other examples, the BMS system may include multiple electrical circuit boards that are distributed throughout the core (e.g., one connected to each cell pack). Each separate electrical circuit board can be connected to and control its own set of cells, cell modules or one or more cell packs. Each separate electrical circuit board can communicate information to another electrical circuit board. For example, each separate electrical circuit board can communicate information to an electrical circuit board that coordinates information flow to and from all of the separate distributed electrical circuit boards.

A BMS may monitor the state of a battery as represented by one or more parameters, such as, for example: voltage (e.g., total voltage, voltages of individual cells, voltage of cell modules, voltage across interconnections such as, for example, across busbars and other cell-to-cell or pack-to-pack wiring, minimum and maximum cell voltage, voltage of periodic taps, differential voltage between two points a circuit, or sporadic fluctuations in cell voltage), temperature (e.g., average temperature, coolant intake temperature, coolant output temperature, temperatures of individual cells, temperature of battery management system components on circuit board(s) and/or mounted outside circuit boards, or temperature of surrounding environment), state of charge (SOC) (e.g., the charge level of the battery), leakage current (e.g., an estimate of the leakage current in a given cell or cell module), balancing current (e.g., the current applied by and/or controlled by the BMS to a cell module to keep cell the module electrically and charge balanced with other cell modules connected in series to the cell module), balancing charge capacity (e.g., charge capacity required to keep a cell or cell module balanced with other cells or cell modules), state of health (SOH) (e.g., a variously-defined measurement of the overall condition of the battery), coolant flow (e.g., fluid flow in batteries cooled by air or other fluid(s)), and/or current (e.g., current in or out of the battery).

The BMS (e.g., a controller thereof) may obtain power to operate circuit components (e.g., computer processor(s) and/or peripheral devices) from the cell(s) (e.g., the cell(s) monitored by the BMS) and/or from secondary power that may be delivered to the BMS through a local power distribution system. The local power distribution system may be a low voltage DC distribution (e.g., 12 VDC, 24 VDC, 48 VDC) or AC distribution (e.g., 110 VAC to 240 VAC). In some cases, the BMS does not draw power from cell(s) (e.g., the BMS derives power to operate solely from an external power distribution network). In some cases, the BMS may use a power distribution network to start and maintain operation (e.g., when cells have zero voltage). The power distribution system may comprise a secondary dedicated back-up battery system to prevent the BMS system from abruptly shutting down in the event of a power loss to the power distribution network. In some cases, the BMS (e.g., the controller) receives power from an auxiliary power source. The auxiliary power source may be, for example, an electric power grid and/or the back-up battery system. In some cases, the controller is predominantly powered from the auxiliary power source. For example, greater than or equal to about 50%, 60%, 70%, 80%, 90%, 95%, or 100% of the power of the controller is provided by the auxiliary power source.

A BMS may monitor and control the temperature of the battery to ensure that cells are operated within operating parameters, such as, for example, within given temperature limits. For example, the operating temperature may be at and/or maintained between about 250° C. and 750° C. In some examples, the operating temperature may be at and/or maintained between about 300° C. and 750° C., between about 350° C. and 750° C., between about 400° C. and 750° C., between about 450° C. and 750° C., between about 500° C. and 750° C., between about 550° C. and 750° C., between about 600° C. and 750° C., between about 440° C. and 500° C., between about 440° C. and 480° C., between about 440° C. and 460° C., between about 460° C. and 480° C., or between about 650° C. and 750° C. In other examples, the operating temperature may be at and/or maintained between about 250° C. and 700° C., between about 250° C. and 650° C., between about 250° C. and 600° C., between about 250° C. and 550° C., between about 250° C. and 500° C., between about 250° C. and 450° C., between about 250° C. and 400° C., between about 350° C. and 400° C., or between about 250° C. and 350° C.

A cell or a battery operating under (e.g., below) the minimum operating temperature limit may have low charging capacity. In some cases, the battery is not able to charge or discharge at a useful rate (e.g., the battery may charge or discharge at about 0% of its rated charge/discharge capacity) when it is operated below the minimum operating temperature limit. The BMS may be configured to keep the cell or battery operating over (e.g., above) a minimum temperature of at least about 250° C., 300° C., 350° C., 400° C., 450° C., 500° C., 550° C., 600° C. or 650° C. In some cases, a cell or a battery operating over the maximum operating temperature limit may cause damage to the battery. For example, the BMS may keep the cell or battery operating under (e.g., below) a maximum temperature of at most about 350° C., 400° C., 450° C., 500° C., 550° C., 600° C., 650° C., 700° C., or 750° C. Temperature variations among individual cells and/or cell packs may cause a decrease in battery performance.

The temperature(s) of a cell or a battery may be measured by contact-based or non-contact thermal sensors suitable for the operating temperature of the liquid battery (e.g., between about 250° C. and 750° C.). The temperature may be measured by the battery management system. In some cases, the temperature of the cell is measured by contacting the probes of a thermocouple with the liquid metal negative electrode, liquid salt electrolyte, and/or liquid metal positive electrode in a cell. Two metal probes of the thermocouple can produce a voltage which is communicated to a local daughter board via a wire or a wireless connection. The voltage produced by the thermocouple can be compared with a reference voltage on the daughter board and converted into temperature information. In some cases, the temperature of the cell is measured by an infrared (IR) thermometer located on or connected to the daughter board and thermally insulated from a cell. A laser on the IR sensor can aim at one or more cell bodies. By measuring the amount of infrared energy emitted by the one or more cell bodies, the IR thermometer can measure the temperature of a cell or a group of cells (e.g., cell pack) from a distance.

A BMS may calculate one or more parameters based on the measurements from one or more cells or a group of cells (e.g., a cell module), such as, for example: average (e.g., nominal) charge voltage during a full or partial charge, average (e.g., nominal) discharge voltage during a full or partial discharge, maximum charge current as a charge current limit, maximum discharge current as a discharge current limit, energy (e.g., in kWh) delivered during the last full or partial discharge, energy (e.g., in kWh) accepted (also "taken in" herein) during the last full or partial charge, energy efficiency after the cells are brought back to a previously recorded SOC (e.g., full SOC) after one or more full or partial charges/discharges (e.g., the total energy (e.g., in kWh) provided to the battery during one or more (e.g., one or multiple, such as, for example, at least about 1, 2, 3, 4, 5, 10, 15, 20, 25, 50, 75, 100, 150, 200, 300 or more) charging steps divided by the total energy (e.g., in kWh) provided by the battery during one or more (e.g., one or multiple, such as, for example, at least about 1, 2, 3, 4, 5, 10, 15, 20, 25, 50, 75, 100, 150, 200, 300 or more) discharging steps), discharge capacity (e.g., in Ah) delivered during the last full or partial discharge cycle, charge capacity (e.g., in Ah) accepted (also "taken in" herein) during the last full or partial charge, Coulombic efficiency after the cells are brought back to a previously recorded SOC (e.g., full SOC) after one or more full or partial charges/discharges (e.g., the total capacity (e.g., in Ah) provided to the battery during one or more (e.g., one or multiple, such as, for example, at least about 1, 2, 3, 4, 5, 10, 15, 20, 25, 50, 75, 100, 150, 200, 300 or more) charging steps divided by the total capacity (e.g., in Ah) provided by the battery during one or more (e.g., one or multiple, such as, for example, at least about 1, 2, 3, 4, 5, 10, 15, 20, 25, 50, 75, 100, 150, 200, 300 or more) discharging steps), internal impedance of a cell (e.g., to determine open circuit voltage), change in discharge or charge capacity (e.g., in Ah) from a complete discharge over time, total energy delivered since first use, total operating time since first use, time at operating temperature since first use, time at various temperatures above standard operating temperature or at various temperature ranges above standard operating temperature, total number of thermal cycles (e.g., number of times the system is heated up to operating temperature and cooled to a temperature less than the operating temperature (e.g., room temperature)), and/or total number of charge/discharge cycles. In some examples, the BMS can estimate the SOC of a battery by counting Coulombs (i.e., by counting number of electrons) that flow through one or more cells. In other examples, the BMS can estimate the state of charge of a battery by receiving the number of Coulombs that have been provided to the battery by separate charging circuitry (e.g., power electronics such as a bi-directional inverter).

While charging, upon reaching the maximum charge current (e.g., highest allowable charge current) and/or maximum charge voltage (e.g., highest allowable voltage, such as, for example, a pre-defined maximum voltage cut-off limit), the BMS (e.g., the controller) may provide a signal to the power electronics system to slow or stop charging the battery (e.g., to slow or stop a charging rate). While discharging, upon reaching the maximum discharge current (e.g., highest allowable discharge current) and/or minimum discharge voltage (e.g., lowest allowable voltage, such as, for example, a pre-defined minimum voltage cut-off limit), the BMS (e.g., the controller) may provide a signal to the power electronics to stop discharging (e.g., to slow or stop a discharging rate). In some cases, while charging or discharging, the BMS (e.g., the controller) may provide a signal to the power electronics system to slow or stop charging or discharging the battery (e.g., to slow or stop a charging or discharging rate) when a pre-defined temperature limit is exceeded. The BMS may provide such signals directly to the power electronics, to one or more intermediate control electronic systems which in turn may provide such information to the power electronics, or a combination thereof. Further examples of management of operating conditions of the battery include, for example, a BMS controller configured to open relays or contactors in response to a measured current that exceeds a pre-determined value during charging, discharging or idling; or to start, stop or pause operation or alter operating parameters of the battery (or a system comprising the battery) in response to one or more signals received from one or more higher order controller (or other controllers) or from one or more remotely located control stations. A control station may be in communication with the BMS through a communication network such as, for example, a communication network in a computer system comprising the BMS (e.g., system 1600 in FIG. 16).

The BMS may report one or more (e.g., all) such measured or calculated data to an external device (e.g., a server or remote computer), using a communication links, such as, for example: serial communications (e.g., a CAN bus, SPI bus, isolated SPI bus or a MODBUS), direct wiring, DC-BUS (e.g., serial communication over power line), and/or wireless communications. In some examples, the (BMS) system reports measured or calculated data to higher order controller(s) through serial, direct wiring, power line and/or wireless communications. In some examples, the BMS comprises a plurality of controllers. The controllers can communicate with one another and/or with other controllers outside a system (e.g., BMS system) boundary (e.g., boundary 1105, 1110 or 1115 in FIG. 11) through CAN bus, MODBUS, SPI or isolated SPI bus using wired or wireless connections.

The BMS may communicate internally by use of a smart battery system. The smart battery system communication may take place via an Inter-Integrated Circuit (I2C) bus, System Management Bus (SMBus) or a Power Management Bus (PMBus). The SMBus can define a set of protocols for inter-device communications. PMBus can be a variant of an SMBus and can provide additional protocols for power management. In some examples, the BMS may communicate internally by use of a smart battery system via the SMBus. In other examples, the BMS may communicate internally by use of a smart battery system via the PMBus. The smart battery system can use a special integrated circuit in the battery to monitor the battery, report information and/or perform power management operations via a smart battery charger (e.g., based on estimated remaining charge on the battery). In some cases, the BMS may use one or more specific integrated circuits (ICs) that provide voltage sensing, current sensing, and/or fuel (e.g., active material) gauging functions. In other cases, the BMS may use one or more specific integrated circuits that provide voltage and/or current isolation across different areas of the circuit or provide isolated communication links (e.g., isolated voltage and/or current communication links) between different parts of the system.

The BMS may protect an energy storage system (e.g., battery) by preventing it from operating outside given operating conditions (e.g., its safe operating conditions), such as, for example: over-current (e.g., can be different in charging and discharging modes), over-voltage (e.g., during charging), under-voltage (e.g., during discharging), over-temperature, under-temperature, and/or over-pressure (e.g., for NiMH or lead-acid batteries). In some examples, the BMS can detect ground fault or leakage current conditions in cells. When a battery is found to be operating outside its safe operating conditions, the BMS can prevent such operation by implementing one or more actions or features. In some examples, the BMS may include an internal switch (e.g., relay or solid state device) that is activated (e.g., opened) if the battery is operated outside its safe operating conditions. In some examples, the BMS may request the devices (e.g., loads) to which the battery is connected to reduce or even terminate using the battery (e.g., power electronics are signaled to stop flow of current through the battery). In other examples, a BMS may actively control the environment, such as, for example, through heaters, fans, lift-gates, valves, air conditioning and/or fluid coolant(s).

The BMS may provide the capability to monitor cell temperatures to ensure that the accessible charge and discharge capacities of the battery do not decrease over time due to the unbalancing of temperatures among cells or batteries. In some examples, the BMS may monitor the temperatures of individual cells. In some examples, the BMS may monitor the temperature of groups of cells (e.g., individual cell modules, cell packs, or some cell packs within a core). In some cases, the BMS can monitor temperature of heat intake and/or heat output (e.g., temperature of dissipated heat) of individual cells, groups of cells or batteries. In some cases, the BMS can monitor temperature of coolant intake and/or coolant output of a group of cells (e.g., a pack, a core, a CE, or a system).

A BMS board may control the cell temperatures using a variety of approaches. When a cell temperature is below the minimum operating temperature, the control system or BMS may increase the charging or discharging rate for the individual cell, and/or turn on a heating source (e.g., resistive heating elements located within the thermal enclosure of a core) for a cell, a cell module, a cell pack, multiple cell packs, portions of a core or a complete core, until its temperature exceeds the minimum operating temperature (e.g., 450° C.). When a cell temperature is above the maximum operating temperature, the control system or BMS may decrease or stop the charging or discharging of the cell or group of cells (e.g., cell pack), turn on a cooling fan, open vents to allow for convective cooling, and/or turn on a liquid coolant for the individual cell, until its temperature drops below the (e.g., pre-set) maximum operating temperature (e.g., 550° C.).

The BMS may also measure and/or control cell voltage (e.g., potential difference between the positive and negative terminals, or components that are electrically connected to the positive and negative terminals, respectively) of parallel strings of cells. The BMS may provide feedback to the power electronics as a means to ensure that the cells do not exceed a given (e.g., pre-defined) cell charge cut-off voltage limit. In some examples, the pre-defined cell charge cut-off voltage limit is about 0.9 V, 1.0 V, 1.1 V, 1.2 V, 1.3 V, 1.4 V, 1.5 V, 1.6 V, 1.7 V, 1.8 V, 1.9 V, or 2.0 V. The BMS may ensure that the cells do not drop below a given (e.g., pre-defined) cell discharge cut-off voltage limit. In some examples, the pre-defined cell discharge cut-off voltage limit is about 0.6 V, 0.5 V, 0.4 V, 0.3 V, 0.2 V, 0.1 V, or 0 V.

The BMS may also provide voltage isolation to prevent cell voltages from interfering with sensitive analog and digital measurements. Voltage isolation may be achieved by using a combination of components that are rated for at least about 60V, 100V, 150V, 300V, 600V, 800V, 1000V, 1500V of DC isolation, by using isolated power sources and electrical grounds in BMS circuits, by isolating communications links through isolation transformers (galvanic and electromagnetic isolation) or opto-couplers (optical isolation), by using dedicated isolated communications transceivers and integrated circuits, by physically spacing high and low voltage components, by using special features and geometries for parts, interconnects and/or traces on circuit boards, or any combination thereof.

In some implementations, the BMS can comprise a pre-charge system. The pre-charge system can allow the battery to be connected to different loads in a safe way, and/or eliminate excessive inrush currents to load capacitors. The connection from battery to loads may normally be controlled through electromagnetic relays (e.g., contactors). In some examples, the pre-charge circuit can include power resistors that are connected in series with the loads until the capacitors are charged. In some examples, a switched mode power supply connected in parallel to loads can be used to charge the voltage of the load circuit up to a level close enough to battery voltage in order to allow closing of the contactors between the battery and the load circuit. The BMS may include a circuit that can check whether a relay is already closed before pre-charging (e.g., due to welding) to prevent inrush currents to occur.

The BMS may actively ensure (e.g., through electrochemical balancing) that at least a portion of the cells (or groups of cells, such as, for example, cell modules) in the battery are at and/or maintained at a similar voltage or state of charge (e.g., in order to maximize the battery's useful capacity, and/or to prevent localized under-charging or over-charging). In some cases, the BMS can balance the cells (or groups of cells, such as, for example, cell modules) by releasing energy and/or charge from the most charged cells by connecting them to a load (e.g., through passive regulators). For example, the system can balance the SOC of individual electrochemical cells or groups of electrochemical cells of a plurality by selectively depleting and dissipating charge from one or more electrochemical cells with excess SOC, thereby equalizing the SOC of the electrochemical cells with excess SOC with the remaining electrochemical cells of the plurality. In some cases, the BMS can balance the cells (or groups of cells, such as, for example, cell modules) by reducing or stopping the charging current to a sufficiently low level such that current may be bypassed around cells that have reached a pre-defined SOC level. For example, the system can balance (e.g., equalize) the SOC of individual electrochemical cells or groups of electrochemical cells of a plurality by bypassing charging current around one or more electrochemical cells that are at full SOC, thereby providing the bypassed charging current to one or more electrochemical cells that are SOC deficient (e.g., allowing them to reach full charge status). In some cases, the BMS can balance the cells (or groups of cells, such as, for example, cell modules) by shuffling energy and/or charge from the most charged cells to the least charged cells (e.g., via balancers). In some cases, the BMS can balance the cells (or groups of cells, such as, for example, cell modules) by selectively charging individual cells or groups of cells (e.g., cell modules) by selectively applying charge to cells that are not at a full SOC. In some cases, the BMS can balance the cells (or groups of cells, such as, for example, cell modules) by selectively charging the least charged cells by connecting the cells to an external power supply (e.g., an external power source that is tied to the electric power grid or an isolated external power source/supply). In some cases, the system can balance (e.g., equalize) the SOC of individual electrochemical cells or groups of electrochemical cells of a plurality by transferring and storing charge from one or more electrochemical cells with excess SOC in a charge reservoir and delivering the charge stored in the reservoir to one or more electrochemical cells that are SOC deficient.

In some cases, the BMS board is outside the thermally enclosed chamber of a group of cells (e.g., the core), and the wires used for balancing pass through the thermal insulation (e.g., of the core) to connect the positive and/or negative terminals of a cell module with the BMS board. In some cases, the BMS system is not designed to disconnect a cell or cell module from its series or parallel connection with other cells or cell modules. Rather, the BMS system may be capable of closing a circuit and providing a path for current to flow around the cell rather than through the cell, or independently discharging or charging one cell or group of cells (e.g., cell module) within an array of series-connected cells or groups of cells (e.g., cell modules).

Balancing by releasing energy from the most charged cells by connecting them to a load may be accomplished by closing a circuit on a BMS board that is connected by wires to the positive and negative terminals of the cell or a group of cells (e.g., cell module) that is highly charged, and allowing current to pass from the negative terminal of the cell or group of cells (e.g., cell module) through a resistor, then back to the positive terminal of the same cell or cell module, thereby reducing the SOC of that cell or group of cells (e.g., cell module or cell pack).

In some implementations, balancing may be achieved by reducing the charging current passed through a cell or a group of cells (e.g., cell module) that is about fully charged. For example, balancing by reducing the charging current passed through a cell or a cell module that is about fully charged may be accomplished by lowering the current applied by the main power supply (e.g., power electronics such as a bi-directional inverter) to the pack and/or system to an acceptably low level (e.g., about 0.1%, about 1%, or about 10% of maximum system current capability), and closing a circuit on a BMS board that allows electrons to flow from the negative terminal of the cell or cell module to the positive terminal of the same cell or cell module. The electron flow that is allowed to flow through this external circuit path can be about equal to the current being applied by the power supply to the series-connected cell packs and/or cell modules. When the electron flow is allowed to pass through this external circuit instead of passing through the cell or the cell module, the cell or the cell module may be considered to be 'bypassed' and may remain at about the same state of charge (e.g., about a fully charged state) during this bypass process. This method can allow electrons to continue to flow through and charge other cells or groups of cells (e.g., cell packs) that are not yet fully charged and are not being bypassed, thereby increasing their state of charge while the bypassed cells are held at about the same state of charge (e.g., at about a fully charged state). Once a cell or a group of cells (e.g., cell module) reaches a given (e.g., pre-defined) voltage cut-off limit to signify that it has reached a given SOC (e.g., it is about fully charged), the BMS can close a circuit to allow this cell or cell module to be bypassed. The battery management system may measure the current that is routed through the bypass to further refine SOC estimates for the cells. This process may continue until all cells are bypassed, at which point, they may have about the same SOC (e.g., all about fully charged) and the balancing process is complete. The circuits on the BMS boards that enabled the cell bypassing can be opened and the power supply can stop applying current, or go back into a normal operating mode. The normal operating mode may include first discharging and then charging and/or discharging.

In some examples, the BMS may actively charge cells that are at a lower state of charge until cell(s) (e.g., all cells) have a state of charge within about ±0.1%, ±1%, ±5%, ±10%, ±20%, or ±50% of each other (e.g., within about ±0.1% or ±1% of other cells in the system). In some examples, the BMS may actively charge a cell such that its state of charge is within a given (e.g., defined) range of cells discharge capacity (e.g., such that the cells demonstrate discharge capacity). In some implementations, the cells discharge capacity can be a parameter that can be used to benchmark cells for balancing or state of charge estimation purposes.

In some implementations, balancing can be accomplished by shuttling energy and/or charge from the most charged cells to the least charged cells. In some cases, the shuttled energy and/or charge may be temporarily stored using a balancing device such as a battery and/or capacitor. In some cases, the BMS system comprises wires that emanate from the positive and negative terminals of a set of series-connected cells or groups of cells (e.g., cell modules) and are collectively connected to a multiplexer (e.g., high current bi-directional multiplexer) circuit, which in turn is connected to the balancing device. The multiplexer circuit may be able to separately connect and disconnect pairs of wires that are connected to the positive and negative terminals of a cell or a group of cells (e.g., cell module) with wires that are connected to the positive and negative terminals of the balancing device. Initially, the multiplexer can connect the balancing device to one group of cells (e.g., cell module) which may discharge until the voltage of the balancing device and the group of cells (e.g., cell module) are about the same. The multiplexer may then connect a different group of cells (e.g., different cell module) with the balancing device. If the voltage of a group of cells (e.g., cell module voltage) is greater than the balancing device voltage, the group of cells (e.g., cell module, or one cell, such as, for example an individual cell in the group of cells) can discharge to the balancing device, decreasing its SOC. If the voltage of a group of cells (e.g., cell module voltage) is less than the balancing device voltage, the balancing device can discharge to the group of cells, thereby increasing the SOC of the group of cells (e.g., cell module, or one cell, such as, for example an individual cell in the group of cells). By sequentially connecting (e.g., all of) the groups of cells within a series-connected string, the BMS system may be able to increase the SOC of the groups of cells that are at a lower-than-average SOC, and the BMS may decrease the SOC of group of cells that are at a higher-than-average SOC, thereby balancing out the SOC of such groups of cells and effectively balancing the system. Similarly, if the system comprises multiple balancing devices and multiplexer systems that each balance a subset of the full series-connected string of groups of cells (e.g., full series-connected string of cell modules), a separate balancing device and multiplexer can be connected to the first set of balancing devices and effectively balance out the SOC of the balancing devices, thereby enabling all of the groups of cells that are series-connected in the battery to be balanced. In some cases, balancing a string of series-connected cells or groups of cells may be more efficient than other approaches to balancing since most of the energy extracted from cells (e.g., at least about 70%, at least about 80%, at least about 90%, at least about 95%, or at least about 99%) is used to charge up other cells and the energy is not intentionally spent/dissipated.

Balancing may be performed between groups of cells or between individual cells in a group of cells. For example, the balancing device can be electrically connected with a group of cells and/or with two or more individual cells. The multiplexer can connect the balancing device to an individual cell (e.g., in a group of cells) which may discharge until the voltage of the balancing device and the group of cells (or, in some cases, another individual cell) are about the same. The multiplexer may then connect a different individual cell (e.g., in the same group of cells) with the balancing device. If the voltage of a cell is greater than the balancing device voltage, the cell can discharge to the balancing device, decreasing its SOC. If the voltage of a cell is less than the balancing device voltage, the balancing device can discharge to the cell, thereby increasing its SOC. By sequentially connecting (e.g., all of) the cells within a group of cells, the BMS system may be able to increase the SOC of the cells that are at a lower-than-average SOC, and decrease the SOC of the cells that are at a higher-than-average SOC, thereby balancing out the SOC of such cells.

In some implementations, balancing cells or cell modules can be accomplished by selectively charging individual cells or groups of cells (e.g., cell modules) by selectively providing charge to cells that are not at a full SOC. In some examples, the system may be charged with the main power supply (e.g., power electronics such as a bi-directional inverter) until one cell or one group of cells (e.g., cell module) reaches a charge cut-off voltage limit. The main power supply may then stop the main flow of current to the cells or groups of cells and the BMS system may begin a balancing procedure. Here, a BMS board may close a circuit and provide current to individual groups of cells while monitoring the cell voltage(s). The current applied to the cell or group of cells may be less (e.g., less than about 50%, 10%, 5%, 1%, or 0.1%) than the maximum current flow provided by the main power supply (e.g., power electronics such as a bi-directional inverter). The BMS board may monitor the voltage of the cell or group of cells and adjust current to ensure that the cell or group of cells does not exceed a given (e.g., pre-defined) charge voltage cut-off limit. Once the cell or group of cells reaches the charge voltage cut-off limit, the BMS board may open a switch and decrease or stop current from flowing to that cell or group of cells. The BMS system may perform this activity on multiple cells or groups of cells simultaneously or sequentially, thereby charging up at least a portion or all of the cells or groups of cells to a full SOC, thus balancing out the system. This process may be considered to be efficient because energy used to balance the cells or groups of cells may later be returned to the grid during the discharging of the battery.

A BMS of the disclosure may be implemented in various topologies. In some examples, the BMS can be configured in a centralized topology: for example, a single controller can be connected to the battery cells through a plurality of wires (e.g., the controller can be connected to each battery cell via an individual wire). In some examples, the BMS can be configured in a distributed topology: for example, a BMS battery controller board can be installed at each cell, module or pack (or other group of cells), with communication cables connecting multiple battery controller boards to each other and/or to a higher order master controller. In some instances, the master controller may then be connected to other higher order controllers. In some instances, the master controller may be connected to other master controllers from different battery strings. In some examples, the BMS can be configured in a modular topology: for example, a few controllers can be provided, each controller handling a certain number of cells, with communication between the controllers. Among these topologies, centralized BMSs may in some cases be most economical, least expandable, and/or plagued by a multitude of wires. Distributed BMSs may in some cases be most expensive, simplest to install, and/or offer cleanest assembly. Modular BMSs may in some cases offer a compromise of the features and problems of the other two topologies.

A BMS system may comprise a subsystem (or be in communication with another system) dedicated for voltage measurement of cells. Such a (sub) system may be non-operational under given conditions (e.g., until cells are within less than about 1° C., 5° C., 10° C., 25° C., 50° C., 100° C. or 200° C. of cell operating temperature). The voltage measurement (sub) system may be rendered non-operational by preventing specific controllers, portions of controllers or specific circuit components from being powered (e.g., until cells are not within about 50° C. of cell operating temperature). In some examples, the voltage measurement (sub) system may be powered up and energized, but may be commanded through software not to make any voltage measurements. In other examples, the voltage measurement (sub) system may be powered up and energized, and may proceed to make voltage measurements, but the measurements may be disregarded and not made available for system control functions. For example, the measurements are disregarded when the cell temperature is at least about 50° C., 55° C., 60° C., 65° C., 70° C., 80° C., 90° C., or 100° C. less than the operating temperature of the battery (e.g., at least about 250° C.). In some situations, the BMS may be programmed to power down and de-energize when the operating temperature is at least about 50° C., 55° C., 60° C., 65° C., 70° C., 80° C., 90° C., or 100° C. less than the operating temperature of the battery. In yet other examples, such as, for example, upon failure or breach of one or more cells, the voltage measurement sub (system) may remain operational (e.g., remain powered up and continue measuring voltage) as cell conditions change upon the failure/breach (e.g., rapidly decreasing temperature), or may become non-operational (e.g., be powered down as controlled by a system controller) at one or more given conditions (e.g., temperature at least about 50° C., 55° C., 60° C., 65° C., 70° C., 80° C., 90° C., or 100° C. lower than expected or last recorded cell operating temperature; voltage at least about 5%, 10%, 15%, 25% or 50% below (i) a voltage as last recorded for the cell or (ii) one or more voltage(s) of other cells, such as, for example, other cells in the same group of cells or other cells in communication with the same controller or BMS board; or current at least about 5%, 10%, 15%, 25% or 50% below (i) a current as last recorded for the cell or (ii) one or more current(s) of other cells, such as, for example, other cells in the same group of cells or other cells in communication with the same controller or BMS board).

A BMS system may provide a human machine interface implemented either through visual indicators (e.g., LEDs or LED arrays, LCD displays, touch screens or similar). The interface can enable communication of information to and/or from, and/or interaction with, a user, operator (e.g., system operator), technician, a hardware/software developer, etc (collectively referred to as "users" herein). The interface may allow information to be output to the user. The interface may in some cases allow information to be input by the user. In some cases, the human machine interface comprises a user interface (e.g., a graphical user interface). Additionally, the BMS system may have a dedicated service access port as part of its communications interface to which an operator, user or service technician or a hardware/software developer can connect diagnostic or display devices (e.g., approved diagnostic or display devices). In some cases, access can be given to an operator, user, technician or developer to connect to the controller and monitor it for compliance to design requirements during development. In some cases, access can be given to an operator, user, technician or developer to connect to the controller and monitor the operation of the controller during deployed lifetime. The service access ports can also be used to implement software/firmware upgrades to correct bugs or update system performance (e.g., over time). In some instances, the BMS may comprise dedicated port(s) (e.g., one or more of the service access ports) that allow code updates for part of or all of the system. The BMS (e.g., in distributed topology) may be capable of distributing software updates for at least a portion or all connected systems through a service access port.

The BMS and/or the service access port(s) may restrict access to different levels of the system (e.g., to different layers of functionality) to maintain system security through use of access restrictions, passwords, token-based authentication or other encryption methods. Such authentication-based access can be implemented via the human machine interface (e.g., via input of an access code, personal information, fingerprint, etc.). In some cases, users can access the different layers of functionality based on job function and/or responsibility. For example, an operator may access multiple levels of functionality while a technician may access a limited set of functions.

The BMS or a related control system may track (or monitor) the discharge capacity of the battery and/or the time it takes to electrically balance the cells, and provide signals to operators or automated operating systems that may flag underperforming or failed cells for further monitoring and/or signal the need for replacement of one or more cells or groups of cells (e.g., cell/module/pack/core replacement).

Figure 10:
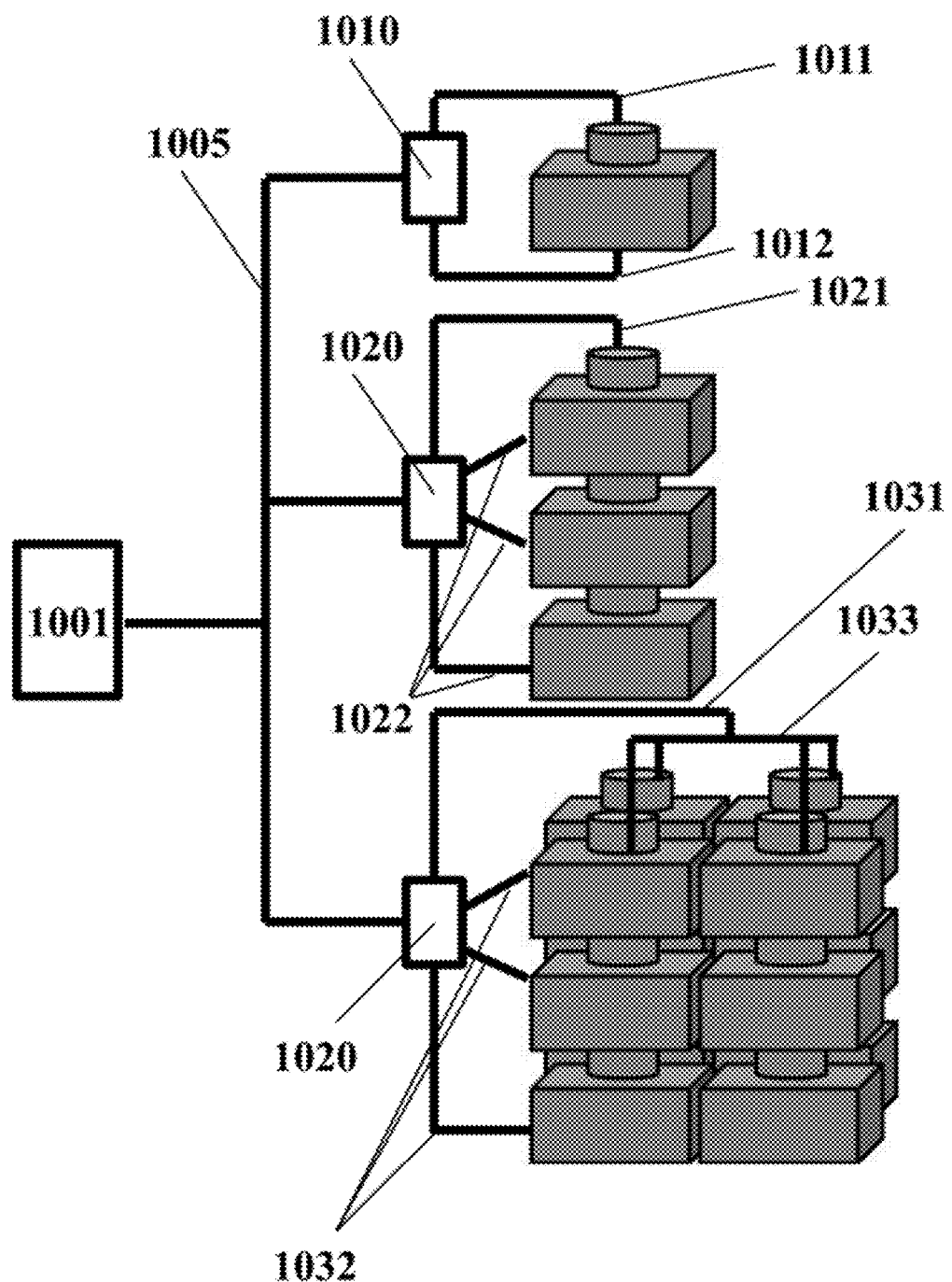
FIG. 10 shows an example of a battery management system (BMS)

Provided herein are examples of implementations of a BMS. FIG. 10 shows an example of a BMS. The BMS comprises a board 1001 programmed or otherwise configured to control or regulate one or more distributed daughter boards. The BMS can receive (e.g., at the BMS board 1001) input from a server or from a remote computer system via a network. In some situations, the system includes a single BMS board. In other situations, the system includes multiple BMS boards that may or may not be interconnected with one another. The BMS board 1001 can control and receive input from one or more daughter boards, as illustrated in FIG. 10. The BMS can be connected (e.g., via one or more daughter boards) to each terminal point of a cell or cell module (e.g., to the top of every cell and to the bottom on every cell). In an example, 4 connections are provided for 3 cells in series. In another example, 4 connections are provided for 3 series-connected 4-parallel-cell modules. The number of connections may equal the number of cell modules plus 1.

In an example of a distributed topology, a daughter board 1010 (e.g., a cell or module controller) is installed at each cell or cell module (e.g., parallel connection of individual cells). The daughter board 1010 can be directly connected to each cell (or cell module), as indicated by connections 1011 and 1012 (e.g., of negative and positive polarity, respectively, where the connection 1011 can be a negative current lead). Cells within a module may be connected via their cell bodies, so cell modules may only need one connection on the cell body and one on the negative current lead. The daughter boards can compute and control their individual cell or cell module status(es) locally. The daughter board 1010 can monitor and control each cell or cell module individually. During charging or discharging modes, the current may be provided using additional electrical connections to connect to the positive and negative terminals of the individual cell, the series connected string of cells, or the series connected string of cell modules (not shown in FIG. 10).

In an example of a modular topology, one daughter board 1020 (e.g., pack controller) can control a number of cells or cell modules that are stacked together in a pack. The daughter board 1020 can be directly connected to each cell module in a pack, as indicated by connections 1021 and 1022 (e.g., of negative and positive polarity, respectively). The daughter board 1020 can monitor and control voltage, current and/or temperature of cells that are connected to it (e.g., through connections 1022).

In an example of a centralized topology (or a modular topology when part of a larger system), one daughter board 1020 (e.g., pack controller) can control multiple cells in parallel, in series or both in parallel and in series (e.g., a pack or a core). The daughter board 1020 can be directly connected to each cell module in a pack or a core, as indicated by a connection 1031 and individual connections 1032 (e.g., of negative and positive polarity, respectively). In some cases, negative current leads on the top module can be connected via a busbar 1033, and the busbar can be connected to the connection 1031. The daughter board 1020 can monitor and control voltage, current and temperature of cells that are connected to it (e.g., through connections 1032). The BMS board 1001 may be used for balancing packs (e.g., for balancing between a first module of a pack and a second module of a pack), estimating state of charge of a pack, controlling charge and discharge status of a pack and/or communicating status to higher controllers in the system.

In an example of a system configured in a distributed and/or modular architecture, the daughter board connects to series and parallel combinations of cells (e.g., packs). Multiple packs, each with similar configuration of series and parallel cells, may be suitably (e.g., optimally) arranged (e.g., spatially) and daughter boards for each pack may communicate to the BMS board 1001.

In some examples, the daughter boards can monitor one or more parameters (e.g., voltage, current, temperature, state of charge, state of health, etc.) from a cell, a cell module, a pack, a core, or a system, and communicate these parameters back to the BMS board 1001. For example, voltage, current and temperature measurements made by a daughter board can be aggregated and communicated to the BMS board 1001, where state of charge estimates can be computed and decisions made regarding continuation of charge or discharge. The BMS board 1001 (e.g., core controller) can communicate with both daughter boards and higher level controller(s) in the system through I2C bus, MODBUS, CAN bus, SPI bus, isolated SPI bus or similar communication line. The BMS board 1001 can send control commands to the daughter boards. Based on the commands, the daughter boards can perform actions that control one or more cells such as, for example, increasing or decreasing temperatures of cells, balancing the voltages and/or SOC of cells or groups of cells (e.g., cell modules), and so on.

In some implementations, the BMS board may be located some distance away from the cells, enabling the cells to operate at operating temperature (e.g., about 460° C.) and the BMS board to operate near ambient temperature (e.g., from about −50° C. to about +80° C.). The daughter boards, which can be thermally isolated from the cells, can be located closely to each cell or group of cells (e.g., cell pack) so that the daughter board is able to measure and/or track the voltage, current, temperature, state of charge (SOC) and/or state of health (SOH) of an individual cell, a group of cells or a battery. The BMS may have a transition zone or panel that provides thermal isolation between the cells, groups of cells or batteries, and the BMS, and allows wires (e.g., wire(s) that are used to monitor and manage cells) coming out of a hot zone in the immediate vicinity of the cells, groups of cells or battery (e.g., hot zone of the core) to cool and establish a thermal gradient along their length such that the end contacting the BMS is at an acceptably low temperature (e.g., less than about 80° C.).

Figure 11:
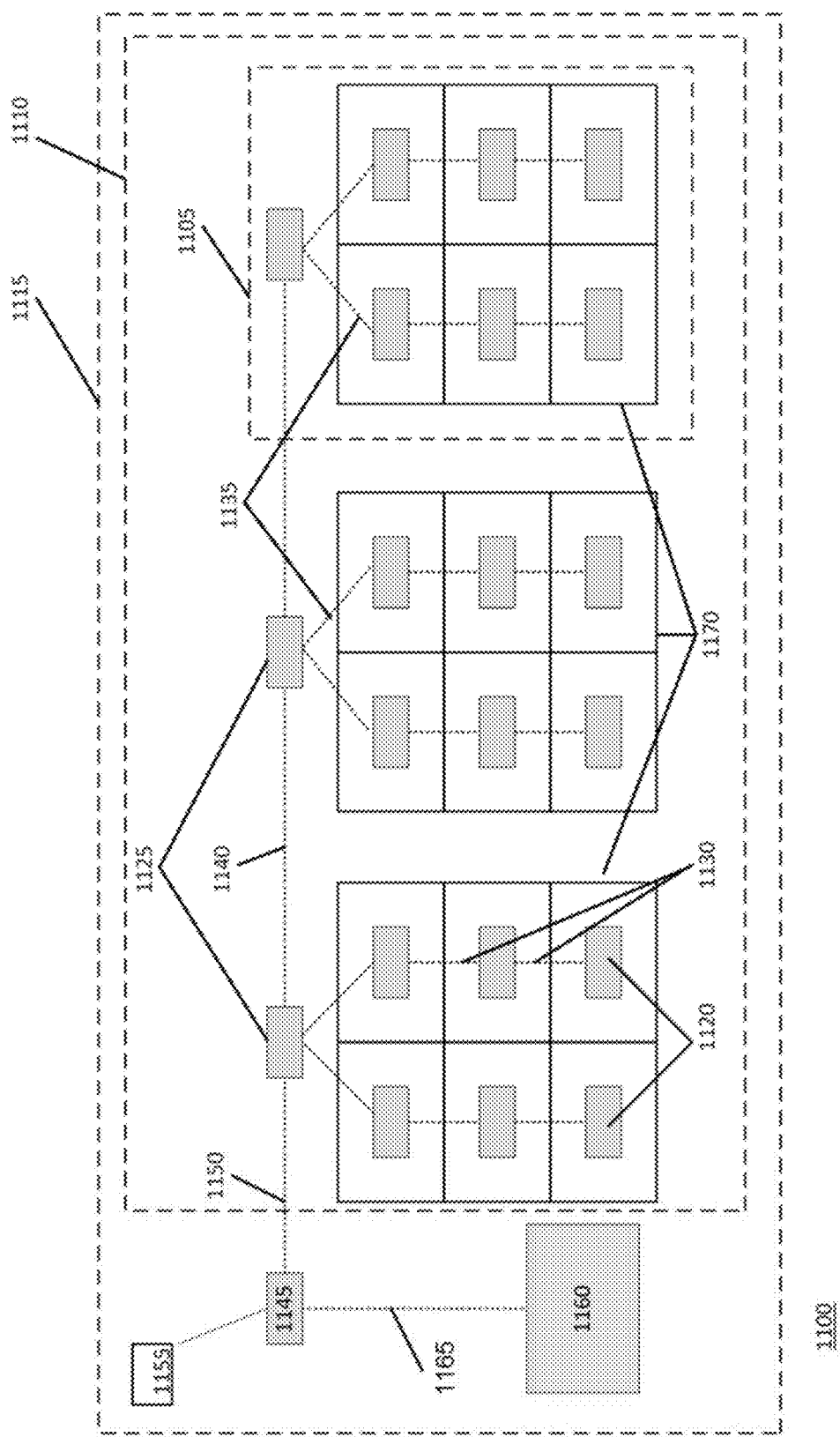
FIG. 11 in an example of battery management system (BMS) and supervisory control and data acquisition (SCADA) system architecture and communication wiring.

FIG. 11 in an example of a system 1100 that comprises a BMS and a supervisory control and data acquisition (SCADA) system and associated communication wiring. In some cases, the BMS may have a first boundary (e.g., BMS system boundary) 1105. In some cases, the BMS may have a second boundary 1110. In some cases, the BMS may have a third boundary 1115. In some cases, the system boundary may extend between the system boundaries 1105 and 1110. The BMS may be located within an energy storage system (e.g., comprising one or more cores 1170) and/or separately from the energy storage system. For example, BMS controllers (or boards) may be provided within or attached to cells, modules, packs, cores, systems or batteries. Alternatively, or in addition, stand-alone components may be provided.

The system may comprise one or more pack controllers 1120. The pack controllers may communicate with each other via pack-to-pack communication wires 1130. The pack controllers may communicate with a core controller 1125 via pack-to-core controller communication wires 1135. The system may comprise one or more core controllers 1125. The core controllers may communicate with each other via core-controller-to-core-controller communication wires 1140. One or more of the core controllers (e.g., a master controller) may communicate with a SCADA controller 1145 via a core-controller-to-SCADA system communication wire 1150. The SCADA controller 1145 may be provided with user-controlled input and/or market signal (e.g., electrical power grid) input 1155. In some cases, the SCADA controller may determine or by instructed to determine (e.g., via control software) the operating mode (also "operation mode" herein) of the system 1100 (or any portion thereof) with or without external user-controlled input or market input/signals. The SCADA controller 1145 may communicate with power electronics 1160 via a power electronics-to-SCADA controller communication wire 1165. In some cases, a utility may connect to the power electronics (e.g., a bi-directional inverter). In some examples of DC distribution systems, a bi-directional inverter can not only link a DC-BUS to an AC grid, but can adjust its current commands and operation modes to balance power flow and regulate the DC-BUS voltage. The DC-BUS may provide current/voltage from the energy system to a load (e.g., a power grid or utility).

Current may be measured at one or more locations in the battery and/or the BMS system. In some cases, the BMS (e.g., the pack controller 1020) may not measure current. In some cases, charge/discharge current and/or balancing current may be measured by a device (e.g., ampere-meter) on one or more terminals of a cell or group of cells. Such a measurement may be communicated to one or more BMS boards. In some cases, power electronics can determine the current (e.g., the current in a string of cores).

In some implementations, a method for balancing the voltage of a string of cells using a charge reservoir and/or charge redistribution system is provided. In an example, an electric double-layer capacitor (EDLC) or other high capacity charge reservoir can be connected in parallel with each cell of a multi-cell string one at a time. If the voltage of the cell is higher than the voltage of the charge reservoir, the cell loses charge to the reservoir and the voltage of the cell decreases. On the other hand, if the voltage of the cell is lower than the voltage of the charge reservoir, the reservoir loses charge to the cell and the cell voltage increases. This process is repeated until all cells in the string are at the same voltage.

Figure 12:
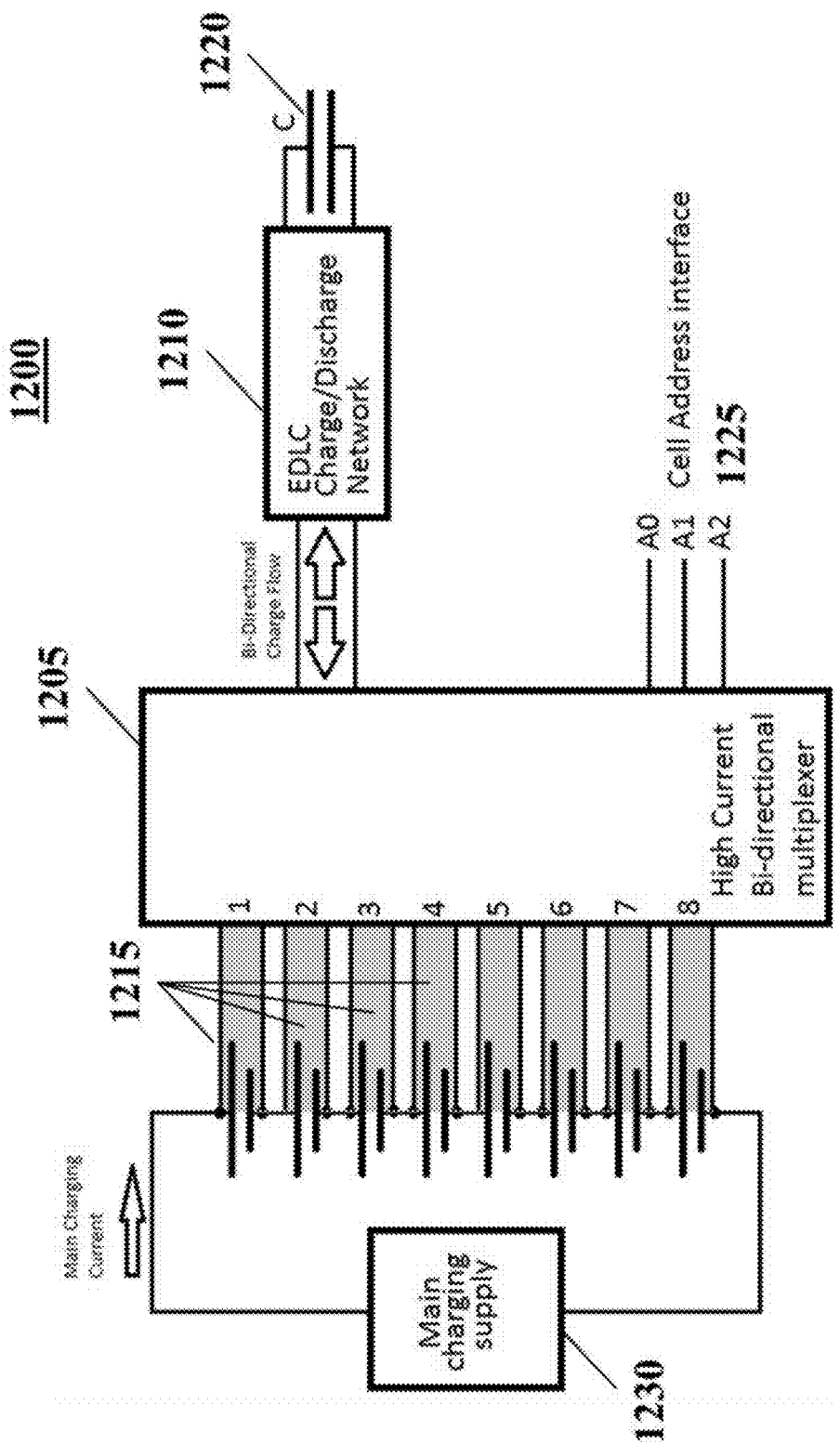
FIG. 12 is an example of a system for implementing a charge balancing scheme.

FIG. 12 is an example of a system 1200 for implementing a charge balancing scheme. Each cell 1215 in a series string can be connected by a switch to a charge reservoir 1220. Switching may be performed by a bi-directional multiplexer 1205. The bi-directional multiplexer may utilize a cell address interface 1225. The charge reservoir 1220 may comprise an EDLC. As each switch is closed (one at a time), charge flows from the cell 1215 into the charge reservoir 1220 if cell voltage is higher than reservoir voltage, and the voltage of the cell decreases. If cell voltage is lower than reservoir voltage, charge flows from the charge reservoir into the cell 1215, and the voltage of cell increases. As this process is repeated, voltage of all cells may eventually converge to the same value. No active control loop may be required.

The bi-directional multiplexer 1205 may be implemented using MOSFETs, FETs, transistors, IGBTs, relays, or any other switching technology with low resistance bi-directional path between an EDLC network (e.g., EDLC charge/discharge network) 1210 and the connected cells when ON and high isolation resistance between the EDLC network 1210 and the connected cells when OFF. In some examples, shunt regulators, op-amps and/or Zener diodes can be used to balance cells in a string. Such technologies may in some cases be dissipative and waste charge. The charge balancing configuration in FIG. 12 may redistribute the charge among the cells without intentionally wasting charge (e.g., providing a higher efficiency of energy storage systems). The series string of cells can be connected to a main charging supply 1230. In some situations, the main charging supply provides a main charging current to the cells. The main charging current may or may not be flowing during switching/balancing of the cells.

Capacitors of the disclosure may be used to aid in cell balancing (e.g., of series-connected cells) and may be combined with or modified by other devices, systems and/or methods. Such capacitors may be employed for use in floating capacitor balancing described in Chuang, Y.-C., "Floating Capacitor Active Charge Balancing for PHEV Applications," Undergraduate Thesis, The Ohio State University (2010), and cell balancing in pack cooling systems described in U.S. U.S. Pat. No. 8,643,500 ("APPARATUS AND METHOD FOR DIAGNOSING ABNORMALITY IN CELL BALANCING CIRCUIT") and U.S. Pat. No. 7,612,537 ("GALVANICALLY ISOLATED CHARGE BALANCE SYSTEM"), each of which is hereby incorporated herein by reference in its entirety.

Failure Condition Detection

The present disclosure provides methods for detecting a failure condition in an electrochemical energy storage system or device (e.g., a liquid metal battery). A failure condition can be a breach in a seal of an electrochemical cell of the electrochemical energy storage device. In some cases, an electrochemical energy storage system comprises a seal that is the weakest point of an electrochemical cell. In the event of a breach of the seal, the environment near the cell can experience damage. A breach can render the system inoperable or reduce the performance of the system. The methods and devices described herein can permit reliable detection of a breach through electrical and/or chemical signatures, thereby increasing the speed and reliability of breach detection. The methods for reliable breach detection described herein can result in quicker system-wide responses, thereby increasing safety and reliability of deployed systems.

A breach at the top of the cell can occur in an area that is in contact with the portion of the cell that is the headspace above the liquid cell components; thus, the breach may occur in an area of the cell that comprises active materials in a gaseous form (e.g., only in a gaseous form). For example, the active chemistry materials can be primarily or only in gaseous form in the vicinity of the seal (e.g., the breach is not in contact with a molten metal or a molten salt). In some cases, the molten metal and/or the molten salt gases may condense and form a thin layer of liquid on the seal, thus exposing the seal to the liquid state of the cell active components.

Detection systems of the disclosure can include chemical sensor input/measurements, electrical measurements and/or input/measurements from non-chemical sensors (e.g., thermocouples). Such failure detection mechanisms can include analog and digital signals. In some implementations, failure detection may be implemented with the aid of a control system (e.g., system 1600 in FIG. 16). The control system can be a battery management system. The detection systems herein may include one or more inputs and/or measurements. In some cases, the inputs and/or measurements can be at least partially processed and/or implemented at the control system. For example, the detection systems herein can be distributed across the control system (e.g., distributed between a controller/server 1601 and the energy storage system 1635 in FIG. 16).

In some cases, cell chemistry provides an electrical signature in the event of a breach. Some cell chemistries can provide a signal that is indicative of an air leak (e.g., failure of a seal in an external environment) through an increase in a leakage current of the cell, reduction in charge/discharge Coulombic efficiency, shorting of the cell, eventual failure of the cell as an open circuit (i.e., current is unable to pass through the cell), noisy voltage signals (e.g., sporadic fluctuations in cell voltage during constant current charging, discharging or resting over a period of milliseconds, seconds, and/or minutes), a sudden drop in cell voltage, a sudden change in cell internal resistance, reduced discharge capacity (e.g., in Ah), or any combination thereof. The systems and methods described herein can detect such signals (e.g., the higher self-discharge rate) as represented by, for example, more charge required during cell balancing, reduced discharge capacity, increased charge capacity, or a suppressed cell voltage during charging or discharging. Systems and methods described herein can determine (e.g., based on these parameters) that a cell breach has occurred. In some cases, the breached electrochemical cell (and in some cases cells adjacent to the breached cell) are inactivated, discharged and/or cooled down. The breached cell (in some cases including adjacent cells) can be replaced (e.g., by a human operator or robot).

In some implementations, the electrical signature may comprise a charge/discharge Coulombic efficiency value that is decreasing over time and/or is below a baseline Coulombic efficiency value associated with an unbreached cell or an unbreached group of cells. The baseline Coulombic efficiency value may in some cases be associated with an unbreached cell or an unbreached group of cells operated at a similar temperature (e.g., to within less than about 0.1%, 0.5%, 1%, 2%, 5%, 10%, 15%, 20%, 25% or 30%) or at substantially the same temperature (e.g., operating temperature) as the cell monitored for cell breach or as a group of cells comprising the monitored cell (e.g., in configurations where the cell is part of a group of cells). For example, the baseline Coulombic efficiency value may be associated with an unbreached cell or group of cells operated at a similar or substantially the same temperature (e.g., operating temperature) as the cell or group of cells suspected of comprising a breached cell.

In some cases, breach of an electrochemical cell is detected by a chemical signature. For example, the system can include a detection system for hydrochloric acid (HCl), hydrobromic acid (HBr), hydrofluoric acid (HF), hydroiodic acid (HI), chlorine gas ($Cl_2$), bromine gas ($Br_2$), fluorine gas ($F_2$), iodine gas ($I_2$), and/or stibine gas ($H_3Sb$). The detection system can include one or more sensors, such as vapor sensors that are sensitive to such gases. In some cases, the detection system can include other sensor(s) capable of detecting the gases described herein and/or other substances associated with (e.g., intermediate products of) materials inside the cell and/or in a cell seal.

In some implementations, a chemical signature may give rise to an electrical signature. For example, a chemical sensor can produce an electronic signal upon detecting a given condition (e.g., normal condition, breach condition, etc.). In some cases, a baseline (e.g., normal or constant) signal is measured and/or monitored. For example, an analog signal from a chemical sensor may be converted to a digital signal that is monitored by a control system (e.g., system 1600 in FIG. 16). In such situations, a deviation from the baseline signal (e.g., rate of change, increase with respect to the baseline, etc.) may trigger a breach condition. In some cases, only a given signal level may trigger a breach condition. For example, a given absolute or relative value (or range of values) of a concentration of a chemical component (e.g., HCl, $Cl_2$) may trigger a breach condition. The breach condition may produce an electronic signal that is communicated to a control system (e.g., system 1600 in FIG. 16). Other sensor(s), such as, for example, temperature sensors, may be used. For example, a temperature sensor may comprise a thermocouple. An analog signal from the thermocouple may be converted to a digital signal that is monitored (e.g., by a control system, such as system 1600 in FIG. 16). In some instances, a given decrease in the measured temperature may indicate a breach condition.

Baseline signals, signal changes and/or given absolute or relative values of sensor signals may be used to produce an audible alarm, an automated response with or without the aid of a control system (e.g., a mechanical switch), and/or may be communicated to the control system. The control system may receive analog and/or digital signal(s) from the sensor(s). The control system may analyze the signal(s). The signal(s) and/or their processing/analysis may trigger a response from the control system. For example, the control system may disconnect a load. In some cases, analog signals can be converted to digital signals (e.g., at a digital acquisition (DAQ) board of the control system). The electronic signal may be recorded and/or processed at the control system. The control system may react in response to the electronic signal.

The disclosure provides methods for detecting a breach of an electrochemical cell. The method comprises providing an electrochemical cell having a negative electrode, an electrolyte and a positive electrode, where at least one, two or all of the negative electrode, the electrolyte and the positive electrode is/are in a liquid state at an operating temperature of the electrochemical cell. The electrochemical cell can have a seal that isolates the negative electrode, the electrolyte and the positive electrode from an environment external to the electrochemical cell (e.g., air). In some cases, the operating temperature of the electrochemical cell is at least about 250° C. The method can include monitoring the electrochemical cell for an electrical signature that is indicative of a breach of the seal and exposure of at least one of the positive electrode, the electrolyte, and the negative electrode to the environment. In response to the electrical signature, the electrochemical cell can be inactivated, cooled and/or discharged.

In some implementations, the disclosure provides an energy storage system that comprises an electrochemical cell having a negative electrode, an electrolyte and a positive electrode, where at least one of the negative electrode, the electrolyte and the positive electrode is in a liquid state at an operating temperature of the electrochemical cell. A seal can isolate the negative electrode, the electrolyte and the positive electrode from an environment external to the electrochemical cell. The operating temperature of the electrochemical cell can be at least about 250° C. The energy storage system can have a controller that monitors the electrochemical cell for an electrical signature that is indicative of a failure (e.g., breach) of the seal and/or exposure of at least one of the positive electrode, the electrolyte, and the negative electrode to the environment, and in response to the electrical signature, inactivates the electrochemical cell, flags/provides notice to system operator(s) that a cell needs to be replaced, cools the electrochemical cell, and/or discharges the electrochemical cell. In some cases, the electrochemical cell is first discharged, then cooled (e.g., to ambient temperature or to a temperature at which the molten electrodes solidify). In some instances, the electrochemical cell is simultaneously inactivated and cooled. Upon inactivating the electrochemical cell, the temperature of the electrochemical cell can decrease from the operating temperature.

In some cases, an electrical signature (e.g., the electrical signature that is indicative of a failure, such as, for example, a breach of the seal) indicates that a cell or a group of cells (e.g., pack, core) may need to be replaced. This information may be communicated to a user or system operator (e.g., notification can be provided to a user or system operator of a system comprising an energy storage system (e.g., an energy storage device such as a battery, or a plurality of electrochemical cells) and a battery management system, or a user or system operator of the battery management system). In some cases, the notification may include a prompt to schedule a procedure to cool the electrochemical cell, to cool at least a portion of the plurality of electrochemical cells (or the energy storage system), and/or to replace a group of electrochemical cells among the plurality of electrochemical cells (or in the energy storage system). In some cases, the notification may include information that a replacement may be needed but may not include a prompt; in such cases, the user or system operator may decide whether to schedule such a procedure. In some examples, a procedure can be scheduled at a future time point to cool the system (e.g., the energy storage system) or to cool at least a portion of the plurality of electrochemical cells. In some cases, the procedure includes replacing a group of cells.

In some cases, the electrochemical cell is one of a plurality of electrochemical cells connected in parallel and/or in series and the plurality of electrochemical cells are inactivated, cooled and/or discharged in response to an electrical signature (e.g., an electrical signature that is indicative of a breach). The electrochemical cell can be part of a battery and the electrochemical cell can be replaced in the battery by another electrochemical cell that is not breached. In some cases, a group of electrochemical cells are replaced in the battery by another group (e.g., replacement group) of electrochemical cells that are not breached. The group of electrochemical cells can be, for example, a module, pack, core, CE or system. In some cases, the plurality or group of electrochemical cells are connected in series and parallel.

In some cases, the electrical signature comprises a leakage current that is increased relative to a baseline leakage current associated with an unbreached cell. The increased leakage current can be determined, for example, based on an increased time required to charge and/or balance a group of cells (e.g., a cell module) with the breached cell. In some cases, a breached cell cannot be charged.

Figure 13:
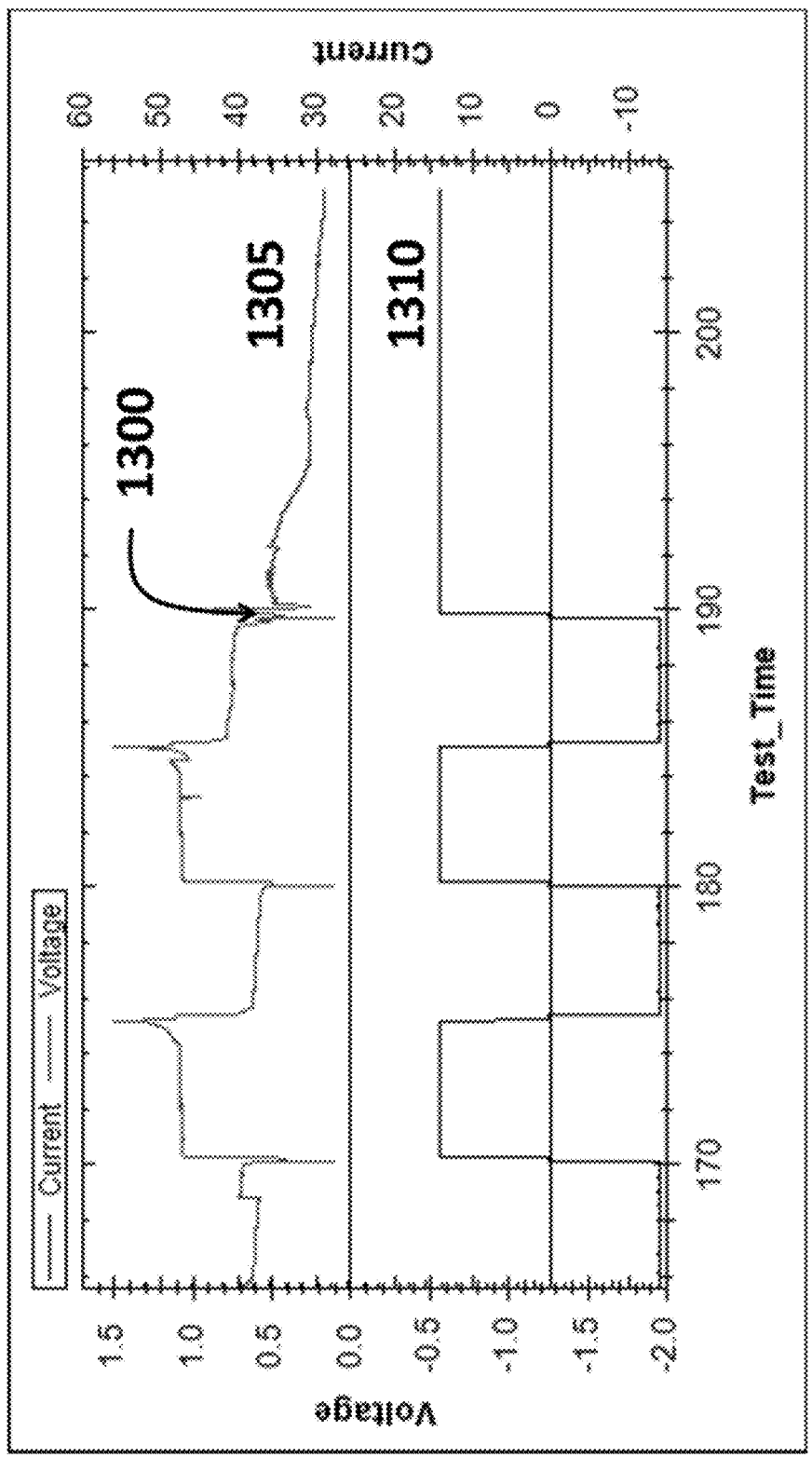
FIG. 13 shows an example of an electrochemical cell that is breached.

FIG. 13 shows an example of an electrochemical cell that is breached as indicated 1300. In this example, the cell fails to charge after the breach. The cell voltage decreases 1305 while the cell is being charged at a constant current 1310. This decrease in cell voltage under constant current can indicate increased leakage current and/or a short (e.g., increasing conductance or decreasing resistance).

Figure 14:
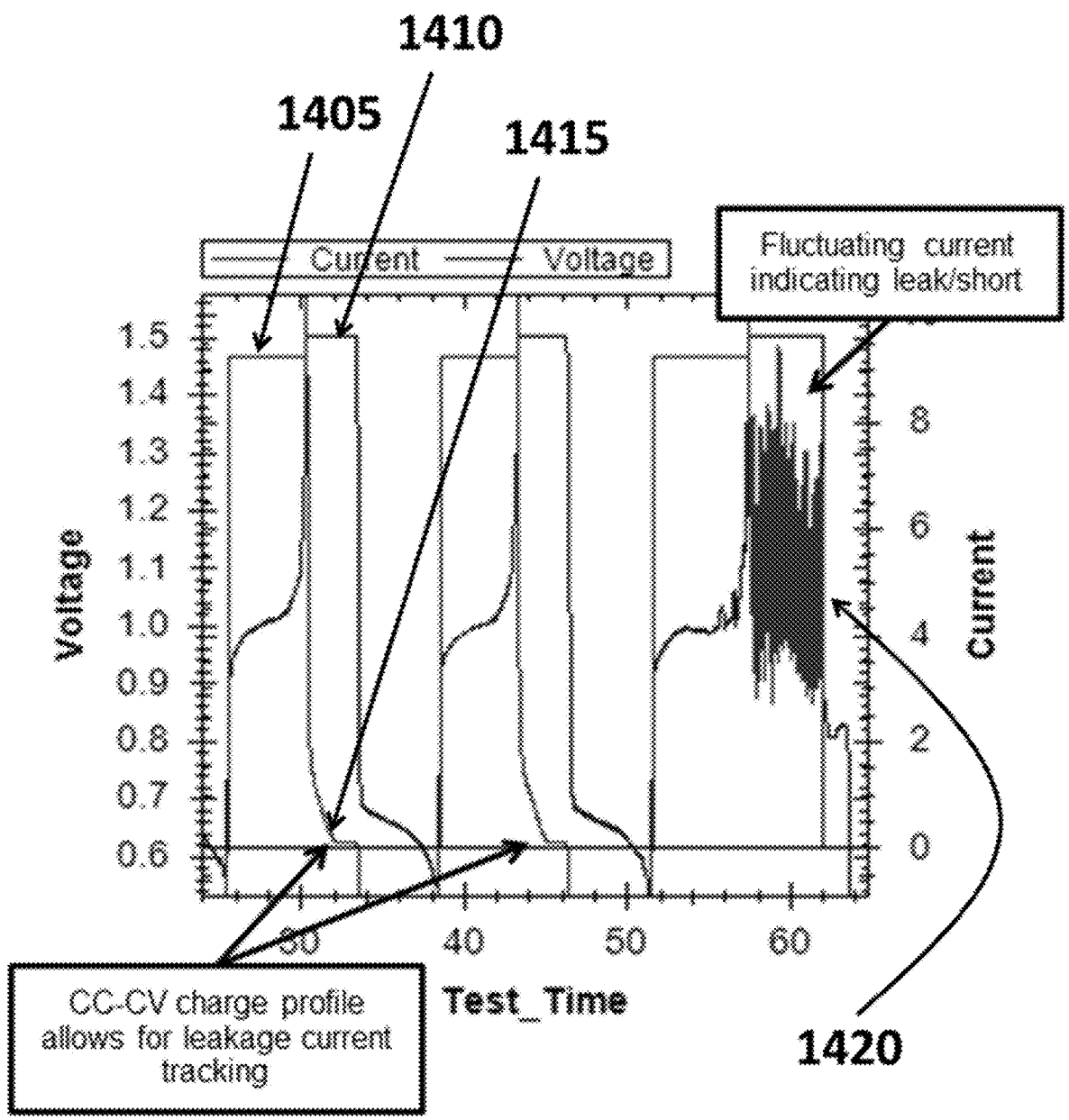
FIG. 14 shows an example of a cell that is operated with a constant current charge followed by a constant voltage float.

FIG. 14 shows an example of a cell that is operated with a constant current (CC) charge 1405 followed by a constant voltage (CV) float 1410. During a constant voltage float, the current normally decays down to very low levels 1415 (e.g., less than about 100 mA). Following a seal breach, the current can be much higher and fluctuate greatly 1420.

In some cases, the electrical signature comprises a self-discharge rate of the electrochemical cell that is increased relative to a baseline self-discharge rate associated with an unbreached cell. In some instances, the electrical signature comprises a voltage during charging or discharging of the electrochemical cell that is decreased relative to a baseline charge/discharge voltage associated with an unbreached cell. The electrical signature can be further indicative of shorting of the negative electrode with the positive electrode.

Figure 15:
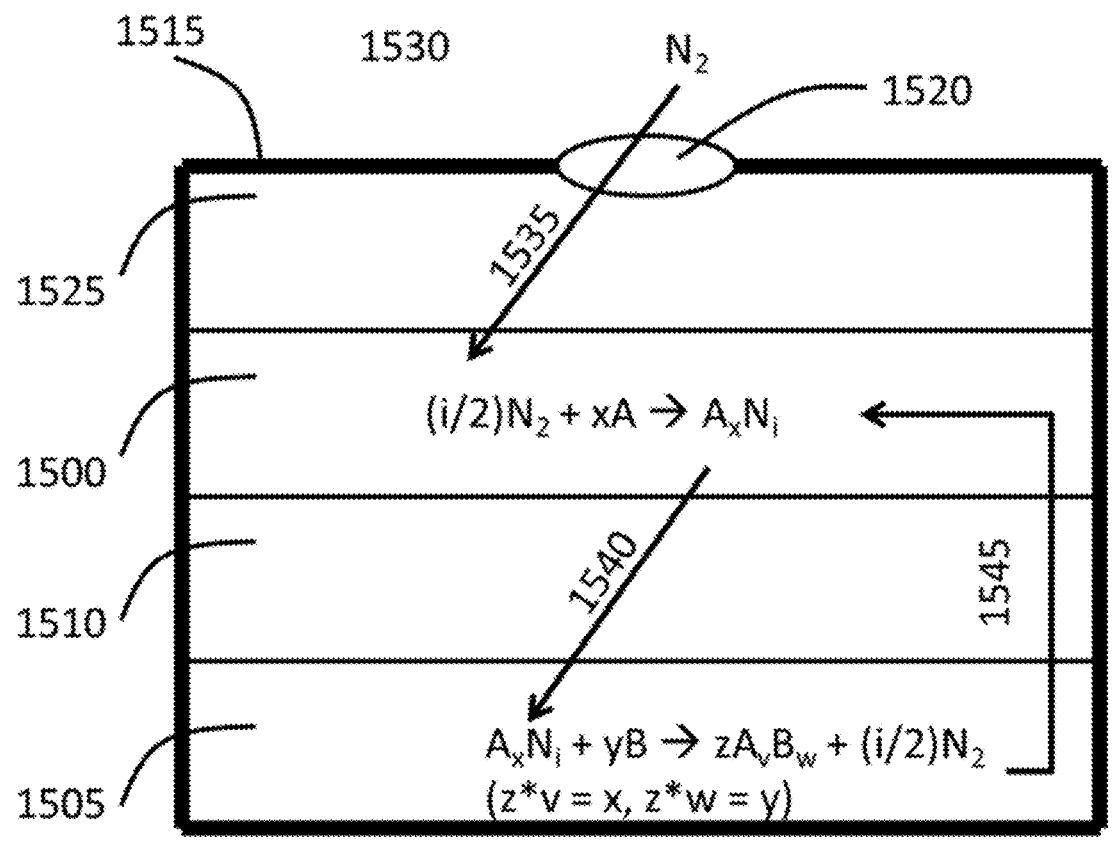
FIG. 15 shows an example of chemical reactions that can lead to an electrical signature of cell breach.

The electrical signature can be created upon breach by any suitable mechanism. An example of the mechanism is schematically illustrated for an electrochemical cell comprising a metal anode 'A' (e.g., Na, Li, K, Mg, Ca) and a metal cathode 'B' (e.g., Pb, Bi, Sn, Sb, Zn) active materials in FIG. 15. Here, an electrochemical cell has an anode 1500, a cathode 1505 and an electrolyte 1510 contained in a housing 1515 having a seal 1520. The anode 1500 can be a negative electrode during discharge and the cathode 1505 can be a positive electrode during discharge. The seal isolates the headspace 1525 in the cell from an atmosphere 1530. Upon breach of the seal, components of the atmosphere 1530 (e.g., oxygen, nitrogen, water vapor, etc.) can enter the cell. For example, upon breach of the seal, nitrogen ($N_2$) from the atmosphere enters the headspace of the electrochemical cell through a breach in the seal and contacts the anode (1535). The nitrogen can react with 'A' to produce a nitride compound '$A_xN_i$' (e.g., $Na_3N$, $Li_3N$, $K_3N$, $Mg_3N_2$, $Ca_3N_2$), which can diffuse through the electrolyte to contact the cathode (1540). In an example, A can be lithium and the nitride compound $Li_3N$ can be formed via the reaction ½ $N_2$+3Li→$Li_3N$. At the cathode, the nitride compound can react with the cathode metal to produce compounds having anode and cathode components (e.g., compounds having the formula $A_xB_y$, where x and y are variables, or compounds having the formula $A_vB_w$, where v and w are variables and where x/y=v/w, such as, for example, $Na_3Pb$, $Li_3Sb_2$, $K_3Pb$, $Mg_3Sb_2$, $Ca_3Sb_2$) and nitrogen gas ($N_2$). In the example where A is lithium, the anode and cathode materials can form LiSb via the reaction $Li_3N$+ 3Sb→3LiSb+½ $N_2$. In another example, lithium antimonide ($Li_3Sb$) may be formed. In some cases, 'i' can equal 'y'. The nitrogen gas can bubble back up to and/or diffuse back to the anode (1545). The introduction of water vapor (e.g., steam, moist air) into the cell can result in the oxidation of the anode metal and the release of hydrogen gas (e.g., 2Li+ $H_2O$→$Li_2O$+$H_2$). The presence of hydrogen gas can result in a chemical short process similar to the one that is generated by the presence of nitrogen gas as described herein.

Control Systems

Figure 16:
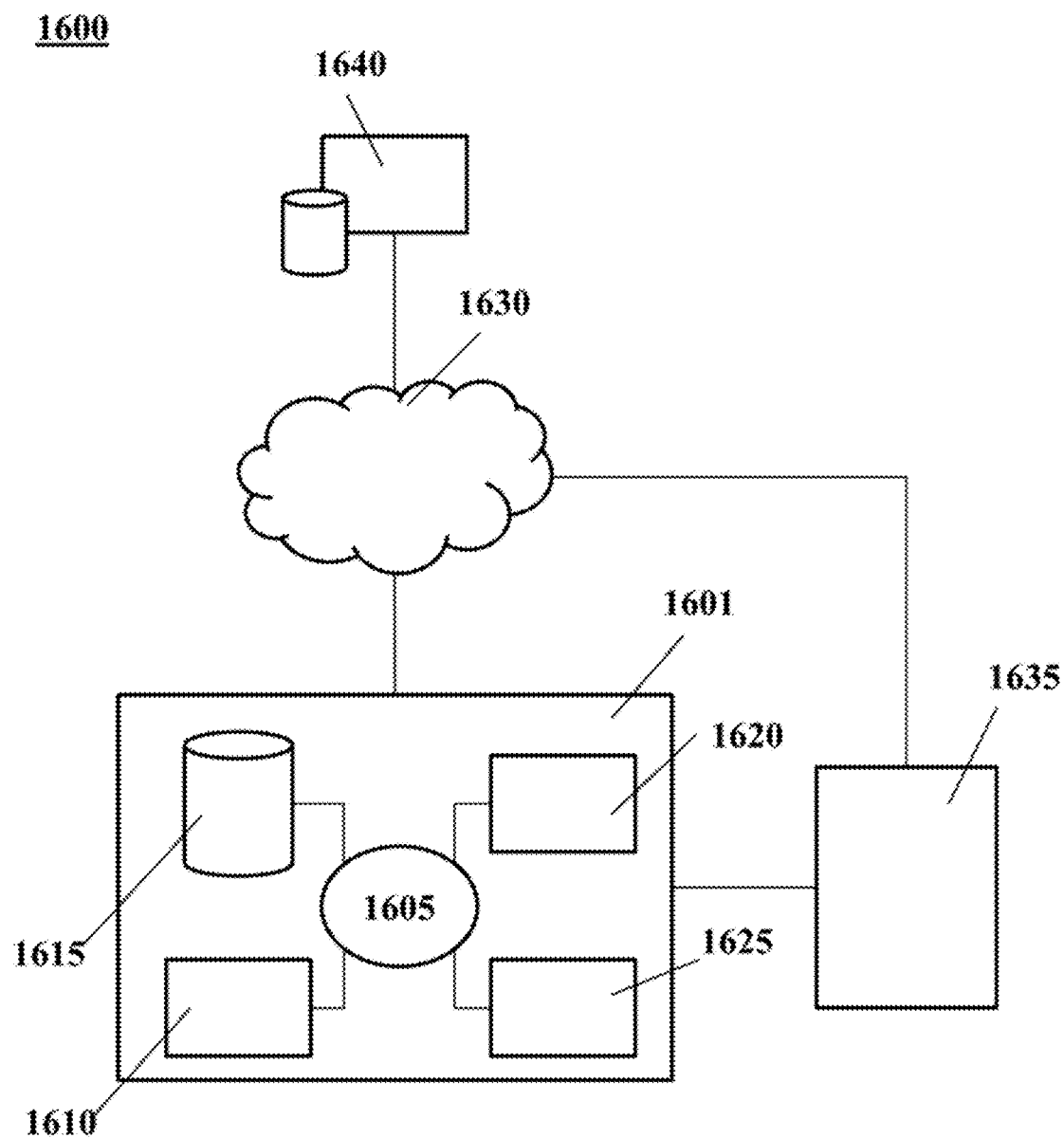
FIG. 16 shows an example of a computer system for implementing the methods of the disclosure, such as a battery management system programmed or otherwise configured to control or regulate one or more process parameters of an energy storage device.

Provided herein are computer control systems that are programmed to implement methods of the disclosure. FIG. 16 shows an example of a system 1600 that is programmed or otherwise configured to control or regulate one or more process parameters of an energy storage system of the present disclosure. The system 1600 can includes a computer server ("server") 1601 that is programmed to implement methods disclosed herein. In some cases, the system 1600 is or comprises a battery management system that comprises the server or controller 1601 that is programmed or otherwise configured to implement various battery management functions, including estimating cell state of charge and cell balancing. The battery management system (also "system" or "control system" herein) 1600 can be programmed or otherwise configured to regulate one or more process parameters of an energy storage device and a circuit coupled to the energy storage device.

The controller or server 1601 includes a central processing unit (CPU, also "processor" and "computer processor" herein) 1605, which can be a single-core or multi-core processor, a plurality of processors for parallel processing, or other logic. The controller or server 1601 also includes memory 1610 (e.g., random-access memory, read-only memory, flash memory), electronic storage unit 1615 (e.g., hard disk), communication interface 1620 (e.g., network adapter) for communicating with one or more other systems, and peripheral devices 1625, such as cache, other memory, data storage and/or electronic display adapters. The memory 1610, storage unit 1615, interface 1620 and peripheral devices 1625 are in communication with the CPU 1605 through a communication bus (solid lines), such as a motherboard. The storage unit 1615 can be a data storage unit (or data repository) for storing data. The controller or server 1601 can be operatively coupled to a computer network ("network") 1630 with the aid of the communication interface 1620. The network 1630 can be the Internet, an internet and/or extranet, or an intranet and/or extranet that is in communication with the Internet. The network 1630 in some cases is a telecommunication and/or data network. The network 1630 can include one or more computer servers, which can enable distributed computing, such as cloud computing. The network 1630, in some cases with the aid of the controller or server 1601, can implement a peer-to-peer network, which may enable devices coupled to the controller or server 1601 to behave as a client or a server. The controller or server 1601 can be coupled to an energy storage system 1635 either directly or through the network 1630. For example, the controller 1601 can be coupled to an energy storage device, such as the energy storage device 601 of FIG. 6. The energy storage device can be provided within the energy storage system 1635. The network 1630 can enable remote control and/or access of the controller 1601.

The system 1600 may comprise a battery management system that is operatively coupled to the energy storage system 1635 through, for example, a ballasting member (e.g., electronics designed to balance the electrochemical state-of-charge of cells or cell modules in a series string). The battery management system can be implemented, for example, at the server or controller 1601. The ballasting member can include one or more ballasting lines, which can include sensing lines and current flow lines. The ballasting member can be used to divert at least some of the current through the cells through the ballasting member, which can aid in cell balancing. The sensing lines can be configured to enable the battery management system to sense, for example, operating temperature and voltage of one or more cells of the energy storage device of the energy storage system 1635. In some implementations, the sensing lines can be non-current carrying lines. The battery management system may comprise a management system board. The battery management system board can have data acquisition capabilities. For example, the battery management system board can include a data acquisition board. The battery management system board may be able to store and/or process data (e.g., the acquired data). For example, the battery management system board may be able to store and/or process the data rather than (or in addition to) converting inputs into digital signals.

The process parameters can include charging and discharging parameters. For example, the storage unit 1615 can store process parameters and/or look-up tables of the energy storage device (and/or other portions of the energy storage system 1635). The process parameters can include operational parameters based on values of various ballasting members (e.g., sensing lines, ballasting lines, such as, for example, impedance values of various ballasting members as a function of temperature. The memory 1610 or storage unit 1615 can include an algorithm (implemented by way of software) for estimating the stage of charge of an energy storage device.

The server 1601 in some cases can include one or more additional data storage units that are external to the server 1601, such as located on a remote server that is in communication with the server 1601 through an intranet or the Internet. The server 1601 can communicate with one or more remote computer systems through the network 1630. In the illustrated example, the server 1601 is in communication with a remote computer system 1640. The remote computer system 1640 can be, for example, a personal computers (e.g., portable PC), slate or tablet PC (e.g., Apple® iPad, Samsung® Galaxy Tab), telephone, Smart phone (e.g., Apple® iPhone, Android-enabled device, Blackberry®), or personal digital assistant.

In some situations, the system 1600 includes a single controller or server 1601. In other situations, the system 1600 includes multiple controllers or servers in communication with one another through direction connection, an intranet and/or the Internet.

Methods as described herein can be implemented by way of machine (or computer processor) executable code (or software) stored on an electronic storage location of the controller or server 1601, such as, for example, on the memory 1610 or electronic storage unit 1615. During use, the code can be executed by the processor 1605. In some cases, the code can be retrieved from the storage unit 1615 and stored on the memory 1610 for ready access by the processor 1605. In some situations, the electronic storage unit 1615 can be precluded, and machine-executable instructions are stored on memory 1610. Alternatively, the code can be executed on the second computer system 1640.

The code can be pre-compiled and configured for use with a machine, have a processer adapted to execute the code, or can be compiled during runtime. The code can be supplied in a programming language that can be selected to enable the code to execute in a pre-compiled or as-compiled fashion.

Aspects of the systems and methods provided herein, such as the controller or server 1601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Various parameters of an energy storage system can be presented to a user on a user interface (UI) of an electronic device of the user. Examples of UI's include, without limitation, a graphical user interface (GUI) and web-based user interface. The UI (e.g., GUI) can be provided on a display of an electronic device of the user. The display can be a capacitive or resistive touch display. Such displays can be used with other systems and methods of the disclosure.

Interconnections

Wired or wire-less (e.g., direct metal-to-metal) interconnections may be formed between individual electrochemical cells and/or between groups of electrochemical cells (e.g., modules, packs, cores, CEs, systems, or any other group comprising one or more electrochemical cells). In some cases, groups of cells may be joined via one or more cell-to-cell interconnections. In some cases, groups of cells may be joined via a group-level interconnection. The group-level interconnection may further comprise one or more interconnections with one or more individual cells of the group. The interconnections may be structural and/or electrical. Cells and/or groups of cells may be assembled (or stacked) horizontally or vertically. Such assembled cells and/or groups of cells may be arranged in series or parallel configurations. Further, groups of cells may be supported by various frames. The frames may provide structural support and/or participate or aid in forming the interconnections (e.g., frames on groups of cells may mate or be connected). Groups of cells utilized for assembly purposes may or may not be the same as groups of cells utilized for regulation/control purposes.

In some implementations, electrochemical cells or groups thereof are connected using interconnects. In some instances, an interconnect is a wire. In some implementations, direct connection of cells to each other (e.g., by brazing) can be used to connect cells or groups of cells, in some cases reducing or eliminating the use of wires to connect electrochemical cells. For example, a positive current collector of a first electrochemical cell can be direct metal-to-metal joined (e.g., brazed or welded) to a negative current collector of a second electrochemical cell. In some instances, the negative current collector comprises a negative current lead or conductor. In some instances, the first and second electrochemical cells are not connected by wires. In another example, the conductor can protrude through an electrically conductive housing of the first cell through an aperture in the electrically conductive housing and can be electrically isolated from the electrically conductive housing with a seal. A plurality of electrochemical cells can be stacked in series with the conductor of the first cell in electrical contact with the electrically conductive housing of a second cell. A plurality of non-gaseous spacers can be disposed between the electrochemical cells. In some cases, the electrically conductive housings are part of a current conducting pathway (e.g., as in a parallel connection of cells). In some implementations, one or more busbars and/or interconnects can be used to create a connection between any two groups of cells.

A battery can comprise electrochemical cells connected in series and in parallel. The number of electrochemical cell modules (or parallel-connected modules) that are connected in series can be any suitable number, such as, for example, at least 3, at least 5, at least 6, at least 10, at least 12, at least 15, at least 16, at least 20, at least 32, at least 48, at least 54, at least 64, at least 108, at least 128, at least 216, or at least 256. In an example, the number of electrochemical cell modules (or parallel-connected modules) that are connected in series is 3 (e.g., for a battery comprising a pack), 6 (e.g., for a battery comprising a pack), or 216 (e.g., for a battery comprising a core).

Figure 17:
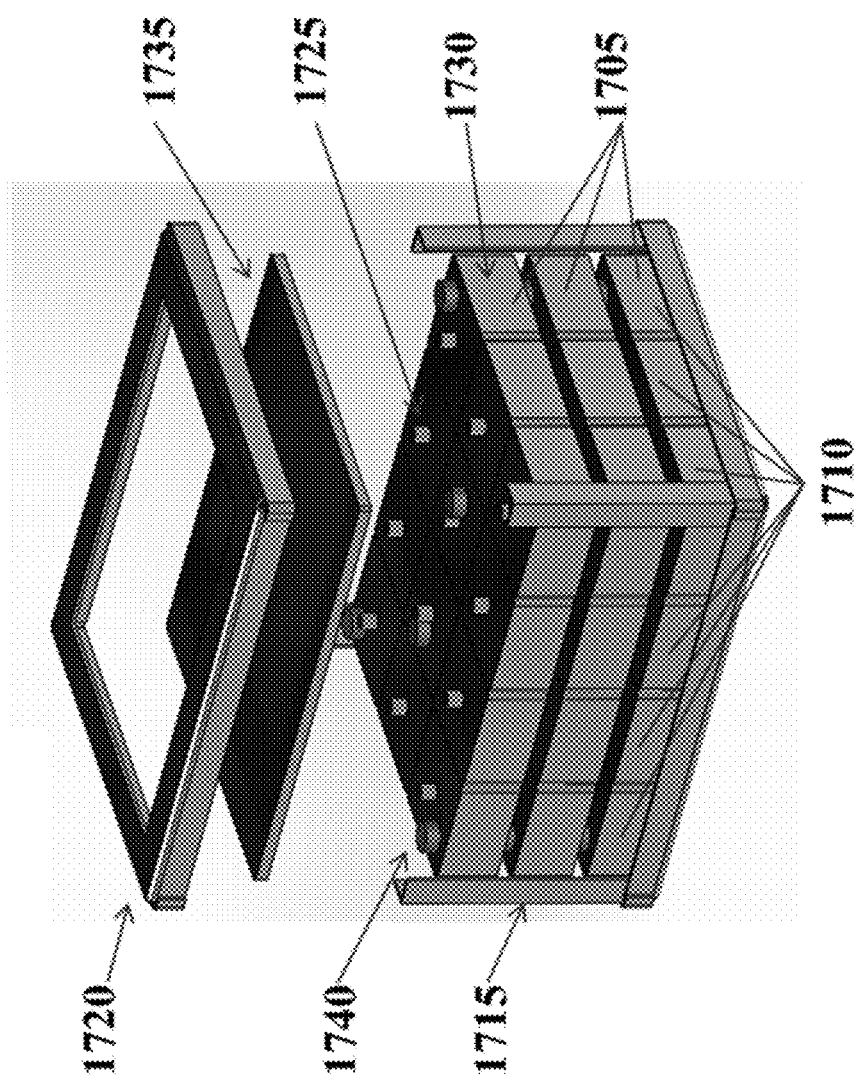
FIG. 17 shows an example of a cell pack.

FIG. 17 shows an example of a cell pack 1700 comprising 3 modules 1705. Each of the modules comprises 12 cells 1730 that are connected in parallel 1710. The modules are held in place with cell pack framing (also "frame" herein) 1715 that includes a top component of the frame 1720. The cells are stacked directly on top of each other with the negative current terminal of one cell 1725 contacted directly with the housing of another cell (e.g., the cell above it). The negative current terminals of the top layer of cells may have no housing of another cell directly above, and may instead be contacted (e.g., brazed to) a negative busbar 1735.

Cell packs can be attached in series and parallel in various configurations to produce cores, CEs, or systems. The number and arrangement of various groups of electrochemical cells can be chosen to create the desired system voltage and energy storage capacity. The packs, cores, CEs, or systems can then be enclosed together in high temperature insulation to create a system that can heat itself using the energy created from cells charging and discharging.

Figure 18:
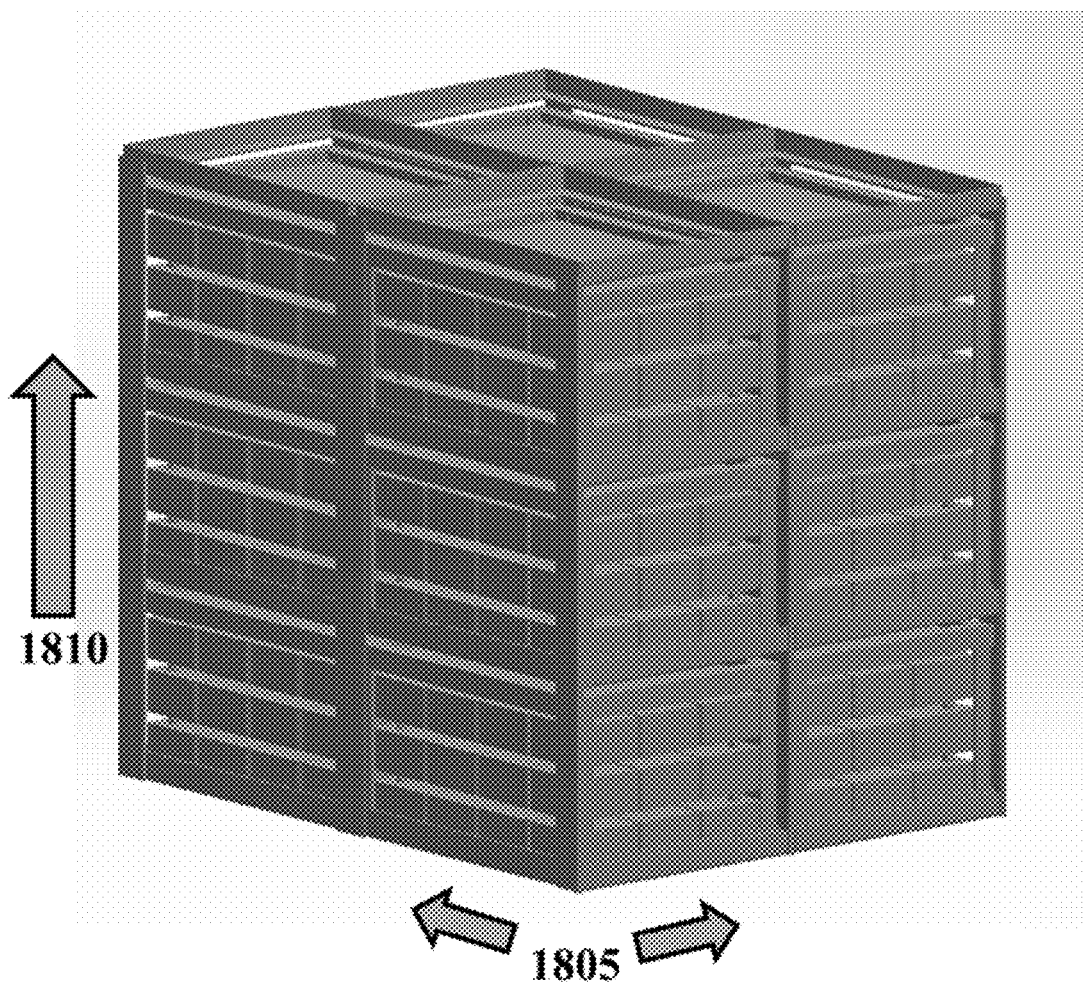
FIG. 18 shows an example of a stack of cell packs, also referred to as a core.

FIG. 18 is an example of how these packs can be configured, indicating that the cell packs in a given plane are connect to one another in parallel 1805, while the packs connected directly atop one another are connected in series 1810.

The packs themselves can be connected vertically and horizontally to one another through busbars (e.g., unlike the cell-to-cell connections within a pack which can generally be direct connections such as brazes or welds). In some cases, the busbar is flexible or comprises a flexible section (e.g., to accommodate non-isothermal expansion of the system throughout heat up and operation).

A busbar can be used to make an electrical connection with cells in a parallel string (e.g., a parallel string of cells, a parallel string of packs, etc.). In some examples, a busbar can be used to configure a set of cells or cell modules into a parallel string configuration by being electrically connected with the same terminal on all of the cells or cell modules (e.g., the negative terminals of all of the cells or cell modules, or the positive terminals of all of the cell or cell modules). For example, a positive busbar and/or a negative busbar may be used. The positive busbar can be connected to the housing and may or may not need to be flexible. In some cases, the positive busbar may not be used. The negative busbar can be joined to features in (or on) one or more of the cell bodies (e.g., the cell bodies of individual cells in a pack) to provide a strong electrical connection. In some cases, the negative busbar can be attached to conductive feed-throughs (e.g., negative current leads), which may require some compliance for thermal expansion. For example, a flexible connection between a relatively rigid busbar core and the feed-through may be achieved using a compliance feature between the feed-through and the busbar (e.g., a spiral pattern, such as spiral arm(s), that may be created by cutting away and/or removing material from a flat busbar in the desired pattern). In some cases, the busbar may be sufficiently compliant such that the compliance feature is not needed.

The busbar and/or interconnect components can comprise a conductive material. For example, the busbar and/or interconnect components can comprise (e.g., be made of) stainless steel, nickel, copper, aluminum-copper based alloy.

The battery can include a common single point connector. The single point connector can be used to electrically connect to an electrochemical cell or to a group of electrochemical cells (e.g., modules, packs, cores, CEs, or systems). Multiple wires (e.g., ends of the wires) can be connected to the common single point connector (i.e., several wires can be connected to a common connector, which can connect to other portions of the battery at a single point). The battery can include a plurality of wires having a first end and a second end. The first end can be connected to at least one of the electrochemical cells (e.g., directly or indirectly). In some cases, the first end can be connected to a common single point connector, and the common single point connector can be connected to at least one of the electrochemical cells (e.g., to a busbar that is in electrical communication with at least one of the electrochemical cells, to a cell body, to a feature in a cell body such as a tab protruding from the cell body, etc.). The second end can be connected, for example, to control circuitry (e.g., directly or indirectly) or to another common single point connector. In some cases, the second end can be connected to a common single point connector, and the common single point connector can be connected to control circuitry. For example, the single point connector on the second end (or the second end itself) can be connected to control circuitry located outside the thermally insulated zone containing cell packs, such as, for example, to a battery management system (e.g., to a battery management system board). In some cases, the first ends of a set of wires can be connected to a single point connector, the second ends of a subset of the wires can be connected to another single point connector, and the remaining wire or wires (e.g., the remaining second ends of the wires) can be separately connected to another part of the battery (e.g., voltage sense line input port of a battery management system).

In some cases, the single point connector forms an electrical connection with another plurality (group) of electrochemical cells (e.g., to connect together modules, packs, cores, CEs, or systems). For example, the first end of the wire can be connected (e.g., via a single point connector such as an adapter plate) to a busbar (e.g., a negative busbar) that is in electrical communication with at least one of the electrochemical cells in a group of electrochemical cells (e.g., in a pack).

An adapter plate can create a single point connection for multiple wires to a busbar in a module, pack, core, or CE. The wires can be welded or brazed to the back of the adapter plate to facilitate single point separation of a large quantity of wires connecting to a busbar. In order to effectively balance and monitor cells within a cell module, multiple wire connections may need to be created. The connection point can be a potential point of failure and can add to the cost and complexity of assembly. In some implementations, a terminal that has the wires connected to it can be prefabricated. The plate can be bolted, welded or brazed wherever the connection is required. Wires connected in this manner can remain static through many uses and disconnections, thus reducing wire wear-tear and embrittlement effects. Thus, single point connectors can in some cases enable more facile module interchanges.

Any number of wires can be connected to a common single point connector. In some examples, 1, 2, 3, 4, 5, 6, 7, 8, 9, 10, 11, 12, 13, 14, 15, 16, 17, 18, 19, 20, 22, 24, 26, 28, 30, 35, or 40 wires are connected to the single point connector. In some cases, at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 22, at least 24, at least 26, at least 28, at least 30, at least 35, or at least 40 wires are connected to the single point connector.

The single point connector can be made of any conductive metal, such as, for example, nickel, stainless steel, copper-aluminum alloy, or of any other conductive material described herein. In some implementations, the single point connector can comprise a bent metal piece. The first ends of the wires can be passed through holes in the bent metal piece and/or welded to the bent metal piece. The wires can be any wire, including, but not limited to, American Wire Gauge (AWG) 18 wires or AWG 10 wires. In some cases, one or more wires may be used to sense voltage and therefore may be able to be thin (e.g., less than about 2 mm in diameter, or AWG 18). In some cases, one or more wires may be thicker (e.g., greater than about 2 mm in diameter, or AWG 18 gauge) and may be used to carry current to and from the cell or cell module (e.g., as required for cell balancing). The sensing line(s) (e.g., voltage sense line(s)) may be provided separately from the current flow line(s) (also "current carrying line(s)" or "high current line(s)" herein. In some cases, first ends of the current carrying wires and the voltage sense wire may be connected to a single point connector that is connected to the cells or a busbar, while the other (second) ends of the wires are separately connected to the battery management system (e.g., the voltage sense wire is connected to a voltage input port on the battery management system and the current wires are connected to a single point connector which is connected to a current input/output port on the battery management system). This arrangement may enable voltage drop across the current flow lines to be separated from the operational characteristics sensed by the sensing lines. As previously described, the sensing and current flow paths may be in electronic communication with the battery management system.

Devices, systems and methods of the present disclosure may be combined with or modified by other devices, systems and/or methods, such as, for example, electrochemical cells, batteries and battery components described in U.S. Pat. No. 3,663,295 ("STORAGE BATTERY ELECTROLYTE"), U.S. Pat. No. 3,775,181 ("LITHIUM STORAGE CELLS WITH A FUSED ELECTROLYTE"), U.S. Pat. No. 8,268,471 ("HIGH-AMPERAGE ENERGY STORAGE DEVICE WITH LIQUID METAL NEGATIVE ELECTRODE AND METHODS"), U.S. Patent Publication No. 2011/0014503 ("ALKALINE EARTH METAL ION BATTERY"), U.S. Patent Publication No. 2011/0014505 ("LIQUID ELECTRODE BATTERY"), U.S. Patent Publication No. 2012/0104990 ("ALKALI METAL ION BATTERY WITH BIMETALLIC ELECTRODE"), U.S. Patent Publication No. 2014/0099522 ("LOW-TEMPERATURE LIQUID METAL BATTERIES FOR GRID-SCALED STORAGE"), and U.S. patent application Ser. No. 14/286,369, each of which is entirely incorporated herein by reference.

A person of skill in the art will recognize that the battery housing components may be constructed from materials other than the examples provided herein. One or more of the electrically conductive battery housing components, for example, may be constructed from metals other than steel and/or from one or more electrically conductive composites. In another example, one or more of the electrically insulating components may be constructed from dielectrics other than the aforementioned glass, mica and vermiculite. The present invention therefore is not limited to any particular battery housing materials.

Any aspects of the disclosure described in relation to cathodes can equally apply to anodes at least in some configurations. Similarly, one or more battery electrodes and/or the electrolyte may not be liquid in alternative configurations. In an example, the electrolyte can be a polymer or a gel. In a further example, at least one battery electrode can be a solid or a gel. Furthermore, in some examples, the electrodes and/or electrolyte may not include metal. Aspects of the disclosure are applicable to a variety of energy storage/transformation devices without being limited to liquid metal batteries. Energy storage devices of the disclosure may be used in grid-scale settings or stand-alone settings. Energy storage devices of the disclosure can be used as stationary systems or mobile systems. In some cases, energy storage devices of the disclosure can be used to power vehicles, such as scooters, motorcycles, cars, trucks, trains, helicopters, airplanes, and other mechanical devices, such as robots.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A method comprising:
    (a) providing (1) an electrochemical cell comprising, a negative electrode, an electrolyte, a positive electrode, (2) a housing disposed around the negative electrode, the electrolyte, and the positive electrode, and (3) a seal connected to the housing, wherein at least one of the negative electrode, the electrolyte, and the positive electrode is in an at least partially liquid state at an operating temperature of the electrochemical cell that is at least about 250° C., wherein the housing and the seal isolate the negative electrode, the electrolyte, and the positive electrode from an environment comprising an atmosphere comprising nitrogen external to the housing and the seal, and wherein the seal electrically isolates the positive electrode and the negative electrode from one another;

(b) monitoring the electrochemical cell for an electrical signature from within the electrochemical cell to determine (i) an exposure of at least one of the positive electrode, the electrolyte, and the negative electrode in the electrochemical cell to the environment, and (ii) a breach of the seal; and (c) in response to the electrical signature, inactivating the electrochemical cell, cooling the electrochemical cell, discharging the electrochemical cell, or notifying a system operator.

2. The method of claim 1, wherein the atmosphere comprising the nitrogen entering into the electrochemical cell is sufficient for measuring the electrical signature.

3. The method of claim 1, wherein the electrical signature corresponds to (i) a leakage current that is increased relative to a baseline leakage current associated with an unbreached cell, (ii) a self-discharge rate of the electrochemical cell that is increased relative to a baseline self-discharge rate associated with an unbreached cell, (iii) a charge or discharge Coulombic efficiency value that is decreasing over time or is below a baseline Coulombic efficiency value associated with an unbreached cell or an unbreached group of cells, or (iv) a voltage during charging or discharging of the electrochemical cell that is decreased relative to a baseline charge or discharge voltage associated with an unbreached cell.

4. The method of claim 3, wherein the leakage current is determined from a charging time of the electrochemical cell or a time to balance a group of electrochemical cells.

5. The method of claim 3, wherein the electrical signature corresponds to the self-discharge rate of the electrochemical cell that is increased relative to the baseline self-discharge rate associated with the unbreached cell.

6. The method of claim 3, wherein the electrical signature corresponds to the charge or discharge Coulombic efficiency value that is decreasing over time or is below the baseline Coulombic efficiency value associated with the unbreached cell or the unbreached group of cells.

7. The method of claim 3, wherein the electrical signature corresponds to the voltage during charging or discharging of the electrochemical cell that is decreased relative to the baseline charge or discharge voltage associated with the unbreached cell.

8. The method of claim 1, wherein the electrochemical cell is one of a plurality of electrochemical cells connected in parallel or series and at least a portion of the plurality of electrochemical cells are inactivated, cooled or discharged in response to the electrical signature.

9. The method of claim 1, wherein the electrical signature is further indicative of the negative electrode shorting with the positive electrode.

10. The method of claim 1, wherein the operating temperature is between about 250° C. and 750° C.

11. The method of claim 1, wherein (b) and (c) are performed using a computer processor that is programmed to (i) monitor the electrochemical cell for the electrical signature and (ii) initiate the inactivating of the electrochemical cell, the cooling of the electrochemical cell, the discharging of the electrochemical cell, or the notifying of the system operator.

12. The method of claim 1, wherein the positive electrode comprises one or more materials selected from the group consisting of zinc, cadmium, mercury, tin, lead, bismuth, antimony, tellurium and selenium.

13. The method of claim 1, wherein the negative electrode comprises one or more materials selected from the group consisting of lithium, sodium, potassium, magnesium, barium and calcium.

14. The method of claim 1, wherein at least two of the negative electrode, the positive electrode, and the electrolyte are in a liquid state at the operating temperature.

15. The method of claim 1, wherein the electrochemical cell is in communication with a battery management system.

16. The method of claim 15, wherein the battery management system monitors the electrical signature that is indicative of the breach of the seal.

17. The method of claim 15, wherein the battery management system comprises a human machine interface, and wherein the human machine interface notifies the system operator of the breach of the seal.

18. The method of claim 1, wherein the electrolyte comprises a salt of an alkali or alkaline earth metal.

19. The method of claim 1, wherein the electrochemical cell spontaneously discharges upon the breach of the seal.

20. The method of claim 1, wherein in (c), the electrochemical cell is first discharged, then cooled.

21. The method of claim 1, wherein (b) and (c) occur subsequent to (a).

* * * * *